US011905453B2

(12) United States Patent
Novek

(10) Patent No.: US 11,905,453 B2
(45) Date of Patent: Feb. 20, 2024

(54) THERMAL STORAGE SYSTEMS AND METHODS

(71) Applicant: SolvCor Technologies LLC, Houston, TX (US)

(72) Inventor: Ethan Novek, Houston, TX (US)

(73) Assignee: SolvCor Technologies LLC, Houston, TX (US)

( * ) Notice: Subject to any disclaimer, the term of this patent is extended or adjusted under 35 U.S.C. 154(b) by 0 days.

(21) Appl. No.: 18/091,817

(22) Filed: Dec. 30, 2022

(65) Prior Publication Data

US 2023/0220258 A1 Jul. 13, 2023

Related U.S. Application Data

(63) Continuation-in-part of application No. 17/166,700, filed on Feb. 3, 2021, and a continuation-in-part of application No. 17/008,165, filed on Aug. 31, 2020, now Pat. No. 11,643,583, said application No. 17/166,700 is a continuation-in-part of application No. 16/826,469, filed on Mar. 23, 2020, now Pat. No. 10,948,224, said application No. 17/008,165 is a continuation of application No. 16/580,962, filed on Sep. 24, 2019, now Pat. No. 10,808,156, which is a continuation of application No. 16/445,855, filed on Jun. 19, 2019, now Pat. No. 10,472,550, which is a continuation of application No. 16/258,384, filed on Jan. 25, 2019, now Pat. No. 10,414,961.

(60) Provisional application No. 63/295,300, filed on Dec. 30, 2021, provisional application No. 62/988,999, filed on Mar. 13, 2020, provisional application No. 62/984,394, filed on Mar. 3, 2020, provisional application No. 62/976,398, filed on Feb. 14, 2020, provisional application No. 62/969,774, filed on Feb. 4, 2020, provisional application No. 62/969,211, filed on Feb. 3, 2020, provisional application No. 62/872,851, filed on Jul. 11, 2019, provisional application No. 62/822,501, filed on Mar. 22, 2019, provisional application No. 62/771,902, filed on Nov. 27, 2018, provisional application No. 62/670,117, filed on May 11, 2018, provisional application No. 62/622,528, filed on Jan. 26, 2018.

(51) Int. Cl.
```
C09K 5/04      (2006.01)
F25J 1/00      (2006.01)
C09K 3/18      (2006.01)
F25J 1/02      (2006.01)
F25B 37/00     (2006.01)
F25B 15/14     (2006.01)
F28D 20/00     (2006.01)
```

(52) U.S. Cl.
CPC .............. *C09K 5/041* (2013.01); *C09K 3/185* (2013.01); *F25B 15/14* (2013.01); *F25B 37/00* (2013.01); *F25J 1/0022* (2013.01); *F25J 1/0211* (2013.01); *F28D 20/0034* (2013.01); *C09K 2205/12* (2013.01); *F28D 2020/0004* (2013.01); *F28D 2020/0082* (2013.01)

(58) Field of Classification Search
CPC .... C09K 5/041; C09K 3/185; C09K 2205/12; F25B 15/14; F25B 37/00; F25B 21/02; F25J 1/0022; F25J 1/0211; F28D 20/0034; F28D 2020/0004; F28D 2020/0082; F28D 2020/0086; F28D 20/02; Y02E 60/14
USPC ........................................................ 252/71
See application file for complete search history.

(56) References Cited

U.S. PATENT DOCUMENTS

| | | |
|---|---|---|
| 10,400,148 B2 | 9/2019 | Novek |
| 10,414,961 B2 | 9/2019 | Novek |
| 10,472,550 B1 | 11/2019 | Novek |
| 10,576,413 B2 | 3/2020 | Novek |
| 10,808,156 B2 | 10/2020 | Novek |
| 10,948,224 B2 | 3/2021 | Novek |
| 2002/0078696 A1 | 6/2002 | Korin |
| 2004/0211726 A1 | 10/2004 | Baig et al. |
| 2011/0058637 A1 | 3/2011 | Campbell et al. |
| 2016/0167974 A1 * | 6/2016 | Novek ............... C01C 1/26 423/437.1 |
| 2017/0267538 A1 | 9/2017 | Novek |
| 2018/0259229 A1 | 9/2018 | Moghaddam |
| 2019/0143260 A1 | 5/2019 | Novek |
| 2019/0233697 A1 * | 8/2019 | Novek ............... F25J 1/0211 |
| 2020/0199519 A1 | 6/2020 | Hickey |
| 2020/0188840 A1 | 10/2020 | Novek |

(Continued)

FOREIGN PATENT DOCUMENTS

| | | | |
|---|---|---|---|
| WO | 2015103199 A1 | 7/2015 | |
| WO | WO-2017013152 A1 * | 1/2017 | ........... F28D 20/003 |
| WO | 20170058747 A1 | 4/2017 | |

OTHER PUBLICATIONS

International Search Report and Written Opinion dated Jun. 2, 2023 received in PCT/US2023/10106.

(Continued)

*Primary Examiner* — Douglas J McGinty
(74) *Attorney, Agent, or Firm* — Hunton Andrews Kurth LLP

(57) ABSTRACT

The present application pertains in some embodiments to a thermal storage system. The system may include, for example, a warm thermal storage region; a cold thermal storage region; and a physical divider. The warm thermal storage region may include at least two liquid phases. The cold thermal storage region may include at least one liquid phase. The physical divider substantially separates the warm thermal storage region from the cold thermal storage region.

31 Claims, 19 Drawing Sheets

(56) References Cited

U.S. PATENT DOCUMENTS

2020/0363108 A1    11/2020  Novek
2021/0356178 A1    11/2021  Novek
2023/0220258 A1     7/2023  Novek

OTHER PUBLICATIONS

Gat. S. et al., Heat Transfer Enhancement via Liquid-liquid phase separation, international Journal of heat and Mass Transfer, 52, (2009) 1385-1399.

* cited by examiner

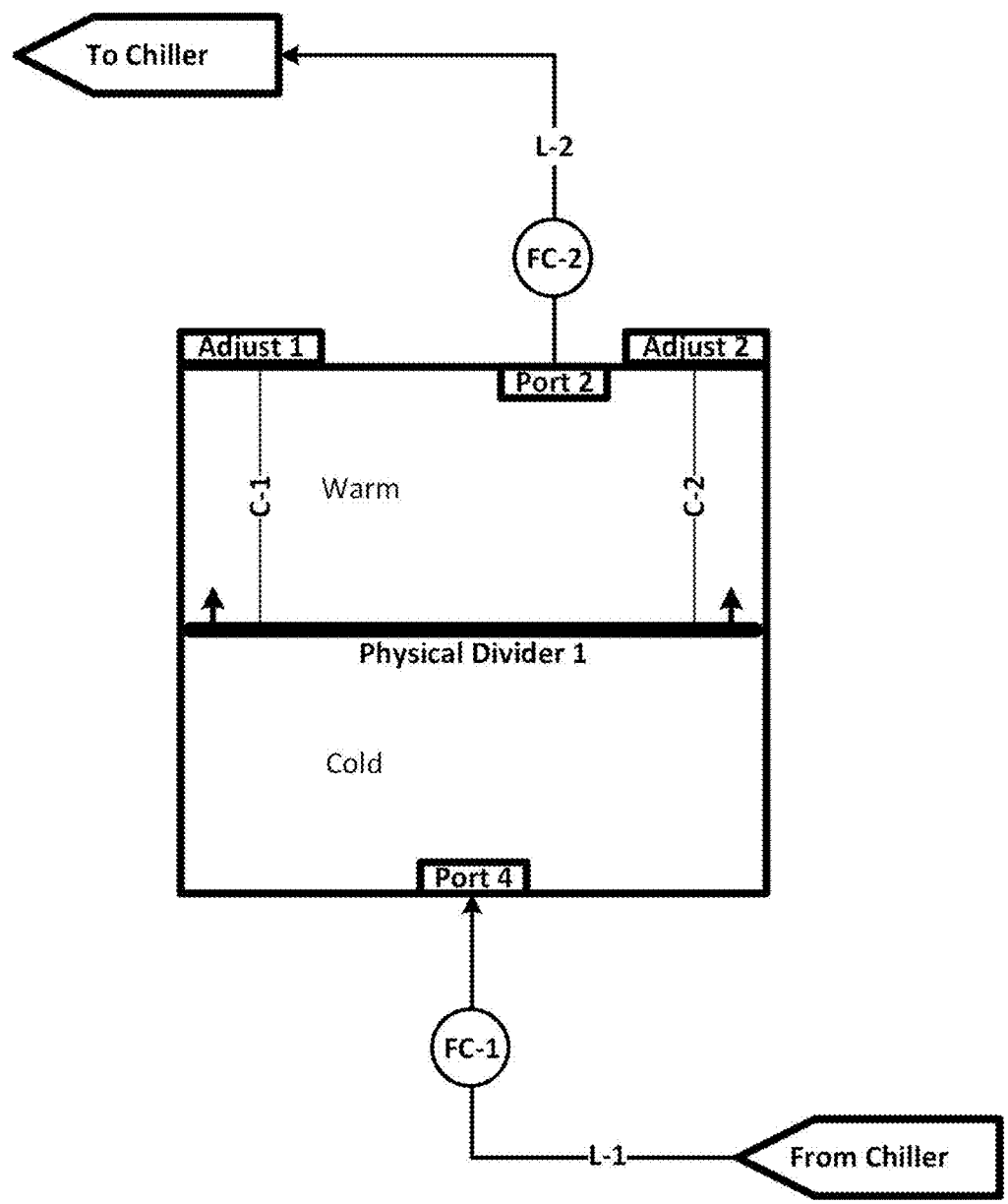
Figure 1 (Above)

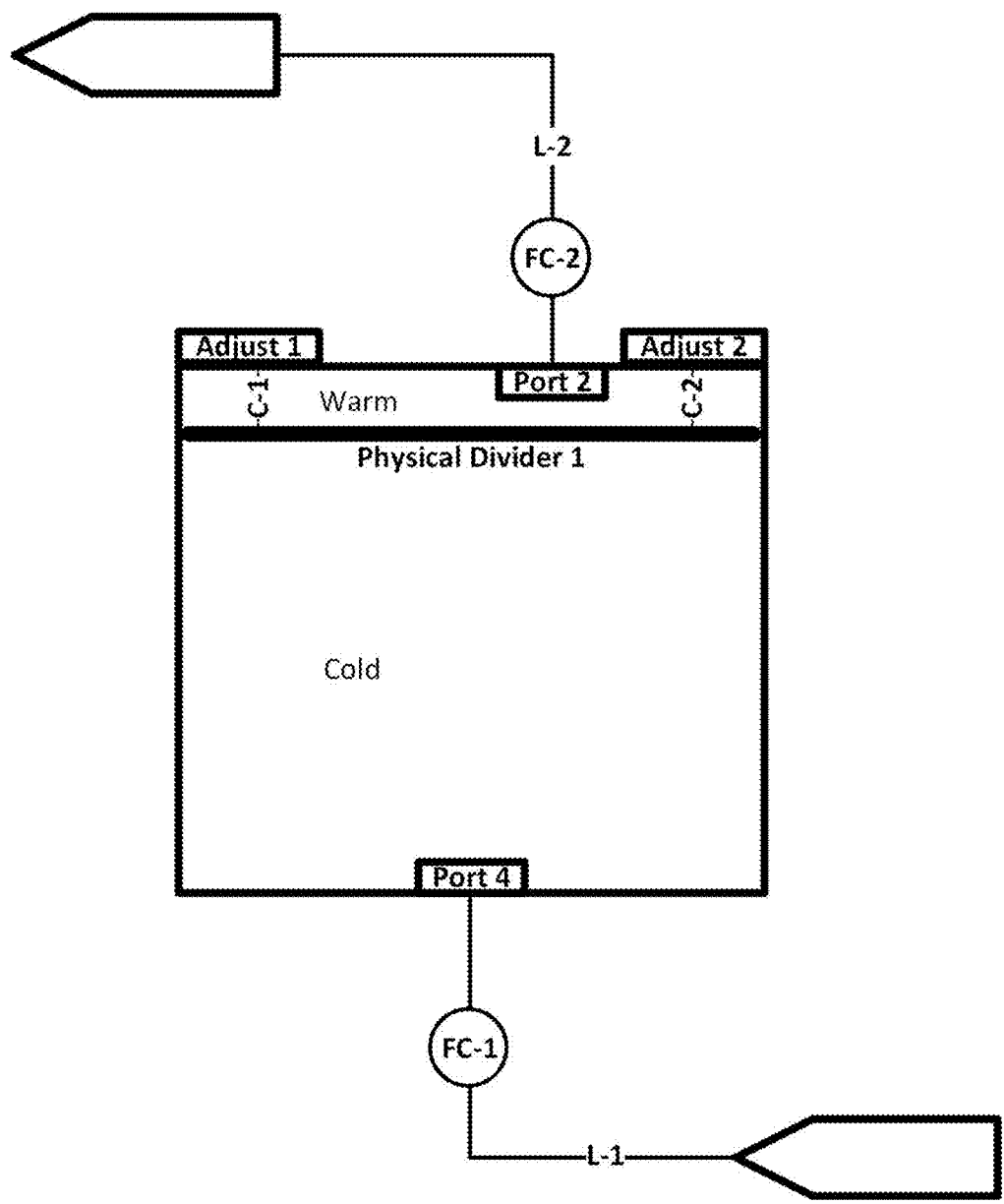
Figure 2 (Above)

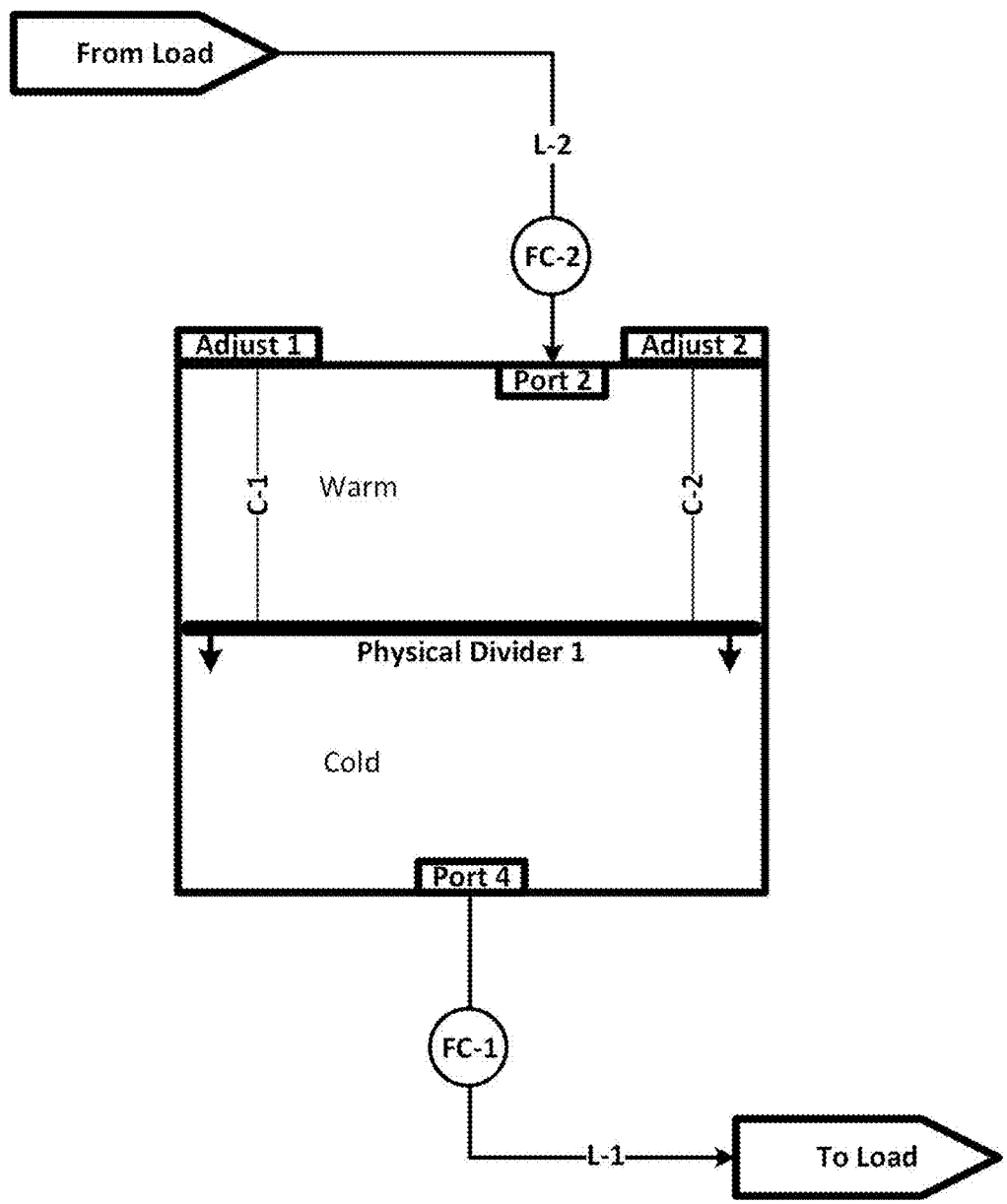
Figure 3 (Above)

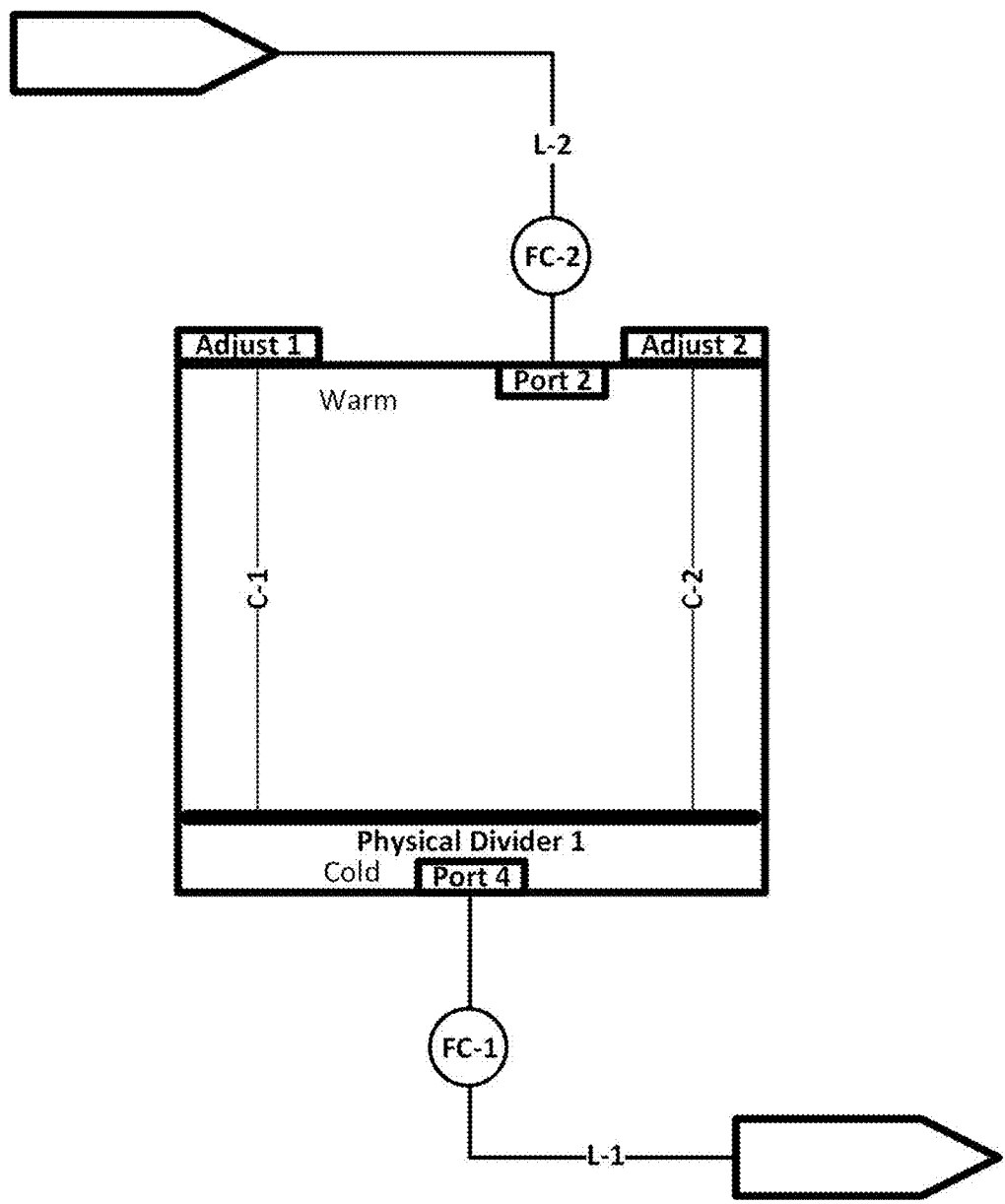
Figure 4 (Above)

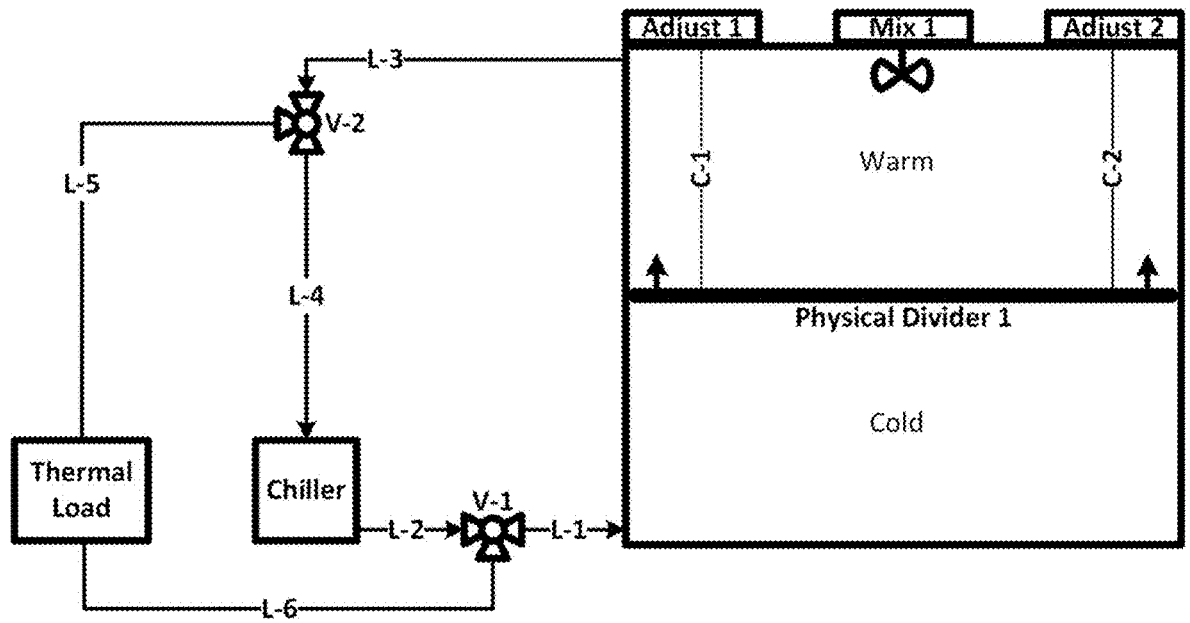
Figure 5 (Above)
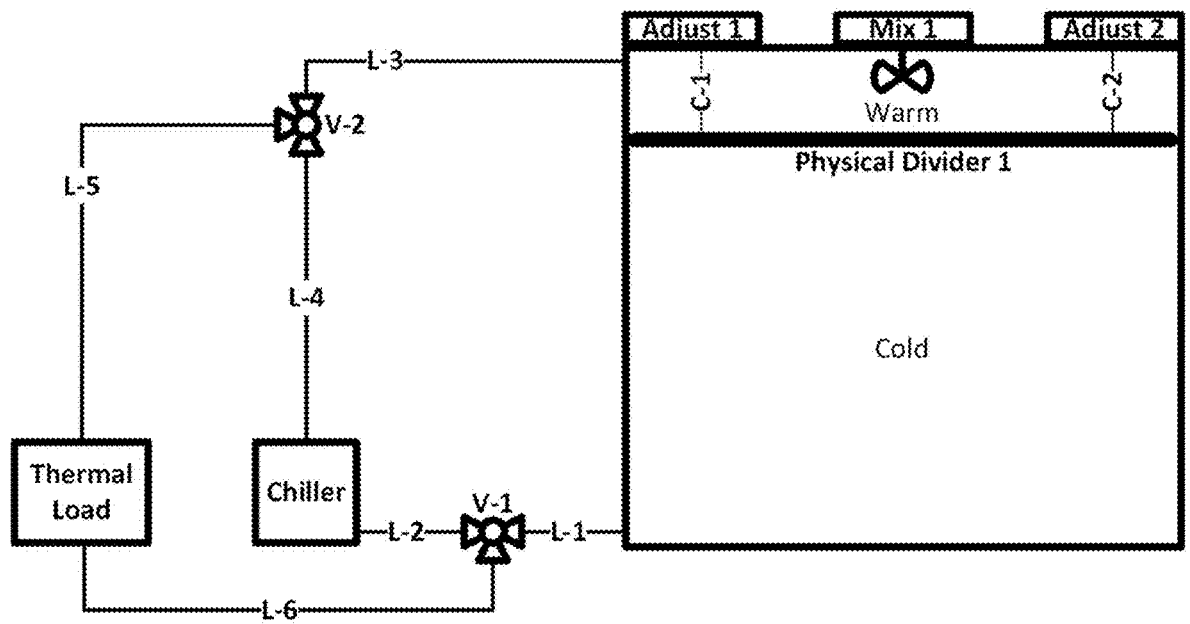
Figure 6 (Above)

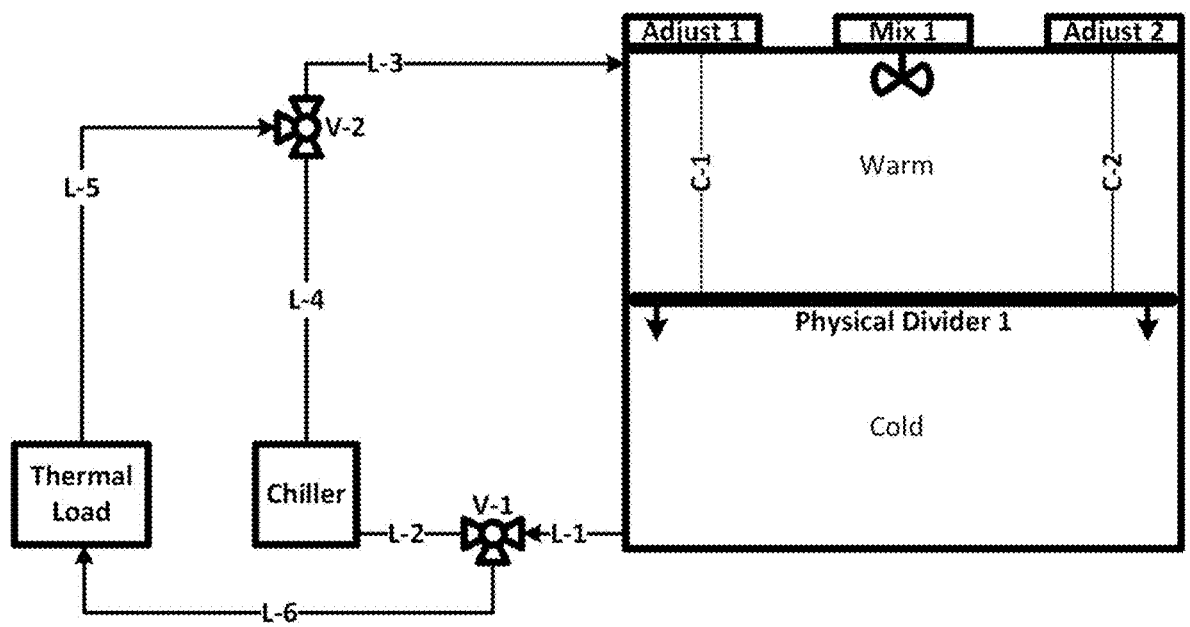
Figure 7 (Above)
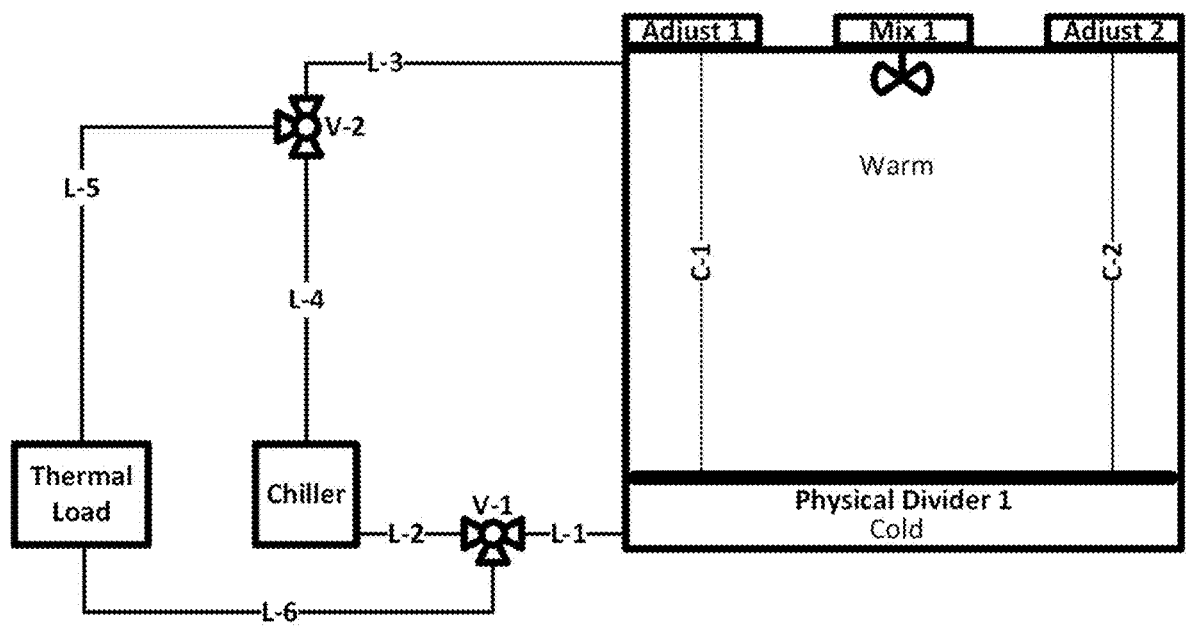
Figure 8 (Above)

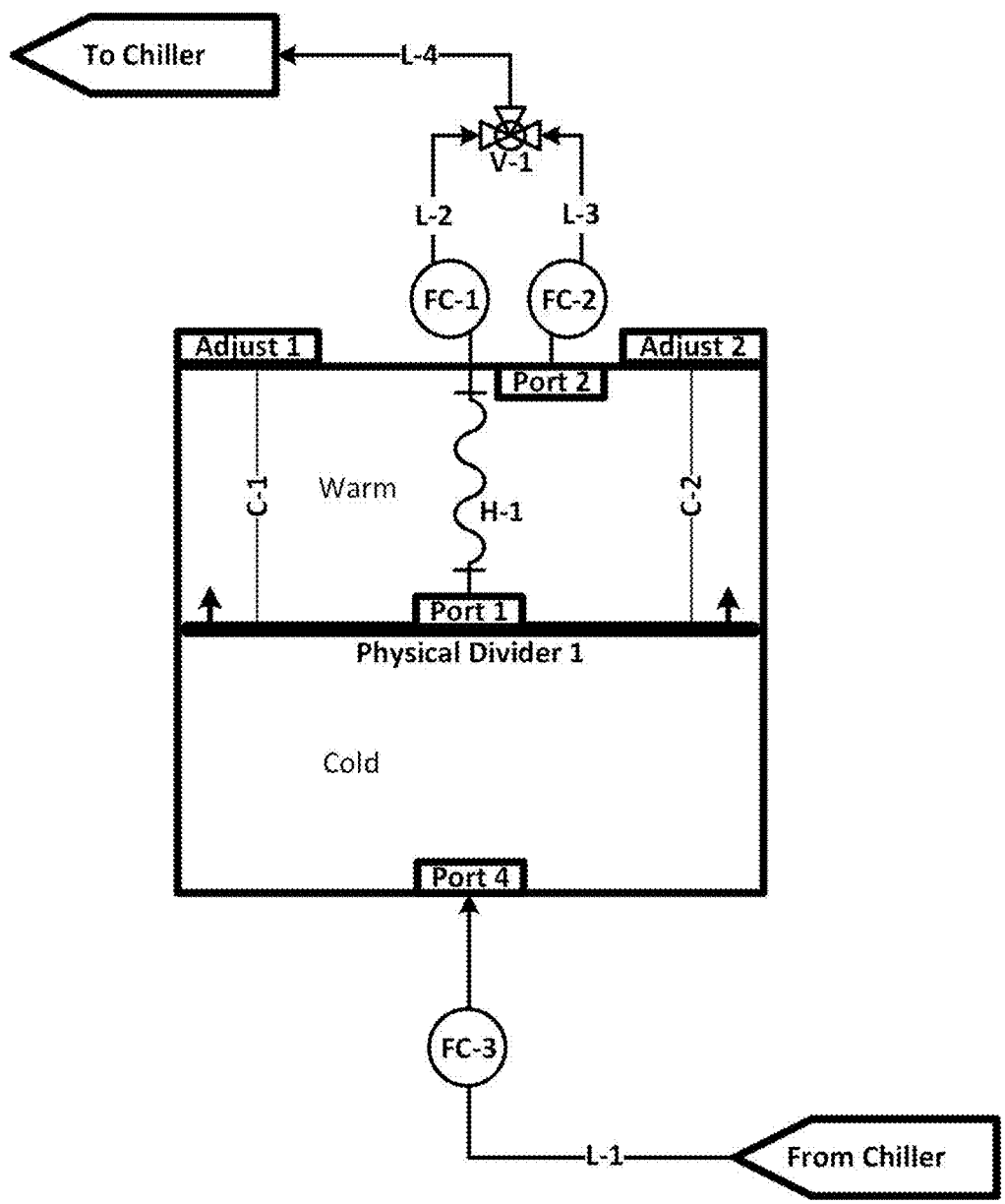
Figure 9 (Above)

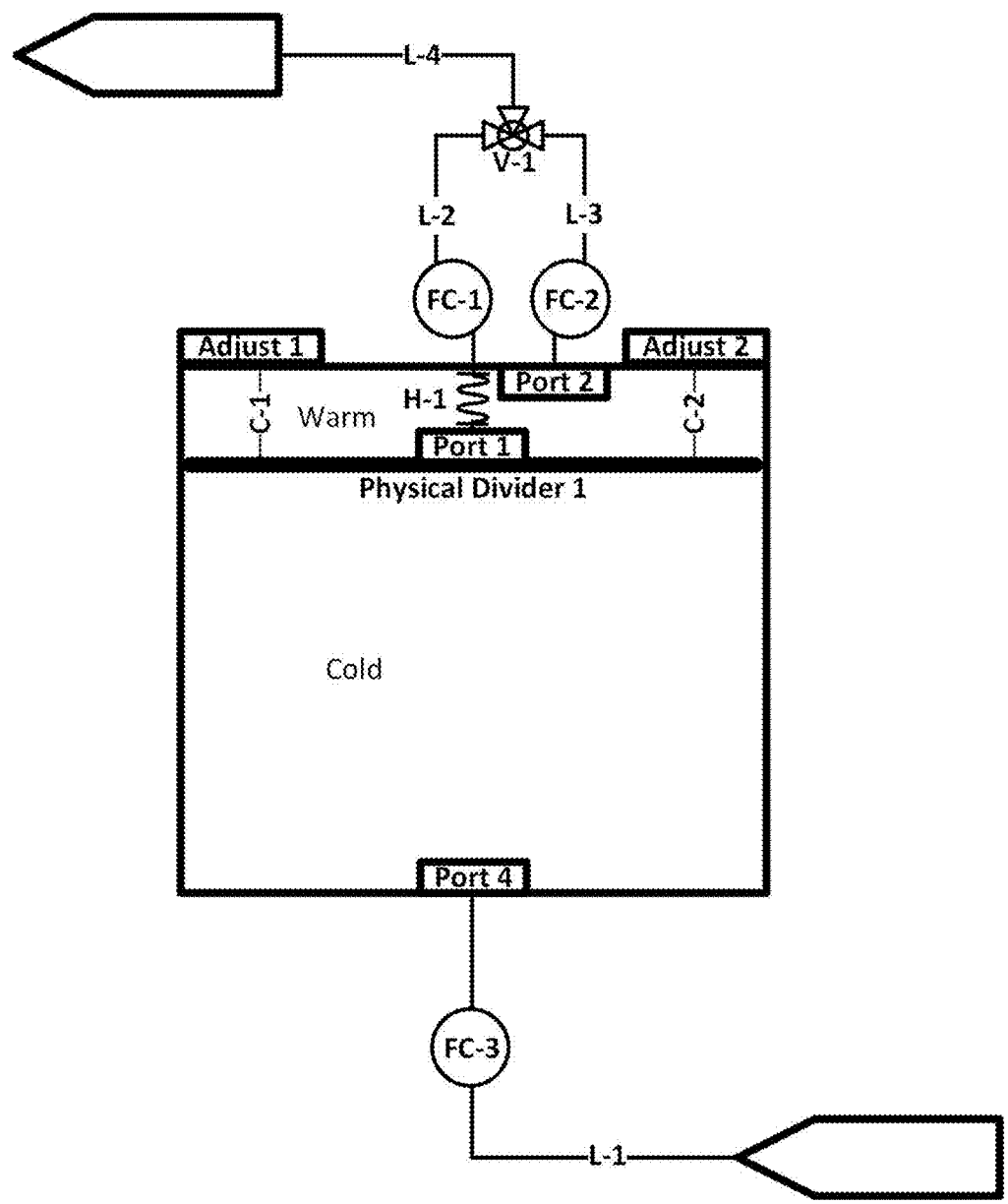
Figure 10 (Above)

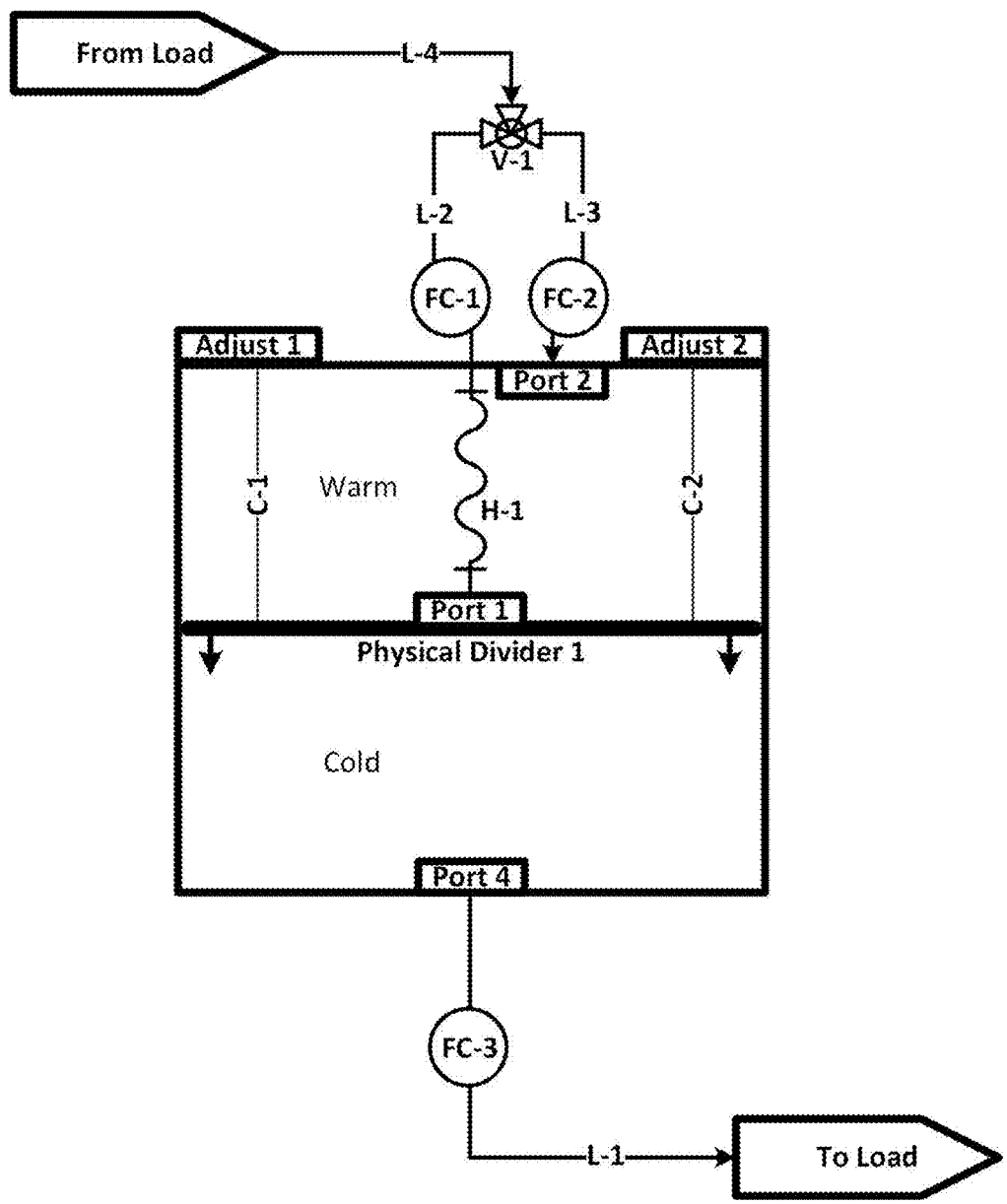
Figure 11 (Above)

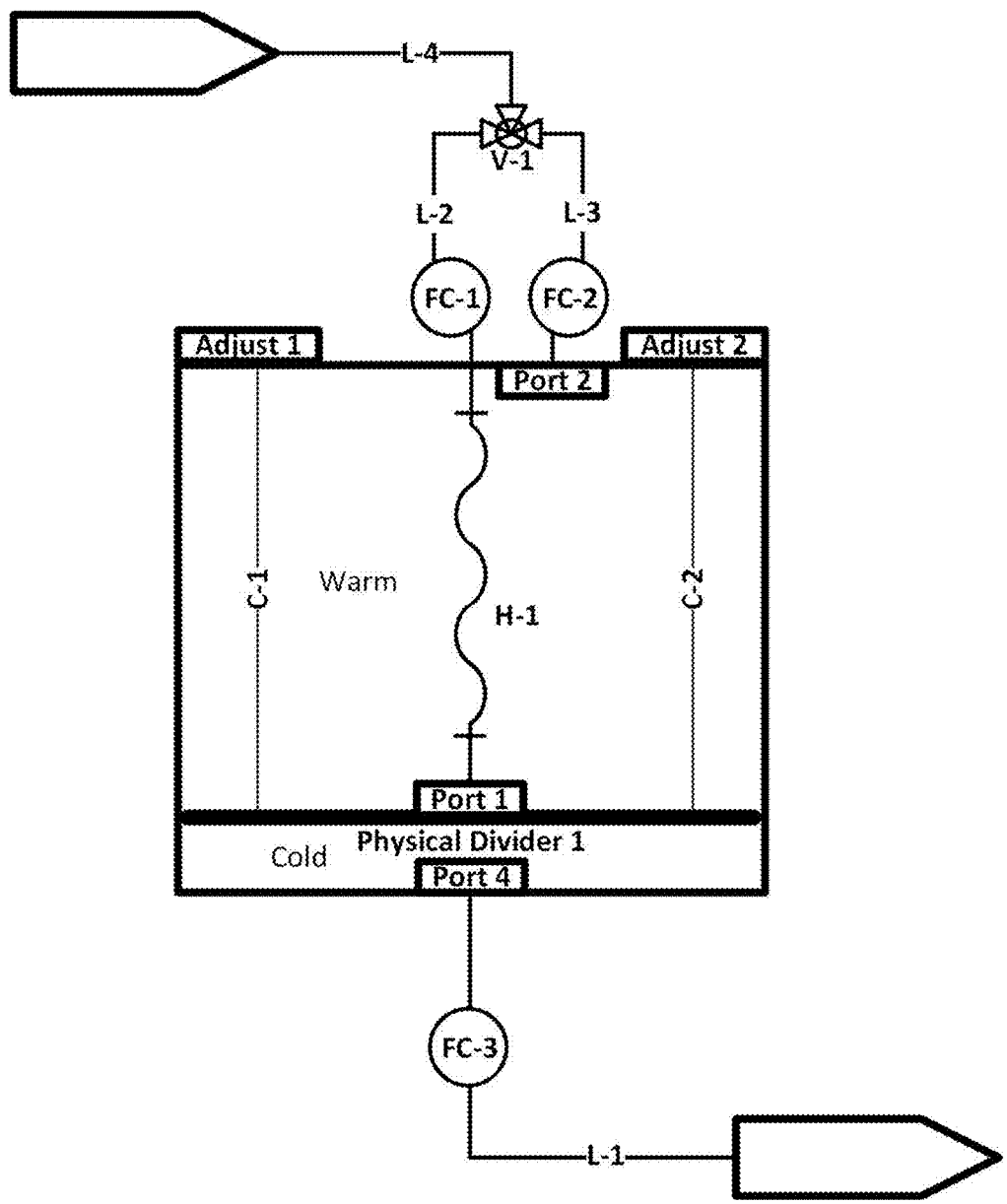
Figure 12 (Above)

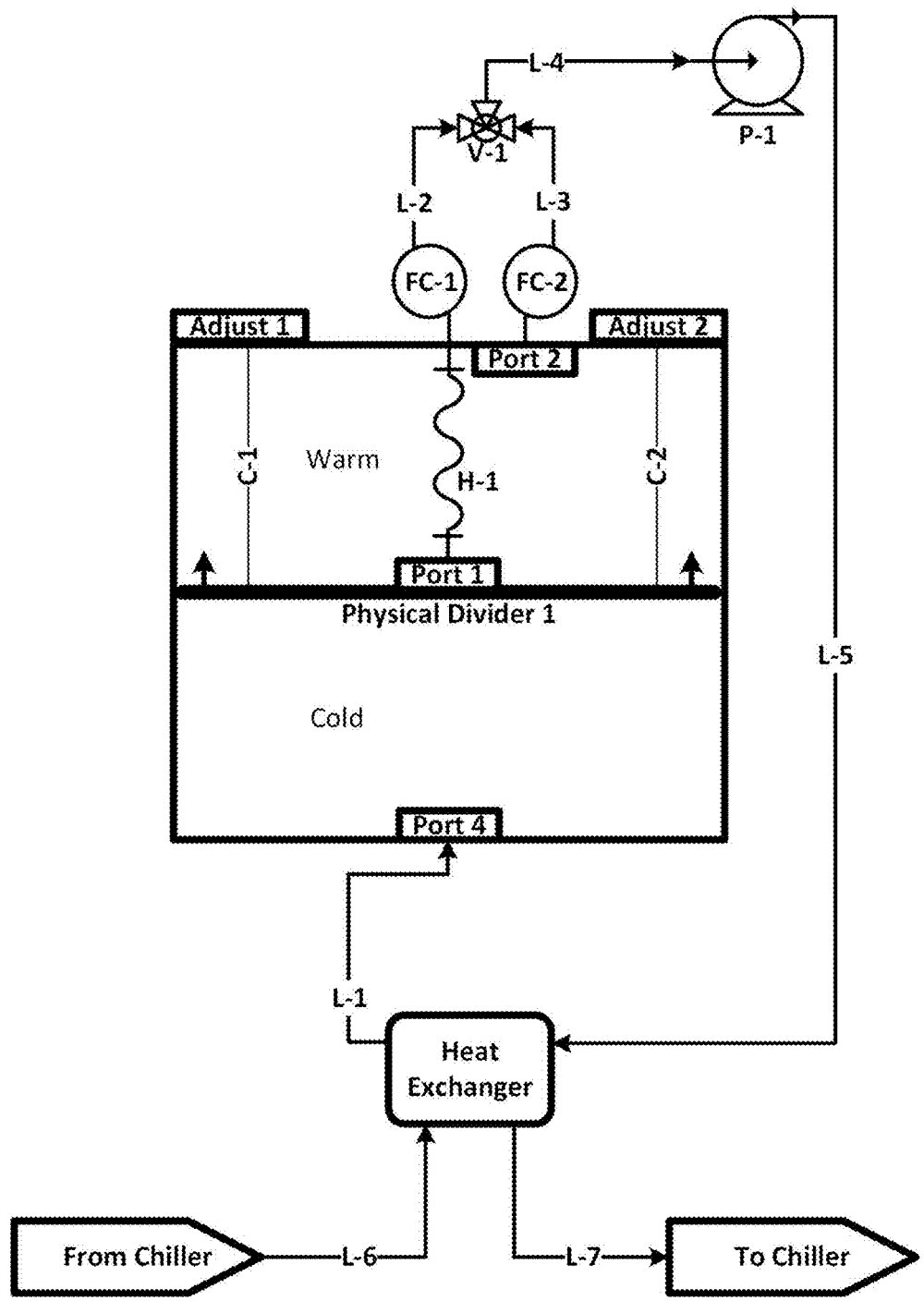
Figure 13 (Above)

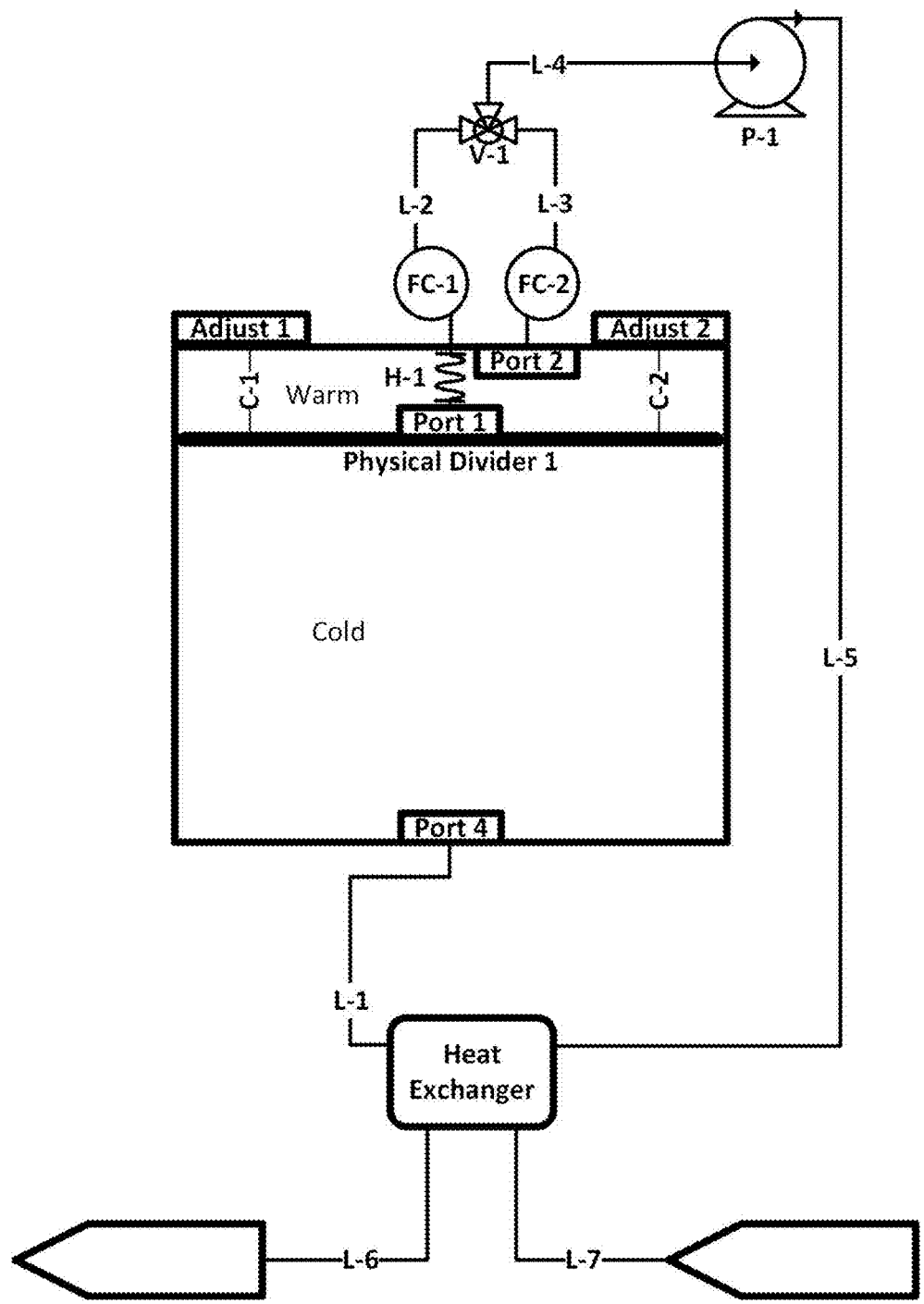
Figure 14 (Above)

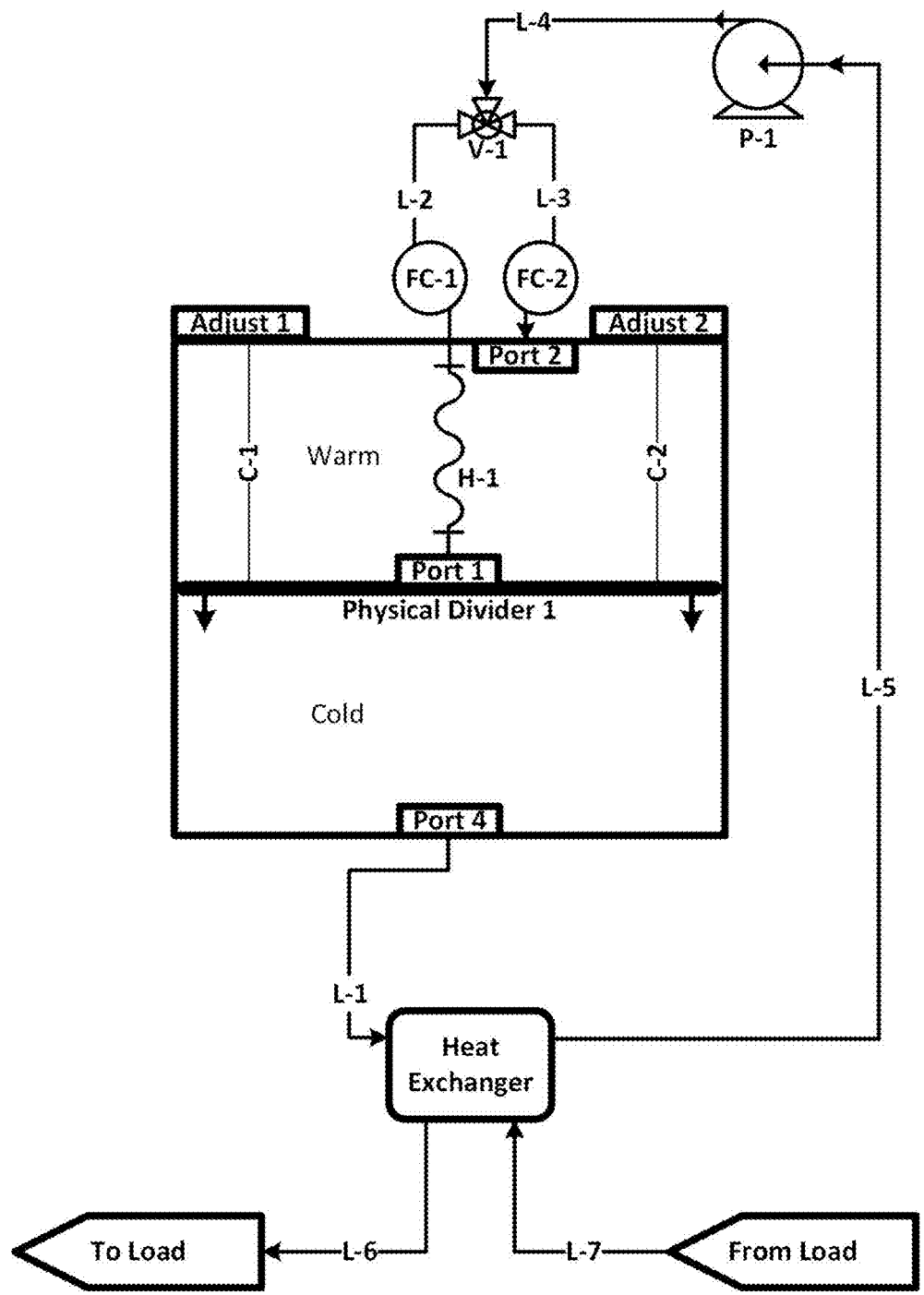
Figure 15 (Above)

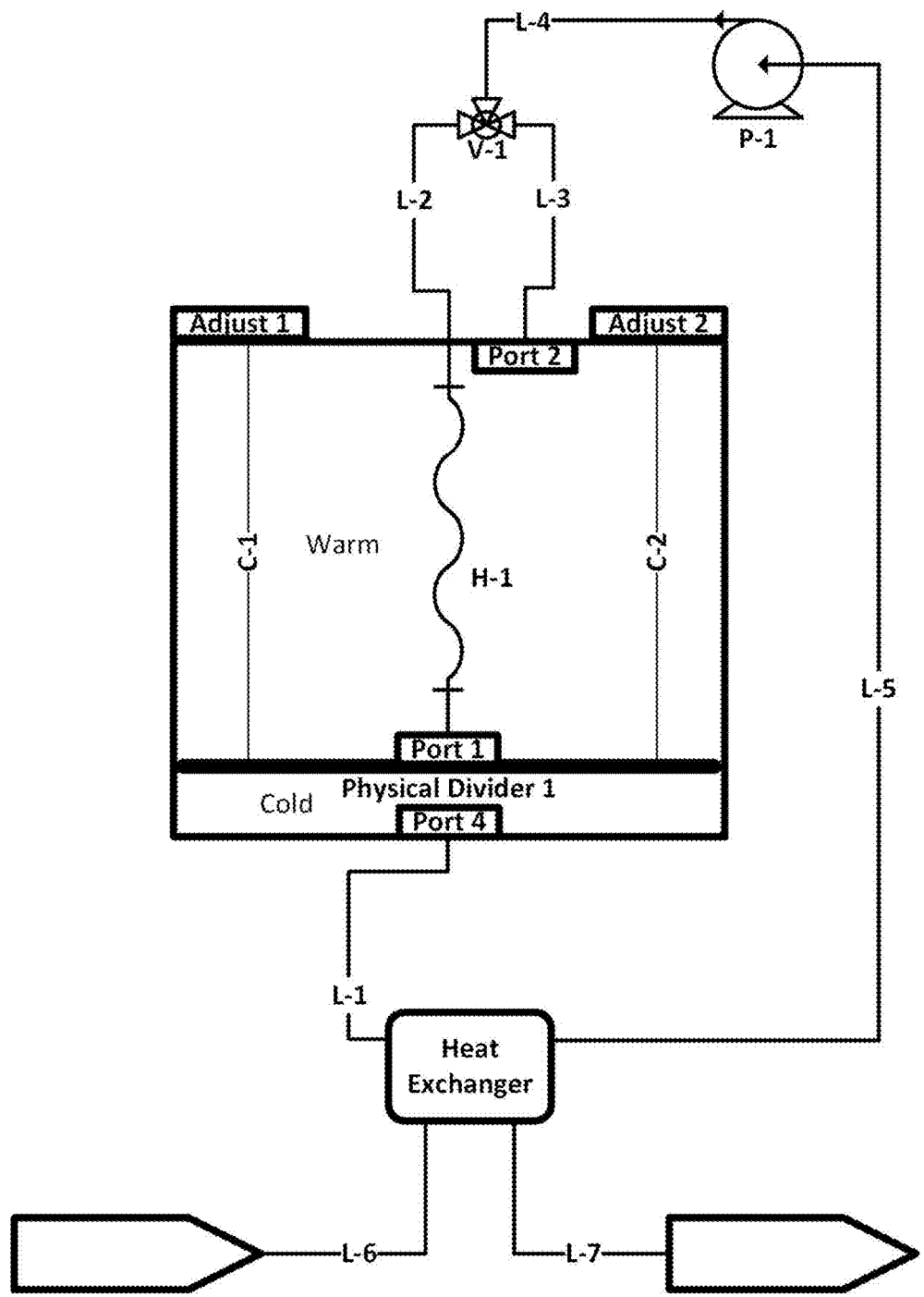
Figure 16 (Above)

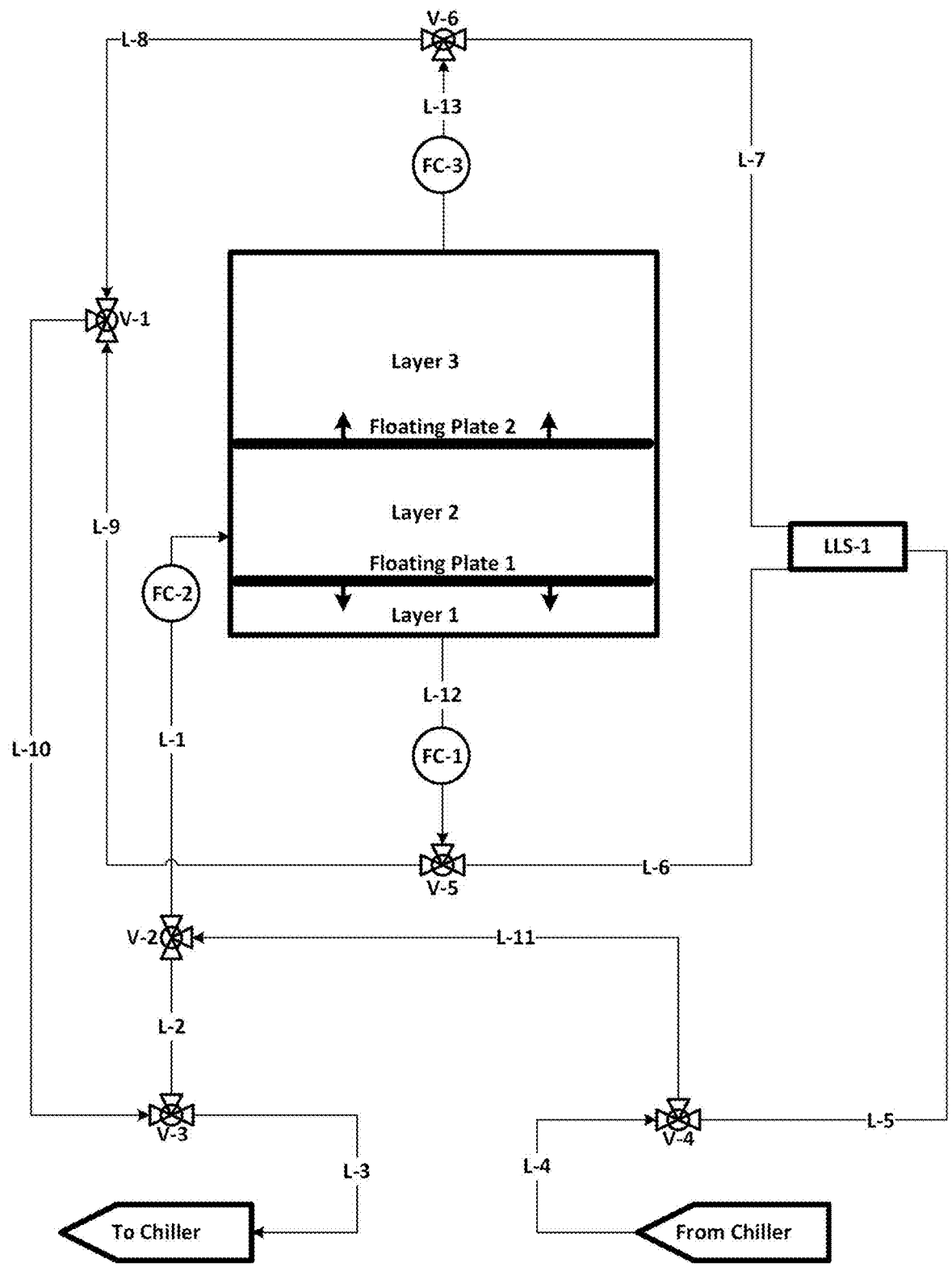
Figure 17 (Above)

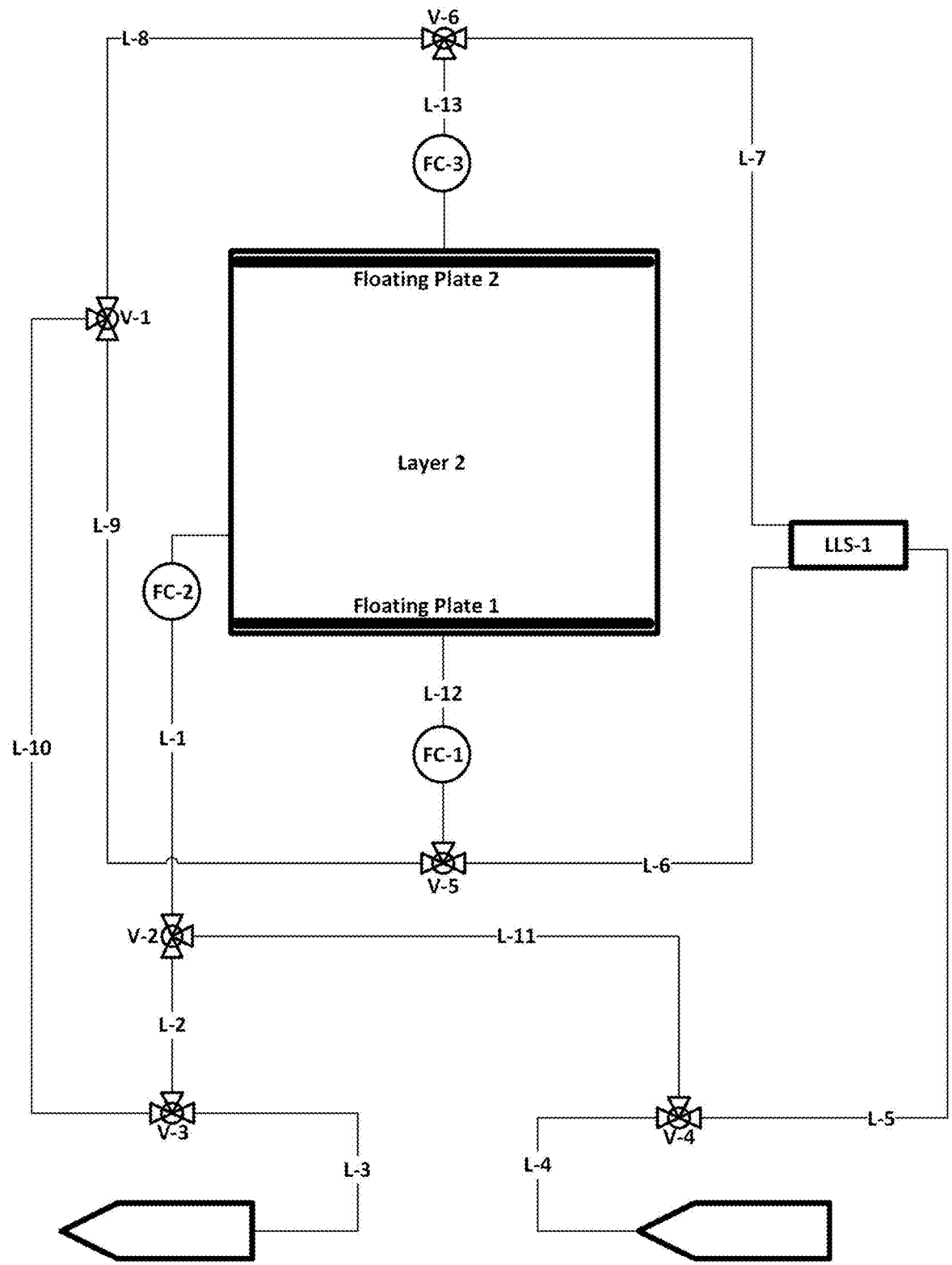
Figure 18 (Above)

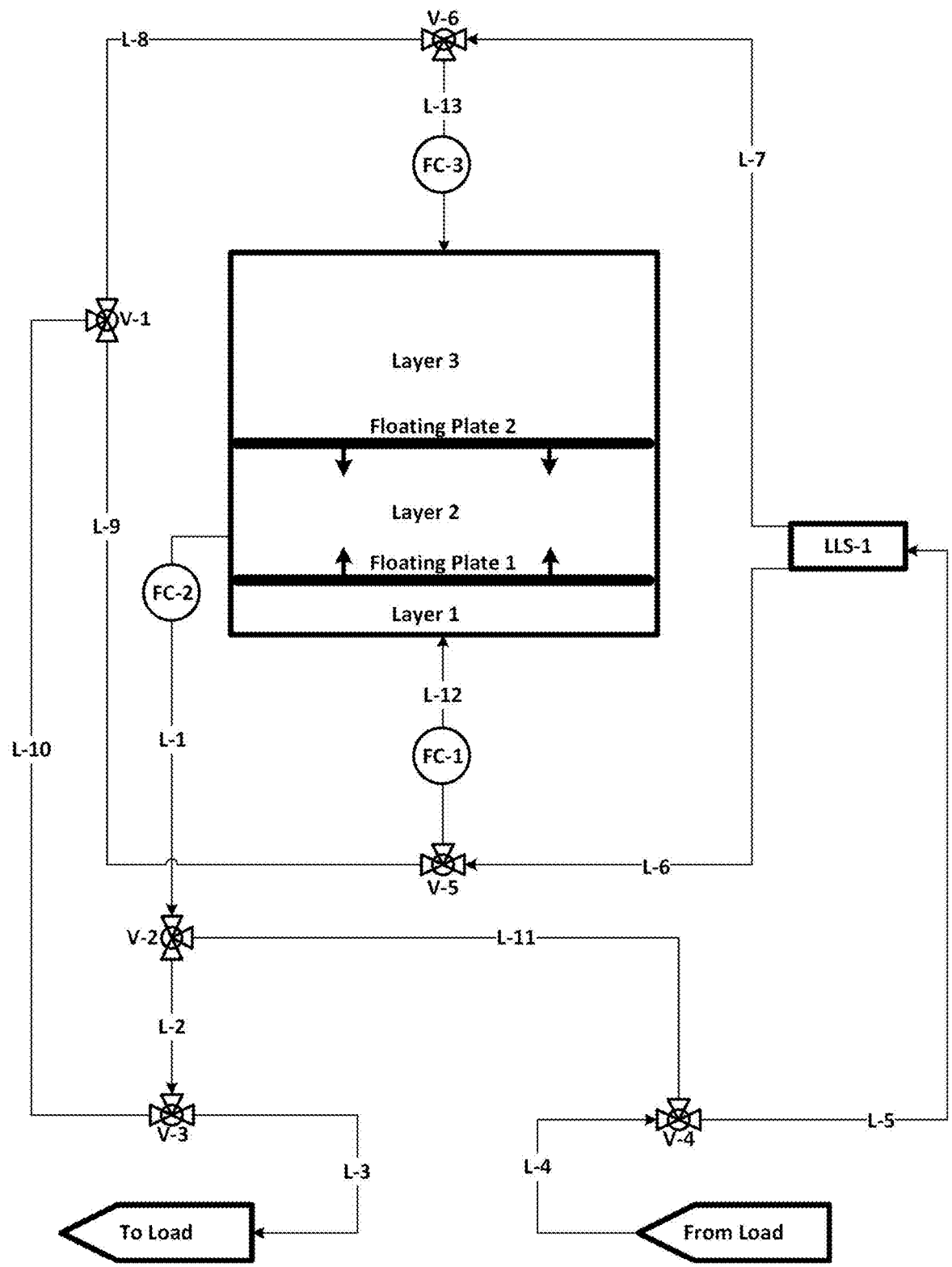
Figure 19 (Above)

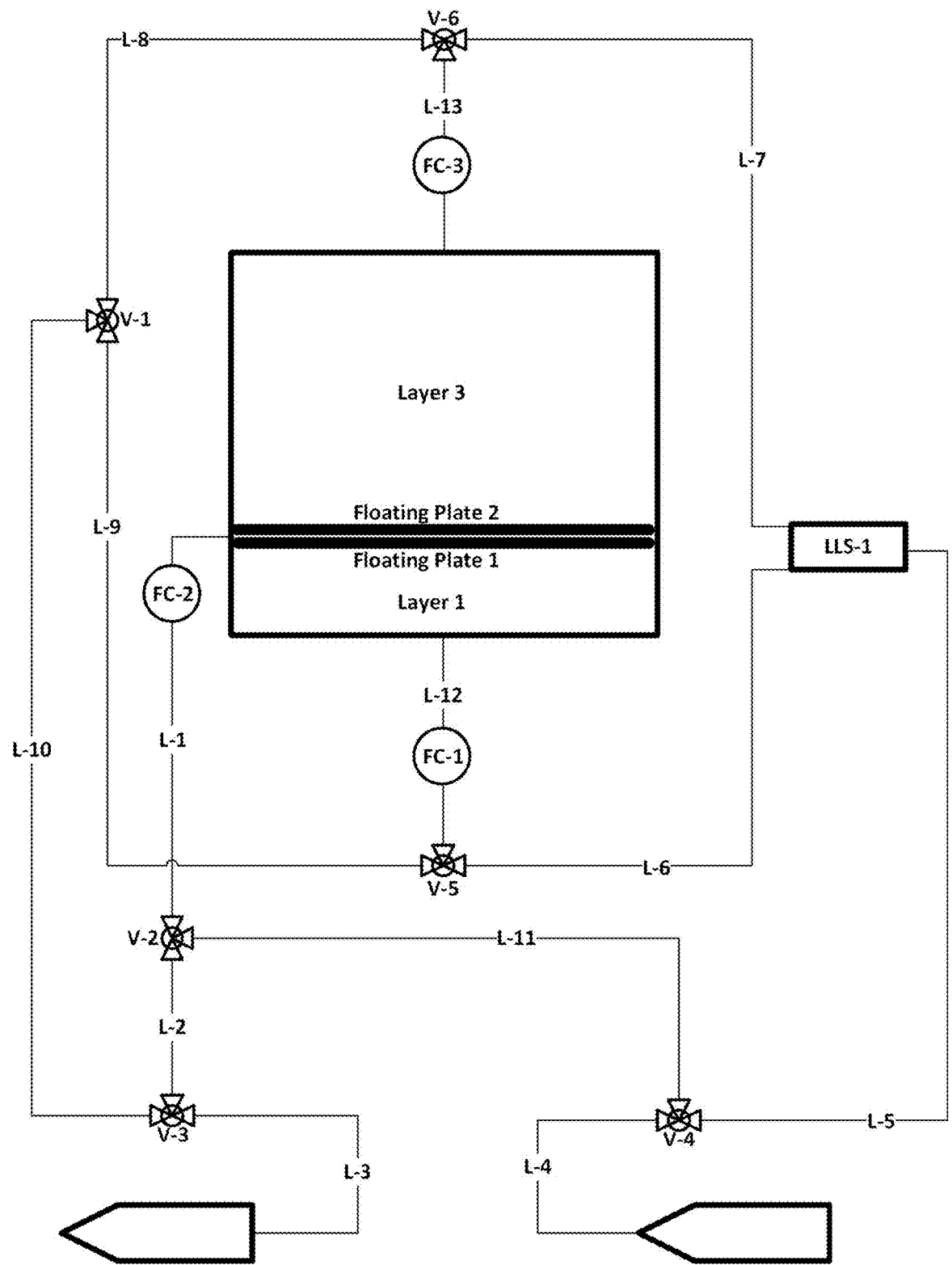
Figure 20 (Above)

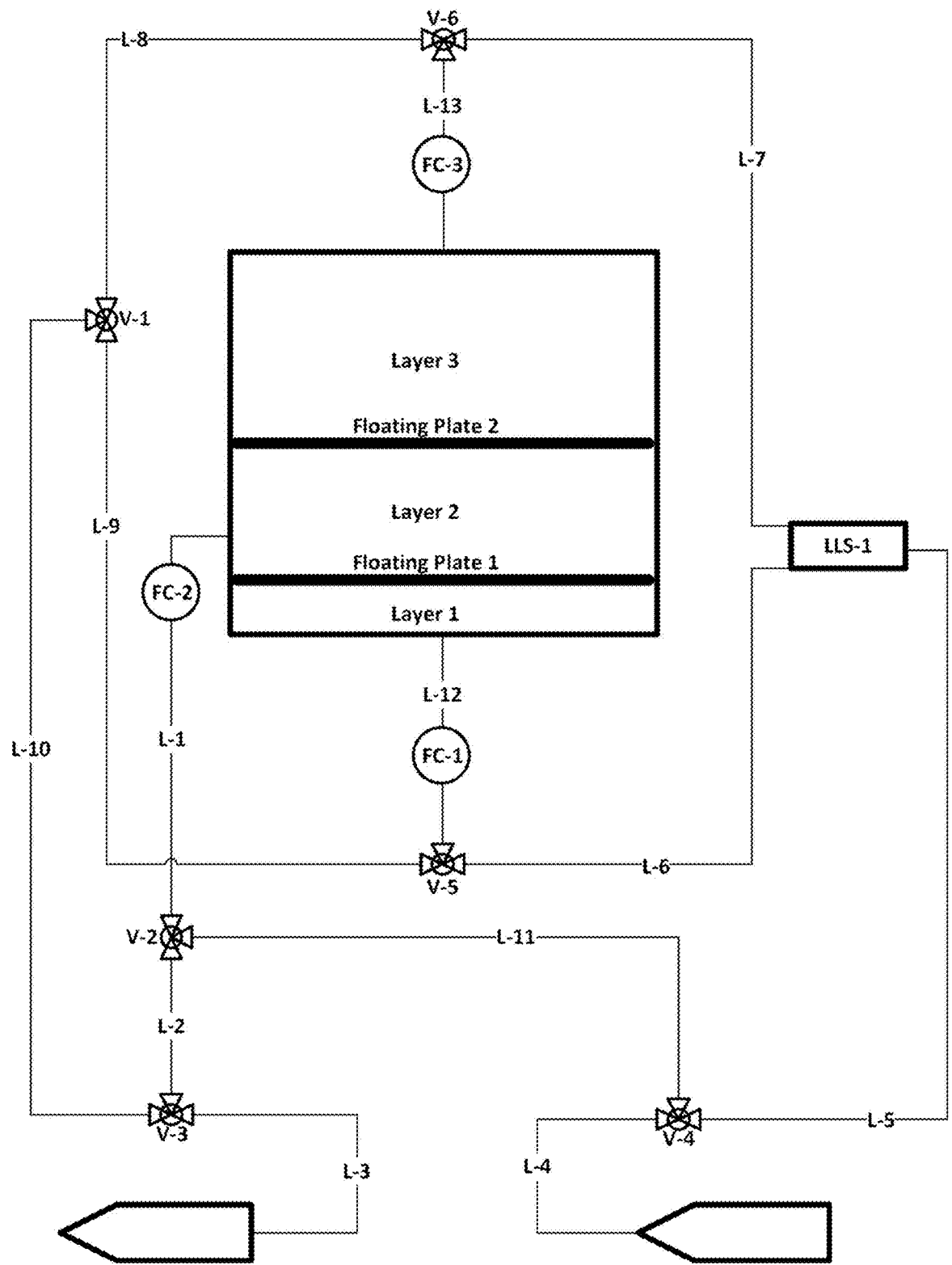
Figure 21 (Above)

US 11,905,453 B2

THERMAL STORAGE SYSTEMS AND METHODS

CROSS-REFERENCE TO RELATED APPLICATIONS

The present application claims priority to U.S. Provisional Application No. 63/295,300 filed on Dec. 30, 2021. The application also claims priority to pending U.S. application Ser. No. 17/166,700 which application is a continuation-in-part of U.S. application Ser. No. 16/826,469 filed Mar. 23, 2020. U.S. application Ser. No. 16/826,469 claims priority to U.S. provisional application numbers: 62/822,501 filed Mar. 22, 2019; 62/872,851 filed Jul. 11, 2019; 62/976,398 filed Feb. 14, 2020; 62/984,394 filed Mar. 3, 2020; 62/988,999 filed Mar. 13, 2020; 62/969,211 filed Feb. 3, 2020; and 62/969,774 filed Feb. 4, 2020.

This application also claims priority to pending U.S. application Ser. No. 17/008,165 filed Aug. 31, 2020 which application is continuation of Ser. No. 16/580,962 filed Sep. 24, 2019 which application is a continuation of Ser. No. 16/445,855 filed Jun. 19, 2019 which application is a continuation of U.S. Ser. No. 16/258,384 filed Jan. 25, 2019 which application claims priority to U.S. Provisional application numbers: 62/622,528 filed Jan. 26, 2018; 62/670,117 filed May 11, 2018; and 62/771,902 filed Nov. 27, 2018.

All of the aforementioned applications are incorporated herein by reference.

BACKGROUND AND SUMMARY OF THE INVENTION

There is a need for improved systems and methods for thermal storage, heat transfer, and thermal and physical property measurement and monitoring.

The present invention may pertain to systems and methods for thermal storage, heat transfer, and thermal and physical property measurement and monitoring. Some embodiments may be applicable to the storage of 'cold' or heat. Some embodiments may be applicable to higher energy density systems and methods for storing 'cold' or heat using a liquid phase thermal storage medium. Some embodiments may relate to the measurement of specific heat capacity, thermal conductivity, or other thermophysical properties. Some embodiments of the present invention may enable higher energy density liquid-based thermal storage and/or thermal storage with a wider range of possible operating temperatures and/or consistent thermal storage with multi-liquid phase liquids or complex liquid-liquid phase transition liquids. Some embodiments may pertain to thermal storage systems or methods employing liquid phases with multiple temperatures, or densities, or viscosities, or compositions, or any combination thereof. Some embodiments may pertain to thermal storage systems or methods employing physical dividers which may at least partially separate liquid-liquid phase transition liquids or liquid-liquid phase transition liquid phases by temperature, or density, or viscosity, or composition, or any combination thereof, for example, within a tank or storage region. Some embodiments may pertain to systems and methods for heat transfer.

BRIEF DESCRIPTION OF THE FIGURES

FIG. 1: Thermal storage with adjustable physical divider, cold region, and warm region undergoing charging.

FIG. 2: Thermal storage with adjustable physical divider, cold region, and warm region charged.

FIG. 3: Thermal storage with adjustable physical divider, cold region, and warm region undergoing discharging.

FIG. 4: Thermal storage with adjustable physical divider, cold region, and warm region discharged.

FIG. 5: Thermal storage with adjustable physical divider, cold region, and warm region with mixing in warm region undergoing charging.

FIG. 6: Thermal storage with adjustable physical divider, cold region, and warm region with mixing in warm region charged.

FIG. 7: Thermal storage with adjustable physical divider, cold region, and warm region with mixing in warm region undergoing discharging.

FIG. 8: Thermal storage with adjustable physical divider, cold region, and warm region with mixing in warm region discharged.

FIG. 9: Thermal storage with adjustable physical divider, port in physical divider, cold region, and warm region undergoing charging.

FIG. 10: Thermal storage with adjustable physical divider, port in physical divider, cold region, and warm region charged.

FIG. 11: Thermal storage with adjustable physical divider, port in physical divider, cold region, and warm region undergoing discharging.

FIG. 12: Thermal storage with adjustable physical divider, port in physical divider, cold region, and warm region discharged.

FIG. 13: Thermal storage with heat exchanger between the thermal storage system and chiller or thermal load, wherein the thermal storage system is undergoing charging.

FIG. 14: Thermal storage with heat exchanger between the thermal storage system and chiller or thermal load, wherein the thermal storage system is charged.

FIG. 15: Thermal storage with heat exchanger between the thermal storage system and chiller or thermal load, wherein the thermal storage system is undergoing discharging.

FIG. 16: Thermal storage with heat exchanger between the thermal storage system and chiller or thermal load, wherein the thermal storage system is discharged.

FIG. 17: Thermal storage system with three layers undergoing charging.

FIG. 18: Thermal storage system with three layers charged.

FIG. 19: Thermal storage system with three layers undergoing discharging.

FIG. 20: Thermal storage system with three layers discharged.

FIG. 21: Thermal storage system with three layers partially charged.

DETAILED DESCRIPTION

Some embodiments of the present invention may pertain to thermal storage employing liquids or liquid compositions which possess a liquid-liquid phase transition with a large enthalpy of liquid-liquid phase transition. In some embodiments, a liquid-liquid phase transition composition may absorb heat or release heat by undergoing changes in the number of liquid phases, or the chemical distribution between liquid phases, or the relative volume of liquid phases, or relative viscosity of liquid phases, or any combination thereof. In some embodiments, a liquid-liquid phase transition composition may absorb heat or release heat by undergoing changes in the number of liquid phases, or the chemical distribution between liquid phases, or chemical concentration in each liquid phase, or the relative volume of liquid phases, or relative viscosity of liquid phases, or any combination thereof, which may occur due to or during or in correlation with a change in temperature, or absorption of heat, or release of heat, or any combination thereof. In some embodiments, a liquid-liquid phase transition composition may undergo a liquid-liquid phase transition from a single liquid phase state to a multi-liquid phase state. In some embodiments, a liquid-liquid phase transition composition may undergo a liquid-liquid phase transition from a multi-liquid phase state to a single liquid phase state. In some embodiments, a liquid-liquid phase transition composition may undergo a liquid-liquid phase transition from a multi-liquid phase state to a multi-liquid phase state. In some embodiments, a liquid-liquid phase transition composition may undergo a liquid-liquid phase transition with an enthalpy of liquid-liquid phase transition if heating or cooling the liquid-liquid phase transition composition within or through a liquid-liquid phase transition temperature range while the liquid-liquid phase transition composition is mixed, or agitated, or undergoing mixing, or undergoing agitation.

In some embodiments, it may be desirable for the liquid-liquid phase transition composition to possess an enthalpy of liquid-liquid phase transition. An enthalpy of liquid-liquid phase transition may comprise heat absorbed or released by a liquid-liquid phase transition composition while undergoing a liquid-liquid phase transition. An enthalpy of liquid-liquid phase transition may refer to the heat absorbed or released by the liquid-liquid phase transition. In some embodiments, an enthalpy of phase transition may be measured by supplying a known amount of heat to a known mass of a liquid-liquid phase transition composition sample in or through an enthalpy of liquid-liquid phase transition temperature range and measuring the change in temperature of the sample to calculate an effective specific heat capacity. The enthalpy of liquid-liquid phase transition in the temperature range of the testing may comprise the effective specific heat capacity of the sample minus the specific heat capacity of the chemical constituents of the liquid-liquid phase transition composition. In other words, the enthalpy of liquid-liquid phase transition may comprise the additional heat absorbed or released beyond the heat capacity of the uncombined or unconnected or unbundled or unmixed or isolated or separate chemical constituents. It is important to note that, in some embodiments, a liquid-liquid phase transition composition may store thermal energy both in the form of enthalpy of liquid-liquid phase transition and specific heat capacity, wherein the combined or total thermal storage capacity of the enthalpy of liquid-liquid phase transition plus specific heat capacity may be significantly greater than other thermal storage liquids or compositions which store thermal energy in specific heat capacity.

In some embodiments, a significant proportion of the thermal energy stored by a thermal storage system may comprise the enthalpy of liquid-liquid phase transition. For example, in some embodiments, greater than 5%, or greater than 10%, or greater than 20%, or greater than 30%, or greater than 40%, or greater than 50%, or any combination thereof of the thermal energy storage in a thermal storage system may comprise enthalpy of liquid-liquid phase transition. It may be of great importance to store the liquid-liquid phase transition compositions in a thermal storage system such that the enthalpy of liquid-liquid phase transition is realized or provided to the desired cooling or heating application when the thermal storage system is discharged or when transferring heat from or to an application requiring cooling or heating.

For example, in some embodiments, a liquid-liquid phase transition composition may comprise a multi-liquid phase state or may be stored at a multi-liquid phase state. For example, if a liquid-liquid phase transition composition is at a multi-liquid phase state, the enthalpy of liquid-liquid phase transition may be influenced by the amount or distribution of each liquid phase in the composition. For example, changing the amount or distribution of each liquid phase in a liquid-liquid phase transition composition may result in a different enthalpy of liquid-liquid phase transition and/or other different thermal properties, than, for example, the liquid-liquid phase transition composition at its original amount or distribution of each liquid phase. For example, if at portion of one liquid phase is removed from a liquid-liquid phase transition composition at a multi-liquid phase state, the enthalpy of liquid-liquid phase transition, or liquid-liquid phase transition temperature range, or other thermal properties, or any combination thereof of the resulting composition may be different. For example, a liquid-liquid phase transition composition at a multi-liquid phase state may settle into zones of higher concentration of one liquid phase than another liquid phase when stored, which, if not properly monitored or measured, may result in ineffective realization of the enthalpy of liquid-liquid phase transition or a different enthalpy of liquid-liquid phase transition. For example, if the bulk composition of a liquid-liquid phase transition liquid composition sample is different from the desired bulk composition of the liquid-liquid phase transition composition, then the enthalpy of liquid-liquid phase transition and/or effective specific heat capacity and/or other thermal properties of the sample may be different from the enthalpy of liquid-liquid phase transition and/or effective specific heat capacity and/or other thermal properties of the desired bulk composition of the liquid-liquid phase transition composition.

It may be desirable to store liquid-liquid phase transition compositions such that the bulk composition of the liquid-liquid phase transition composition is controllable or consistent. For example, it may be desirable to store a liquid-liquid phase transition composition such that when a portion of the liquid-liquid phase transition composition is removed or transferred from storage, the portion removed or transferred from storage comprises the desired bulk composition.

For example, some embodiments may store liquid-liquid phase transition compositions such that the bulk composition of the liquid-liquid phase transition liquid is controllable or consistent by, for example, ensuring a composition at a multi-liquid phase state comprises dispersed liquid phases while in storage, or before removal or transfer from storage, or any combination thereof. For example, some embodiments may involve storing a liquid-liquid phase transition composition comprising a multi-liquid phase state, or at a state comprising two or more or liquid phases, such that the liquid phases are distributed or dispersed. For example, some embodiments may involve storing a liquid-liquid phase transition composition comprising a multi-liquid phase state, or at a state comprising two or more or liquid phases, such that the liquid phases are distributed or dispersed. For example, some embodiments may involve storing a liquid-liquid phase transition composition comprising a multi-liquid phase state, or at a state comprising two or more or liquid phases which may include, but are not limited to, one or more or any combination of the following systems and/or methods:

For example, in some embodiments, a liquid-liquid phase transition composition comprising multiple liquid phases or more than one liquid phase may be actively mixed or agitated before transfer into a storage region, or during transfer into a storage region, or within a storage region, or during transfer from a storage region, or after transfer from a storage region, or any combination thereof. For example, active mixing or agitation may comprise mechanical mixing. In some embodiments, mixing may be conducted before a storage region. For example, in some embodiments, mixing may be conducted to enable or facilitate the formation of an emulsion, and/or wherein the formed emulsion may be stored in a storage region. For example, in some embodiments, a high shear disperser may be employed to form an emulsion or dispersed mixer in a portion of the liquid-liquid phase transition composition before or while transferring said portion of the liquid-liquid phase transition composition into storage. In some embodiments, mixing may be conducted within a storage region. For example, in some embodiments, mixing may operate continuously. In some embodiments, mixing may operate when the particle density decreases below a certain level or threshold. In some embodiments, mixing may operate when the opacity of a portion of the thermal storage tank decreases below a certain level or threshold. In some embodiments, mixing may operate when the average droplet size is greater than a level or threshold or size. In some embodiments, mixing may operate when the opacity of the solution is less than a level or threshold. For example, in some embodiments, the opacity, or droplet size, or cloudiness may be measured using, for example, including, but not limited to, one or more or any combination of the following: turbidimetry, or neutron scattering, or microcalorimetric study, or low-angle light scattering measurements, or particle counting measurements, or particle counting method. In some embodiments, particle density may be a measurement for droplet density in a liquid-liquid mixture. For example, in some embodiments, mixing may be initiated or accelerated if the number of particles per cubic centimeter decreases below 100 particles per cubic centimeter (ppCC), or 200 ppCC, or 300 ppCC, or 400 ppCC, or 450 ppCC, or 500 ppCC, or 550 ppCC, or 600 ppCC, or 650 ppCC, or 700 ppCC, or 750 ppCC, or 800 ppCC, or 850 ppCC, or 900 ppCC, or 950 ppCC, or 1,000 ppCC in a portion of the liquid-liquid phase transition composition compared to a fully dispersed composition or a benchmark solution or benchmark composition. For example, in some embodiments, mixing may be initiated or accelerated if the number of particles per cubic centimeter decreases by greater than 5 particles per cubic centimeter (ppCC), or 10 ppCC, or 20 ppCC, or 30 ppCC, or 40 ppCC, or 50 ppCC, or 60 ppCC, or 70 ppCC, or 80 ppCC, or 90 ppCC, or 100 ppCC, or 125 ppCC, or 150 ppCC, or 175 ppCC, or 200 ppCC, or 225 ppCC, or 250 ppCC, or 275 ppCC, or 300 ppCC, or 400 ppCC, or 500 ppCC in a portion of the liquid-liquid phase transition composition compared to a fully dispersed composition or a benchmark solution or benchmark composition. In some embodiments, mixing may operate before a portion of the stored composition is removed or transferred from storage to, for example, ensure the bulk composition of the removed or transferred portion is consistent with the desired bulk composition or comprises the desired bulk composition. For example, if a portion of liquid-liquid phase transition composition at a multi-liquid phase state is planned to be transferred, it may be desirable to mix or agitate at least a portion of said liquid-liquid phase transition composition at a multi-liquid phase state before transfer of a portion of the liquid-liquid phase transition composition or during transfer of a portion of the liquid-liquid phase transition composition. In some embodiments, mixing may operate while a portion of the stored composition is removed or transferred from storage to, for example, ensure the bulk composition of the removed or transferred portion may be consistent with a desired bulk composition or may comprise a desired bulk composition. In some embodiments, the rate of mixing or agitation may be adjusted or may vary. For example, in some embodiments, the rate of agitation or mixing may be accelerated or increased if, for example, the average droplet size exceeds a certain level, or if a portion of the liquid-liquid phase transition composition may be transferred, or any combination thereof. For example, in some embodiments, the rate of agitation or mixing may be accelerated or increased in advance of transfer of at least a portion of liquid-liquid phase transition composition. For example, in some embodiments, the rate of agitation or mixing may be accelerated or increased in advance of transfer of at least a portion of liquid-liquid phase transition composition by 30 seconds, or 1 minute, or 2 minutes, or 3 minutes, or 5 minutes, or 10 minutes, or 15 minutes, or 20 minutes, or 25 minutes, or 30 minutes, or the time required to achieve the desired distribution or dispersion of liquid phases, or the time required to achieve the desired bulk composition in the portion of liquid-liquid phase transition composition transferred, or any combination thereof.

For example, in some embodiments, a liquid-liquid phase transition composition comprising multiple liquid phases or more than one liquid phase may comprise liquid phases of similar density. For example, in some embodiments, each liquid phase of a liquid-liquid phase transition composition may differ by, for example, less than or equal to 0.01 kilogram per liter (kg/L), or 0.02 kg/L, or 0.03 kg/L, or 0.04 kg/L, or 0.05 kg/L, or 0.06 kg/L, or 0.07 kg/L, or 0.08 kg/L, or 0.09 kg/L, or 0.10 kg/L, or 0.11 kg/L, or 0.12 kg/L, or 0.13 kg/L, or 0.14 kg/L, or 0.15 kg/L, or any combination thereof. For example, if a liquid-liquid phase transition composition is at a multi-liquid phase state and/or the liquid phases possess similar densities, the liquid phases may possess a greater propensity to disperse, or may require less mixing or agitation to disperse, or may require less frequent mixing or agitation to disperse, or any combination thereof.

For example, in some embodiments, a liquid-liquid phase transition composition comprising multiple liquid phases or more than one liquid phase may comprise chemical dispersants or emulsifiers. In some embodiments, said chemical dispersants or emulsifiers may facilitate or enable multiple liquid phases to remain or exist at a dispersed or emulsified state. In some embodiments, said chemical dispersants or emulsifiers may facilitate or enable multiple liquid phases to remain or exist at a dispersed or emulsified state with less frequent mixing, or with a lower rate of mixing, or without mixing, or any combination thereof. In some embodiments, said chemical dispersants or emulsifiers may facilitate or enable multiple liquid phases to remain or exist at a dispersed or emulsified state with less frequent mixing, or with a lower rate of mixing, or without mixing, or any combination thereof, compared to, for example, the same liquid-liquid phase transition composition without chemical dispersants or emulsifiers. In some embodiments, chemical dispersants or emulsifiers may be added before or during storage and/or removed after or during storage. In some embodiments, chemical dispersants or emulsifiers may comprise a chemical constituent of the liquid-liquid phase transition composition and/or may remain in the liquid-liquid phase transition composition before, or during, or after, or any combination thereof storage.

In some embodiments, liquid-liquid phase transition liquid may be stored as cold liquid-liquid phase transition composition and warm thermal storage composition. In some embodiments, the bulk composition of the cold liquid-liquid phase transition composition may be about the same as the bulk composition of the warm liquid-liquid phase transition composition. In some embodiments, the bulk composition of the cold liquid-liquid phase transition composition may be about the same as the bulk composition of the warm liquid-liquid phase transition composition, wherein the cold liquid-liquid phase transition composition may differ from the warm liquid-liquid phase transition composition in its temperature and the distribution, or composition, or concentration, or number, or any combination thereof of liquid phases. In some embodiments, the cold liquid-liquid phase transition composition may be at a single liquid phase state, while the warm liquid-liquid phase transition composition may be at a multi-liquid phase state. In some embodiments, the cold liquid-liquid phase transition composition may be at a multi-liquid phase state, while the warm liquid-liquid phase transition composition may be at a multi-liquid phase state. In some embodiments, the cold liquid-liquid phase transition composition may be at a multi-liquid phase state, while the warm liquid-liquid phase transition composition may be at a single liquid phase state. In some embodiments, the cold liquid-liquid phase transition composition may be at a multi-liquid phase state, while the warm liquid-liquid phase transition composition may be at a multi-liquid phase state, and/or the distribution, or composition, or concentration, or number, or any combination thereof of liquid phases in the cold liquid-liquid phase transition composition may differ from the distribution, or composition, or concentration, or number, or any combination thereof of liquid phases in the warm liquid-liquid phase transition composition. In some embodiments, warm liquid-liquid phase transition composition may comprise cold liquid-liquid phase transition composition after being heated to a higher temperature. In some embodiments, cold liquid-liquid phase transition composition may comprise warm liquid-liquid phase transition composition after being cooled to a lower temperature. In some embodiments, warm liquid-liquid phase transition composition may comprise the same bulk chemical composition as cold liquid-liquid phase transition composition, except warm liquid-liquid phase transition composition may be at a higher temperature than cold liquid-liquid phase transition composition. In some embodiments, the warm liquid-liquid phase transition composition may be greater than the temperature of the cold liquid-liquid phase transition composition by at least the temperature difference of the enthalpy of liquid-liquid phase transition temperature range. In some embodiments, the warm liquid-liquid phase transition composition may be greater than the temperature of the cold liquid-liquid phase transition composition by a temperature difference within or less than the enthalpy of liquid-liquid phase transition temperature range. In some embodiments, the warm liquid-liquid phase transition composition may be greater than the temperature of the cold liquid-liquid phase transition composition by a temperature difference greater than 1° K, or 2° K, or 3° K, or 4° K, or 5° K, or any combination thereof. In some embodiments, the warm thermal storage region may be greater than the temperature of the cold thermal storage region by a temperature difference greater than 1° K, or 2° K, or 3° K, or 4° K, or 5° K, or any combination thereof.

In some embodiments, a portion of warm liquid-liquid phase transition composition may be transformed into a portion of cold liquid-liquid phase transition composition by transferring and/or cooling the warm liquid-liquid phase transition composition. For example, in some embodiments, in a heat transfer system or a thermal storage system, warm liquid-liquid phase transition composition may be cooled by a heat exchanger, or heat sink, or a chiller, or an application requiring heating, or a thermal load, or any combination thereof and/or may be transformed into cold liquid-liquid phase transition composition. In some embodiments, a portion of cold liquid-liquid phase transition composition may be transformed into a portion of warm liquid-liquid phase transition composition by transferring and/or heating the cold liquid-liquid phase transition composition. For example, in some embodiments, in a heat transfer system or a thermal storage system, cold liquid-liquid phase transition composition may be heated by a heat exchanger, or a cooling load, or a thermal load, or an application requiring cooling, or a heater, or a heat source, or any combination thereof and/or may be transformed into warm liquid-liquid phase transition composition. In some embodiments, the relative amounts or volumes of cold liquid-liquid phase transition composition and warm liquid-liquid phase transition composition may change, while the total amount or volume of liquid-liquid phase transition composition in the system may remain relatively consistent. For example, if a thermal storage system is employed for storing 'cold' or for cooling applications, during charging, the volume of cold liquid-liquid phase transition composition may increase while the volume of warm liquid-liquid phase transition composition may decrease because at least a portion of warm liquid-liquid phase transition composition may be transformed into cold liquid-liquid phase transition composition. For example, if a thermal storage system is employed for storing 'cold' or for cooling applications, during discharging, the volume of cold liquid-liquid phase transition composition may decrease while the volume of warm liquid-liquid phase transition composition may increase because at least a portion of cold liquid-liquid phase transition composition may be transformed into warm liquid-liquid phase transition composition.

In some embodiments, the cold liquid-liquid phase transition composition may be stored in a separate container or storage tank from the warm liquid-liquid phase transition composition. In some embodiments, the cold liquid-liquid phase transition composition may be stored in the same container or storage tank as the warm liquid-liquid phase transition composition. In some embodiments, the cold liquid-liquid phase transition composition may be stored in a separate region of the same container or storage tank as the warm liquid-liquid phase transition composition. In some embodiments, the cold liquid-liquid phase transition composition may be stored in the cold region of a container or storage tank and the warm liquid-liquid phase transition composition may be stored in the warm region of a container or storage tank. In some embodiments, if at least a portion of the cold liquid-liquid phase transition composition is stored in the same container or storage tank as at least a portion of the warm liquid-liquid phase transition composition, then it may be desirable to separate or isolate or segregate at least a portion of the stored warm liquid-liquid phase transition composition from at least a portion of the stored cold liquid-liquid phase transition composition. For example, it may be desirable to at least partially separate or isolate or segregate at least a portion of the stored warm liquid-liquid phase transition composition from at least a portion of the stored cold liquid-liquid phase transition composition to, for example, prevent mixing of temperatures, or dissolution between liquid phases, or settling or floating of liquid phases between temperature regions, or settling or floating of liquid phases between the warm region and the cold region, or any combination thereof.

In some embodiments, the warm thermal storage region may comprise the portion of a thermal storage system or tank comprising warm liquid-liquid phase transition composition and the cold thermal storage region may comprise the portion of a thermal storage system or tank comprising cold liquid-liquid phase transition composition.

In some embodiments, the warm liquid-liquid phase transition composition may be at least partially separated or isolated or segregated from the cold liquid-liquid phase transition composition by a physical divider or barrier. In some embodiments, the relative volume of the warm liquid-liquid phase transition composition to the cold liquid-liquid phase transition composition may change during operation. In some embodiments, it may be desirable for the position or elevation of the physical divider to be adjustable and/or adjusted to correspond to or correlate with changes in the volume or relative volume of cold liquid-liquid phase transition composition and warm liquid-liquid phase transition composition. It may be desirable for the physical divider to be located between the warm thermal storage region and the cold thermal storage region, or between the stored warm liquid-liquid phase transition composition and the storage cold liquid-liquid phase transition composition, or any combination thereof.

In some embodiments, it may be desirable for mixing or agitation to be available in or present in a thermal storage region. For example, in some embodiments, mixing or agitation may be available in or present in thermal storage regions where the liquid-liquid phase transition composition is at a multi-liquid phase state. For example, in some embodiments, mixing or agitation may be available in or present in each thermal storage region to provide mixing or agitation if needed regardless of the number of liquid phases in a liquid-liquid phase transition composition. In some embodiments, it may be desirable for the physical divider to substantially prevent or minimize unintended transfer of warm liquid-liquid phase transition composition in the warm thermal storage region into the cold thermal storage region and/or unintended transfer of cold liquid-liquid phase transition composition in the cold thermal storage region into the warm thermal storage region. For example, in some embodiments, it may be desirable for the physical divider possess physical contact with the walls or sides of a storage vessel or storage tank to, for example, minimize or prevent intrusion of warm liquid-liquid phase transition composition into the cold thermal storage region, or cold liquid-liquid phase transition composition into the warm thermal storage region, or any combination thereof.

In some embodiments, a liquid-liquid phase transition composition comprising a multi-liquid phase mixture may be at least partially separated into its constituent liquid phases before storage or during storage. In some embodiments, for example, liquid phases may be separated or differentiated by physical properties, which may include, but are not limited to, one or more or any combination of the following: density, or solubility, or temperature, or viscosity, or physical state. In some embodiments, a thermal storage tank may comprise multiple cold thermal storage regions and/or multiple warm thermal storage regions. In some embodiments, a thermal storage region may comprise one liquid phase separated from a liquid-liquid phase transition composition at a multi-liquid phase state. In some embodiments, a portion of separated liquid phases may be combined to form a liquid-liquid phase transition composition when transferring liquid-liquid phase transition composition from a thermal storage tank or vessel.

In some embodiments, liquid-liquid phase transition compositions phase transition from a multi-liquid phase state to a multi-liquid phase state. In some embodiments, an enthalpy of phase transition may occur in a liquid-liquid phase transition from a multi-liquid phase state to a multi-liquid phase state. In some embodiments, the liquid-liquid phase transition may occur from a multi-liquid phase state to a multi-liquid phase state, wherein the number of liquid phases, or the chemical distribution between liquid phases, or chemical concentration in each liquid phase, or the relative volume of liquid phases, or relative viscosity of liquid phases, or any combination thereof may change during the liquid-liquid phase transition. For example, in some embodiments, a cold liquid-liquid phase transition composition below a liquid-liquid phase transition temperature range may be at a multi-liquid phase state, which may mean the cold liquid-liquid phase transition composition comprises two or more liquid phases. For example, in some embodiments, a cold liquid-liquid phase transition composition below a liquid-liquid phase transition temperature range may be at a multi-liquid phase state and, when heated in or through or to a temperature above a liquid-liquid phase transition temperature range, may transform into warm liquid-liquid phase transition composition at a multi-liquid phase state in, or at, or above a liquid-liquid phase transition temperature range.

EXAMPLE FIGURE KEYS

| Label | Description |
|---|---|
| FIGS. 1-4 Example FIG. Key | |
| From Chiller | Cold heat transfer fluid or thermal storage fluid, such as cold liquid-liquid phase transition composition, transferred from a cold source or heat sink, such as a chiller or an application requiring heating, to the thermal storage tank. |

| Label | Description |
| --- | --- |
| To Load | Cold heat transfer fluid or thermal storage fluid, such as cold liquid-liquid phase transition composition, transferred from a thermal storage tank to an application requiring cooling, or a heat source. |
| L-1 | Cold heat transfer fluid or thermal storage fluid, such as cold liquid-liquid phase transition composition, transferred from a cold source, or heat sink, such as a chiller or an application requiring heating, to the thermal storage tank or the cold thermal storage region of the thermal storage tank, or transferred from a thermal storage tank or the cold thermal storage region of the thermal storage tank to an application requiring cooling, or a thermal load, or a heat source. |
| FC-1 | Flow controller, which may control the flow rate of heat transfer fluid or thermal storage fluid, such as cold liquid-liquid phase transition composition, entering or exiting the thermal storage tank or the cold thermal storage region of the thermal storage tank. |
| Port 4 | Port which cold liquid-liquid phase transition composition is transferred into or out of the thermal storage tank or the cold thermal storage region of the thermal storage tank. |
| Cold | The cold thermal storage region of the thermal storage tank. |
| Physical Divider 1 | Barrier or plate which may physically separate, or be located between, or delineate, or any combination thereof the cold thermal storage region from the warm thermal storage region. The position or elevation physical divider may be adjustable. For example, the position or elevation of the physical divider may be adjusted to reflect the volume or level of the cold thermal storage region and/or the volume or level of the warm thermal storage region. |
| Warm | The warm thermal storage region of the thermal storage tank. |
| C-1 | Cable 1, which may comprise a cable employed to adjust the elevation of the physical divider in the thermal storage tank. |
| C-2 | Cable 2, which may comprise a cable employed to adjust the elevation of the physical divider in the thermal storage tank. |
| Adjust 1 | An adjustment mechanism which may be employed to adjust the elevation of the physical divider. For example, Adjust 1 may comprise a pulley, or a motor, or a winch, or any combination thereof which may adjust the length of C-1 to adjust elevation or position of the Physical Divider. The adjustment mechanism may utilize information, or data, or sensor data on the volume of the cold thermal storage region, or the volume of the warm thermal storage region, or the flow rate of cold liquid-liquid phase transition composition, or the flow rate of warm liquid-liquid phase transition composition, or information on the geometry and dimensions of the thermal storage tank, or information on the geometry and dimensions of the physical divider, or any combination thereof to adjust the position or elevation of the physical divider. |
| Adjust 2 | An adjustment mechanism which may be employed to adjust the elevation of the physical divider. For example, Adjust 2 may comprise a pulley, or a motor, or a winch, or any combination thereof which may adjust the length of C-2 to adjust elevation or position of the Physical Divider. The adjustment mechanism may utilize information, or data, or sensor data on the volume of the cold thermal storage region, or the volume of the warm thermal storage region, or the flow rate of cold liquid-liquid phase transition composition, or the flow rate of warm liquid-liquid phase transition composition, or information on the geometry and dimensions of the thermal storage tank, or information on the geometry and dimensions of the physical divider, or any combination thereof to adjust the position or elevation of the physical divider. |
| Port 2 | Port which cold liquid-liquid phase transition composition is transferred into or out of the thermal storage tank or the cold thermal storage region of the thermal storage tank. |
| FC-2 | Flow controller, which may control the flow rate of heat transfer fluid or thermal storage fluid, such as cold liquid-liquid phase transition composition, entering or exiting the thermal storage tank or the cold thermal storage region of the thermal storage tank. |
| L-2 | Warm heat transfer fluid or thermal storage fluid, such as warm liquid-liquid phase transition composition, transferred from a heat source or thermal load, such as an application requiring cooling or a heater, to the thermal storage tank or the warm thermal storage region of the thermal storage tank, or transferred from a thermal storage tank or the warm thermal storage region of the thermal storage tank to a chiller, or a cold source, or heat sink, or an application requiring heating. |
| To Chiller | Warm heat transfer fluid or thermal storage fluid, such as warm liquid-liquid phase transition composition, transferred from a warm thermal storage region of a thermal storage tank to a cooling source or heat sink, such as a chiller or an application requiring heating. |
| From Load | Warm heat transfer fluid or thermal storage fluid, such as warm liquid-liquid phase transition composition, transferred from a heat source or an application requiring cooling to a warm thermal storage region of a thermal storage tank. |

| Label | Description |
|---|---|
| | FIGS. 5-8 Example FIG. Key |
| L-3 | Warm heat transfer fluid or thermal storage fluid, such as warm liquid-liquid phase transition composition, transferred from a heat source or thermal load, such as an application requiring cooling or a heater, to the thermal storage tank or the warm thermal storage region of the thermal storage tank, or transferred from a thermal storage tank or the warm thermal storage region of the thermal storage tank to a chiller, or a cold source, or heat sink, or an application requiring heating. |
| V-2 | V-2 may comprise a valve which transfers heat transfer fluid or thermal storage fluid, such as liquid-liquid phase transition composition, to or from a Thermal Load or a Chiller, and/or to or from a warm thermal storage region. |
| L-5 | Warm heat transfer fluid or thermal storage fluid, such as warm liquid-liquid phase transition composition, transferred to from a thermal load or application requiring cooling to V-2. |
| Thermal Load | Thermal load may comprise an application requiring cooling or heating. In the present figures, a thermal load may comprise an application requiring cooling. |
| L-6 | Cold heat transfer fluid or thermal storage fluid, such as warm liquid-liquid phase transition composition, transferred from a thermal storage tank or chiller to a thermal load. |
| L-4 | Cold heat transfer fluid or thermal storage fluid, such as cold liquid-liquid phase transition composition, transferred to from a chiller or cooling source or an application requiring heating to V-2. |
| Chiller | Chiller may comprise a mechanical chiller, or active cooling, or passive cooling, or heat sink, or heat exchanger, or application requiring heating, or any combination thereof. |
| L-2 | Cold heat transfer fluid or thermal storage fluid, such as warm liquid-liquid phase transition composition, transferred from a chiller to V-1. |
| V-1 | V-1 may comprise a valve which transfers heat transfer fluid or thermal storage fluid, such as liquid-liquid phase transition composition, to or from a Thermal Load or a Chiller, and/or to or from a cold thermal storage region. |
| L-1 | Cold heat transfer fluid or thermal storage fluid, such as cold liquid-liquid phase transition composition, transferred from a cold source or chiller, such as an application requiring heating or a chiller, to the thermal storage tank or the cold thermal storage region of the thermal storage tank, or transferred from a thermal storage tank or the cold thermal storage region of the thermal storage tank to a thermal load, or a heat source, or an application requiring cooling. |
| Cold | The cold thermal storage region of the thermal storage tank. |
| Physical Divider 1 | Barrier or plate which may physically separate, or be located between, or delineate, or any combination thereof the cold thermal storage region from the warm thermal storage region. The position or elevation physical divider may be adjustable. For example, the position or elevation of the physical divider may be adjusted to reflect the volume or level of the cold thermal storage region and/or the volume or level of the warm thermal storage region. |
| Warm | The warm thermal storage region of the thermal storage tank. |
| C-1 | Cable 1, which may comprise a cable employed to adjust the elevation of the physical divider in the thermal storage tank. |
| C-2 | Cable 2, which may comprise a cable employed to adjust the elevation of the physical divider in the thermal storage tank. |
| Mix 1 | Mix 1 may comprise a mechanical mixing or agitation device or system. Mix 1 may be employed to disperse liquid-liquid phase transition composition at a multi-liquid phase state. For example, in FIGS. 5-8, warm liquid-liquid phase transition composition in the warm thermal storage region may be at a multi-liquid phase state, and/or to ensure the distribution of liquid phases and/or the bulk composition of the liquid-liquid phase transition composition transferred to or from the warm thermal storage region are consistent or at a desired bulk composition, mixing or agitation may be employed as needed or desired. |
| Adjust 1 | An adjustment mechanism which may be employed to adjust the elevation of the physical divider. For example, Adjust 1 may comprise a pulley, or a motor, or a winch, or any combination thereof which may adjust the length of C-1 to adjust elevation or position of the Physical Divider. The adjustment mechanism may utilize information, or data, or sensor data on the volume of the cold thermal storage region, or the volume of the warm thermal storage region, or the flow rate of cold liquid-liquid phase transition composition, or the flow rate of warm liquid-liquid phase transition composition, or information on the geometry and dimensions of the thermal storage tank, or information on the geometry and dimensions of the physical divider, or any combination thereof to adjust the position or elevation of the physical divider. |

| Label | Description |
|---|---|
| Adjust 2 | An adjustment mechanism which may be employed to adjust the elevation of the physical divider. For example, Adjust 2 may comprise a pulley, or a motor, or a winch, or any combination thereof which may adjust the length of C-2 to adjust elevation or position of the Physical Divider. The adjustment mechanism may utilize information, or data, or sensor data on the volume of the cold thermal storage region, or the volume of the warm thermal storage region, or the flow rate of cold liquid-liquid phase transition composition, or the flow rate of warm liquid-liquid phase transition composition, or information on the geometry and dimensions of the thermal storage tank, or information on the geometry and dimensions of the physical divider, or any combination thereof to adjust the position or elevation of the physical divider. |

Example Exemplary Embodiments

1. A thermal storage system comprising:
a warm thermal storage region;
a cold thermal storage region; and
a physical divider;
wherein the warm thermal storage region comprises at least two liquid phases;
wherein the cold thermal storage region comprises at least one liquid phase; and
wherein the physical divider separates the warm thermal storage region from the cold thermal storage region.

2. The system of example embodiment 1 wherein the warm thermal storage region comprises a liquid-liquid phase transition composition at a multi-liquid phase state.

3. The system of example embodiment 1 wherein the cold thermal storage region comprises a liquid-liquid phase transition composition at a single liquid phase state.

4. The system of example embodiment 1 wherein the warm thermal storage region comprises a liquid-liquid phase transition composition above a liquid-liquid phase transition temperature range.

5. The system of example embodiment 1 wherein the warm thermal storage region comprises a liquid-liquid phase transition composition in a liquid-liquid phase transition temperature range.

6. The system of example embodiment 1 wherein the cold thermal storage region comprises a liquid-liquid phase transition composition below a liquid-liquid phase transition temperature range.

7. The system of example embodiment 1 wherein the bulk composition of the warm thermal storage region is about the same as the bulk composition of the cold thermal storage region.

8. The system of example embodiment 1 wherein the temperature difference between the warm thermal storage region and the cold thermal storage region is greater than 3 degrees Kelvin.

9. The system of example embodiment 1 wherein the warm thermal storage region comprises a first liquid phase and a second liquid phase; and wherein the density of the first liquid phase is about the same as the density as the second liquid phase.

10. The system of example embodiment 9 wherein the density of the first liquid phase is different from the density of the second liquid phase by less than 0.05 kilograms per Liter.

11. The system of example embodiment 1 wherein the warm thermal storage region comprises a first liquid phase and a second liquid phase; and wherein the first liquid phase is dispersed in the second liquid phase.

12. The system of example embodiment 11 wherein mechanical mixing is employed to disperse the first liquid phase in the second liquid phase.

13. The system of example embodiment 11 wherein mechanical mixing is initiated to disperse the first liquid phase in the second liquid phase when the particles per cubic centimeter decreases below 550 ppCC.

14. The system of example embodiment 1 wherein the physical divider provides a separation between the cold thermal storage region and the warm thermal storage region.

15. The system of example embodiment 1 wherein the physical divider is located at the temperature interface between the between the cold thermal storage region and the warm thermal storage region.

16. The system of example embodiment 1 wherein the elevation of the physical divider is adjusted when at least a portion of cold liquid-liquid phase transition composition is removed from the cold thermal storage region.

17. The system of example embodiment 1 wherein the elevation of the physical divider is adjusted when at least a portion of warm liquid-liquid phase transition composition is removed from the warm thermal storage region.

18. The system of example embodiment 1 wherein the elevation of the physical divider is adjusted when the volume of the cold thermal storage region, or the volume of the warm thermal storage region, or any combination thereof changes.

19. The system of example embodiment 1 wherein the elevation of the physical divider is adjusted by a mechanical means.

20. The system of example embodiment 1 wherein the physical divider is at a density greater than 1.5× the density of water.

21. The system of example embodiment 1 wherein the physical divider is adjusted by a cable system.

22. The system of example embodiment 1 wherein the elevation of the physical divider is adjusted based on the volume of liquid in the storage tank, the volume of the warm thermal storage region, the volume of the cold thermal storage region, and the rate of liquid-liquid phase transition composition entering or exiting the cold thermal storage region or warm thermal storage region.

23. A thermal storage system comprising:
a warm thermal storage region;
a cold thermal storage region; and
a physical divider;
wherein the warm thermal storage region comprises at least two liquid phases;
wherein the cold thermal storage region comprises at least two liquid phases; and wherein the physical divider separates the warm thermal storage region from the cold thermal storage region.

24. The system of example embodiment 23 wherein the warm thermal storage region comprises a liquid-liquid phase transition composition at a multi-liquid phase state.

25. The system of example embodiment 23 wherein the cold thermal storage region comprises a liquid-liquid phase transition composition at a multi-liquid phase state.

26. The system of example embodiment 23 wherein the warm thermal storage region comprises a liquid-liquid phase transition composition in or above a liquid-liquid phase transition temperature range.

27. The system of example embodiment 23 wherein the cold thermal storage region comprises a liquid-liquid phase transition composition in or below a liquid-liquid phase transition temperature range.

28. A thermal storage system comprising:
a warm thermal storage region;
a cold thermal storage region; and
a physical divider;
wherein the warm thermal storage region comprises at least one liquid phase;
wherein the cold thermal storage region comprises at least two liquid phases; and
wherein the physical divider separates the warm thermal storage region from the cold thermal storage region.

29. The system of example embodiment 28 wherein the warm thermal storage region comprises a liquid-liquid phase transition composition at a single liquid phase state.

30. The system of example embodiment 28 wherein the cold thermal storage region comprises a liquid-liquid phase transition composition at a multi-liquid phase state.

Warm Thermal Storage Region Multiple Liquid Phases, Cold Thermal Storage Region Single Liquid Phase 1. A thermal storage system comprising:
    A warm thermal storage region;
    A cold thermal storage region;
    A physical divider;
    Wherein the warm thermal storage region comprises at least two liquid phases;
    Wherein the cold thermal storage region comprises at least one liquid phase;
    Wherein the physical divider separates the warm thermal storage region from the cold thermal storage region.
2. The system of example embodiment 1:
    Wherein the temperature difference between the warm region and cold region is greater than 3 degrees Kelvin
    Wherein the warm thermal storage region comprises a liquid-liquid phase transition composition at a multi-liquid phase state
    Wherein the cold thermal storage region comprises a liquid-liquid phase transition composition at a single liquid phase combined solution liquid state
    Wherein the warm thermal storage region comprises a liquid-liquid phase transition composition above a liquid-liquid phase transition temperature range
    Wherein the warm thermal storage region comprises a liquid-liquid phase transition composition in a liquid-liquid phase transition temperature range
    Wherein the cold thermal storage region comprises a liquid-liquid phase transition composition below a liquid-liquid phase transition temperature range
    Wherein the cold thermal storage region comprises a liquid-liquid phase transition composition in a liquid-liquid phase transition temperature range
    Wherein the bulk composition of the warm region is about the same as the bulk composition of the cold region
    Wherein the bulk composition of the warm region is no more than 5% different than the bulk composition of the cold region
    Wherein the warm thermal storage region comprises a first liquid phase and a second liquid phase; and wherein the density of the first liquid phase is about the same as the density as the second liquid phase
    Wherein the warm thermal storage region comprises a first liquid phase and a second liquid phase; and wherein the density of the first liquid phase is different from the density of the second liquid phase by less than 0.01 kilograms per Liter
    Wherein the warm thermal storage region comprises a first liquid phase and a second liquid phase; and wherein the density of the first liquid phase is different from the density of the second liquid phase by less than 0.03 kilograms per Liter
    Wherein the warm thermal storage region comprises a first liquid phase and a second liquid phase; and wherein the density of the first liquid phase is different from the density of the second liquid phase by less than 0.05 kilograms per Liter
    Wherein the warm thermal storage region comprises a first liquid phase and a second liquid phase; and wherein the first liquid phase is dispersed in the second liquid phase
    Wherein the warm thermal storage region comprises a suspension
    Wherein the warm thermal storage region comprises an emulsion
    Wherein the warm thermal storage region comprises a dispersion
    Wherein the two or more liquid phases in the warm thermal storage region are maintained at a mixed or dispersed state using a mixer device
    Wherein the two or more liquid phases in the warm thermal storage region are maintained at a mixed or dispersed state using a mechanical mixer device
    Wherein the two or more liquid phases in the warm thermal storage region are mixed using a mechanical mixing device
    Wherein the warm thermal storage region, the cold thermal storage region, and the physical divider are located inside of a tank
    Wherein the physical divider provides a separation between the cold thermal storage region and the warm thermal storage region
    Wherein the thermal storage composition or medium in the warm thermal storage region is the same as the thermal storage composition or medium in the cold thermal storage region
    Wherein the volume of the cold thermal storage region may change
    Wherein the volume of the warm thermal storage region may change
    Wherein the position or location of the physical divider is adjusted when the volume of the cold thermal storage region, or the volume of the warm thermal storage region, or any combination thereof changes
    Wherein the position or location of the physical divider is adjusted when at least a portion of cold liquid-liquid phase transition composition is removed from the cold thermal storage region
    Wherein the position or location of the physical divider is adjusted when at least a portion of cold liquid-liquid phase transition composition is added to cold thermal storage region Wherein the position or location of the physical divider is adjusted when at least a portion of warm liquid-liquid phase transition composition is removed from the warm thermal storage region Wherein the position or location of the physical divider is adjusted when at least a portion of warm liquid-liquid phase transition composition is added to the warm thermal storage region Wherein the position or location of the physical divider is adjusted by passive means Wherein the position or location of the physical divider is adjusted by active means Wherein the position or location of the physical divider is adjusted by mechanical means Wherein the location of the physical divider is adjusted to reflect any changes in the location of boundary between the warm thermal storage region and cold thermal storage region Wherein the volume of the warm thermal storage region may change Wherein the volume of the cold thermal storage region may change Wherein the density of the physical divider is greater than the density of the liquid-liquid phase transition composition Wherein the density of the physical divider is greater than 1.5 times the density of water Wherein the physical divider comprises a solid material Wherein the position of the physical divider is adjusted by a cable system Wherein the liquid-liquid phase transition composition comprises an LCST liquid-liquid phase transition composition Wherein the liquid-liquid phase transition composition comprises an UCST liquid-liquid phase transition composition Cold Thermal Storage Region Multiple Liquid Phases, Warm Thermal Storage Region Single Liquid Phase 1. A thermal storage system comprising:

A cold thermal storage region;

A warm thermal storage region;

A physical divider;

Wherein the cold thermal storage region comprises at least two liquid phases;

Wherein the warm thermal storage region comprises at least one liquid phase;

Wherein the physical divider separates the cold thermal storage region from the warm thermal storage region.

2. The system of example embodiment 1:

Wherein the temperature difference between the cold region and warm region is greater than 3 degrees Kelvin Wherein the cold thermal storage region comprises a liquid-liquid phase transition composition at a multi-liquid phase state Wherein the warm thermal storage region comprises a liquid-liquid phase transition composition at a single liquid phase combined solution liquid state Wherein the cold thermal storage region comprises a liquid-liquid phase transition composition above a liquid-liquid phase transition temperature range Wherein the cold thermal storage region comprises a liquid-liquid phase transition composition in a liquid-liquid phase transition temperature range Wherein the warm thermal storage region comprises a liquid-liquid phase transition composition below a liquid-liquid phase transition temperature range Wherein the warm thermal storage region comprises a liquid-liquid phase transition composition in a liquid-liquid phase transition temperature range Wherein the bulk composition of the cold region is about the same as the bulk composition of the warm region Wherein the bulk composition of the cold region is no more than 5% different than the bulk composition of the warm region Wherein the cold thermal storage region comprises a first liquid phase and a second liquid phase; and wherein the density of the first liquid phase is about the same as the density as the second liquid phase Wherein the cold thermal storage region comprises a first liquid phase and a second liquid phase; and wherein the density of the first liquid phase is different from the density of the second liquid phase by less than 0.01 kilograms per Liter Wherein the cold thermal storage region comprises a first liquid phase and a second liquid phase; and wherein the density of the first liquid phase is different from the density of the second liquid phase by less than 0.03 kilograms per Liter Wherein the cold thermal storage region comprises a first liquid phase and a second liquid phase; and wherein the density of the first liquid phase is different from the density of the second liquid phase by less than 0.05 kilograms per Liter Wherein the cold thermal storage region comprises a first liquid phase and a second liquid phase; and wherein the first liquid phase is dispersed in the second liquid phase Wherein the cold thermal storage region comprises a suspension Wherein the cold thermal storage region comprises an emulsion Wherein the cold thermal storage region comprises a dispersion Wherein the two or more liquid phases in the cold thermal storage region are maintained at a mixed or dispersed state using a mixer device Wherein the two or more liquid phases in the cold thermal storage region are maintained at a mixed or dispersed state using a mechanical mixer device Wherein the two or more liquid phases in the cold thermal storage region are mixed using a mechanical mixing device Wherein the cold thermal storage region, the warm thermal storage region, and the physical divider are located inside of a tank Wherein the physical divider provides a separation between the warm thermal storage region and the cold thermal storage region Wherein the thermal storage composition or medium in the cold thermal storage region is the same as the thermal storage composition or medium in the warm thermal storage region Wherein the volume of the warm thermal storage region may change Wherein the volume of the cold thermal storage region may change Wherein the position or location of the physical divider is adjusted when the volume of the warm thermal storage region, or the volume of the cold thermal storage region, or any combination thereof changes Wherein the position or location of the physical divider is adjusted when at least a portion of warm liquid-liquid phase transition composition is removed from the warm thermal storage region Wherein the position or location of the physical divider is adjusted when at least a portion of warm liquid-liquid phase transition composition is added to warm thermal storage region Wherein the position or location of the physical divider is adjusted when at least a portion of cold liquid-liquid phase transition composition is removed from the cold thermal storage region Wherein the position or location of the physical divider is adjusted when at least a portion of cold liquid-liquid phase transition composition is added to cold thermal storage region Wherein the position or location of the physical divider is adjusted by passive means Wherein the position or location of the physical divider is adjusted by active means Wherein the position or location of the physical divider is adjusted by mechanical means Wherein the location of the physical divider is adjusted to reflect any changes in the location of boundary between the cold thermal storage region and warm thermal storage region Wherein the volume of the cold thermal storage region may change Wherein the volume of the warm thermal storage region may change Wherein the density of the physical divider is greater than the density of the liquid-liquid phase transition composition Wherein the density of the physical divider is greater than 1.5 times the density of water Wherein the physical divider comprises a solid material Wherein the position of the physical divider is adjusted by a cable system Wherein the liquid-liquid phase transition composition comprises an LCST liquid-liquid phase transition composition Wherein the liquid-liquid phase transition composition comprises an UCST liquid-liquid phase transition composition Warm Thermal Storage Region Multiple Liquid Phases, Cold Thermal Storage Region Multiple Liquid Phases 1. A thermal storage system comprising:
A warm thermal storage region;
A cold thermal storage region;
A physical divider;
Wherein the warm thermal storage region comprises at least two liquid phases;
Wherein the cold thermal storage region comprises at least two liquid phases; Wherein the physical divider separates the warm thermal storage region from the cold thermal storage region.

2. The system of example embodiment 1:
Wherein the temperature difference between the warm region and cold region is greater than 3 degrees Kelvin Wherein the warm thermal storage region comprises a liquid-liquid phase transition composition at a multi-liquid phase state Wherein the warm thermal storage region comprises a liquid-liquid phase transition composition at a multi-liquid phase state Wherein the system stores a liquid-liquid phase transition composition which possesses an enthalpy of phase transition during a phase transition from a multi-liquid phase state to a multi-liquid phase state Wherein the warm thermal storage region comprises a liquid-liquid phase transition composition above a liquid-liquid phase transition temperature range Wherein the warm thermal storage region comprises a liquid-liquid phase transition composition in a liquid-liquid phase transition temperature range Wherein the cold thermal storage region comprises a liquid-liquid phase transition composition below a liquid-liquid phase transition temperature range Wherein the cold thermal storage region comprises a liquid-liquid phase transition composition in a liquid-liquid phase transition temperature range Wherein the bulk composition of the warm region is about the same as the bulk composition of the cold region Wherein the bulk composition of the warm region is no more than 5% different than the bulk composition of the cold region Wherein the warm thermal storage region comprises a first liquid phase and a second liquid phase; and wherein the density of the first liquid phase is about the same as the density as the second liquid phase Wherein the warm thermal storage region comprises a first liquid phase and a second liquid phase; and wherein the density of the first liquid phase is different from the density of the second liquid phase by less than 0.01 kilograms per Liter Wherein the warm thermal storage region comprises a first liquid phase and a second liquid phase; and wherein the density of the first liquid phase is different from the density of the second liquid phase by less than 0.03 kilograms per Liter Wherein the warm thermal storage region comprises a first liquid phase and a second liquid phase; and wherein the density of the first liquid phase is different from the density of the second liquid phase by less than 0.05 kilograms per Liter Wherein the warm thermal storage region comprises a first liquid phase and a second liquid phase; and wherein the first liquid phase is dispersed in the second liquid phase Wherein the warm thermal storage region comprises a suspension Wherein the warm thermal storage region comprises an emulsion Wherein the warm thermal storage region comprises a dispersion Wherein the two or more liquid phases in the warm thermal storage region are maintained at a mixed or dispersed state using a mixer device Wherein the two or more liquid phases in the warm thermal storage region are maintained at a mixed or dispersed state using a mechanical mixer device Wherein the two or more liquid phases in the warm thermal storage region are mixed using a mechanical mixing device Wherein the cold thermal storage region comprises a first liquid phase and a second liquid phase; and wherein the density of the first liquid phase is about the same as the density as the second liquid phase Wherein the cold thermal storage region comprises a first liquid phase and a second liquid phase; and wherein the density of the first liquid phase is different from the density of the second liquid phase by less than 0.01 kilograms per Liter Wherein the cold thermal storage region comprises a first liquid phase and a second liquid phase; and wherein the density of the first liquid phase is different from the density of the second liquid phase by less than 0.03 kilograms per Liter Wherein the cold thermal storage region comprises a first liquid phase and a second liquid phase; and wherein the density of the first liquid phase is different from the density of the second liquid phase by less than 0.05 kilograms per Liter Wherein the cold thermal storage region comprises a first liquid phase and a second liquid phase; and wherein the first liquid phase is dispersed in the second liquid phase Wherein the cold thermal storage region comprises a suspension Wherein the cold thermal storage region comprises an emulsion Wherein the cold thermal storage region comprises a dispersion Wherein the two or more liquid phases in the cold thermal storage region are maintained at a mixed or dispersed state using a mixer device Wherein the two or more liquid phases in the cold thermal storage region are maintained at a mixed or dispersed state using a mechanical mixer device Wherein the two or more liquid phases in the cold thermal storage region are mixed using a mechanical mixing device Wherein the warm thermal storage region, the cold thermal storage region, and the physical divider are located inside of a tank Wherein the physical divider provides a separation between the cold thermal storage region and the warm thermal storage region Wherein the thermal storage composition or medium in the warm thermal storage region is the same as the thermal storage composition or medium in the cold thermal storage region Wherein the volume of the cold thermal storage region may change Wherein the volume of the warm thermal storage region may change Wherein the position or location of the physical divider is adjusted when the volume of the cold thermal storage region, or the volume of the warm thermal storage region, or any combination thereof changes Wherein the position or location of the physical divider is adjusted when at least a portion of cold liquid-liquid phase transition composition is removed from the cold thermal storage region Wherein the position or location of the physical divider is adjusted when at least a portion of cold liquid-liquid phase transition composition is added to the cold thermal storage region Wherein the position or location of the physical divider is adjusted when at least a portion of warm liquid-liquid phase transition composition is removed from the warm thermal storage region Wherein the position or location of the physical divider is adjusted when at least a portion of warm liquid-liquid phase transition composition is added to warm thermal storage region Wherein the position or location of the physical divider is adjusted by passive means Wherein the position or location of the physical divider is adjusted by active means Wherein the position or location of the physical divider is adjusted by mechanical means Wherein the location of the physical divider is adjusted to reflect any changes in the location of boundary between the warm thermal storage region and cold thermal storage region Wherein the volume of the warm thermal storage region may change Wherein the volume of the cold thermal storage region may change Wherein the density of the physical divider is greater than the density of the thermal storage liquid compositions Wherein the density of the physical divider is greater than 1.5 times the density of water Wherein the physical divider comprises a solid material Wherein the position of the physical divider is adjusted by a cable system Wherein the liquid-liquid phase transition composition comprises an LCST liquid-liquid phase transition composition Wherein the liquid-liquid phase transition composition comprises an UCST liquid-liquid phase transition composition Notes Note: Mechanical mixing may comprise, including, but not limited to, one or more or any combination of the following: agitators, or circulators, or mixers, or baffles, or stirring, or turbine mixing, or impeller mixing, or turbulent mixing, or transitional mixing, or Axial Flow, or Axial Flow Impeller, or Radial Flow, or Redial Flow Impellers, or Emulsifier, or pressure mixer, or high shear mixer, or vacuum mixer, or Vacuum emulsifier, or homogenizer, or centrifugal mixer, or dispersing mixer, or laminar mixing, or helical ribbon mixing, or anchor mixing, or jet mixing, or static mixing, or vortices mixing, or high shear disperser, or a disperser, or a circular saw blade mixer, or a liquid whistle, or a resonant acoustic mixer, or vertical mixer, or turbomixer, or Horizontal Mixer, or Intermix mixer, or Drum Blender, or Mobile Mixer, or Jet Mixer, or paddle mixer, or Dispersion Mixers, or Impinging mixer, or High Shear Rotor Stator, or Vacuum Mixer, or Double & Triple Shaft mixer, or Counter-rotating, or Double Planetary mixer or blender, or Double Cone Blender, or Screw Blender, or Cone Screw Blender, or Continuous Processor, or Twin-Screw Continuous Blender, or V Blender.

Note: Example Definition of Bulk Composition: The composition of liquids in a region or sample. For example, the Bulk Composition may comprise the proportional amount of each chemical in a thermal storage region. The bulk composition may relate to the chemical composition of all the chemicals or all the liquid phase chemicals in a defined region or sample. For example, a warm thermal storage region may comprise multiple liquid phases and the Bulk Composition may relate to the total amount of each chemical in the warm thermal storage region regardless of the liquid phase. For example, the Bulk Composition may comprise the amount or proportional amount of each chemical constituent in a sample, or region, or container irrespective of the liquid phase of physical state of the chemical constituent.

Note: Example Definition of Liquid-Liquid Phase Transition Temperature Range: In some embodiments, a liquid-liquid phase transition and/or an enthalpy of liquid-liquid phase transition may occur over a temperature range, rather than a specific temperature point. Some liquid-liquid phase transitions or enthalpies of phase transition are different from gas-liquid phase transitions or solid-liquid phase transitions in that some liquid-liquid phase transitions may occur while the composition is heated or cooled through a temperature range rather than a single temperature point. For example, a liquid-liquid phase transition or an enthalpy of liquid-liquid phase transition may occur in a composition heated from 6 degrees Celsius through a temperature of 15 degrees Celsius. In this example, the composition may have a liquid-liquid phase transition temperature range or enthalpy of liquid-liquid phase transition temperature range between 6 degrees Celsius and 15 degrees Celsius. In this example, the composition may have a liquid-liquid phase transition or enthalpy of liquid-liquid phase transition temperature which occurs over a temperature difference of 9-10 degrees Kelvin.

Example FIGS. 9-12 Description

FIGS. 9-12 may show a thermal storage embodiment. FIGS. 9-12 may show systems and methods for thermal storage. FIGS. 9-12 may show a process for thermal storage wherein the thermal storage medium may be employed directly as a heat transfer fluid.

FIGS. 9-12 may comprise a thermal storage system with a thermal storage medium being employed as a heat transfer medium or functioning as a heat transfer medium. FIGS. 9-12 may employ heat transfer medium in heat exchange with external applications or in direct heat exchange with thermal loads or applications requiring cooling.

Example FIGS. 9-12 Figure Key

| Example FIGS. 9-12 Key | |
| --- | --- |
| FIG. Label | Description |
| From Chiller | In some embodiments, 'From Chiller' may comprise cooled or cold thermal storage medium supplied from a chiller or other cooling source. 'From Chiller' may be shown in FIG. 9, which may show the thermal storage system charging. In some embodiments, 'From Chiller' may comprise a warm thermal storage medium supplied from a heater or other heating source. In some embodiments, 'From Chiller' may indicate the thermal storage system is charging, which may involve increasing the amount of cold thermal storage medium inside the thermal storage tank or inside the cold thermal storage region of the thermal storage tank. Cold thermal storage medium may comprise thermal storage medium at a lower temperature than warm thermal storage medium. In some embodiments, such as embodiments for cooling thermal storage, it may be desirable for the thermal storage medium transferred 'From Chiller' to be at a lower temperature or lower entropy state than the thermal storage medium transferred 'To Chiller'. In some embodiments, such as embodiments for heating thermal storage, it may be desirable for the thermal storage medium transferred 'From Chiller' to be at a higher temperature or higher entropy state than the thermal storage medium transferred 'To Chiller'. In some embodiments, 'To Chiller' and 'From Chiller' may be at about the same temperature or entropy, if, for example, the thermal storage medium bypasses a thermal load. In some embodiments, the heat transfer medium 'From Chiller' may comprise the same heat transfer fluid as 'To Chiller', except at a different temperature or different entropy state. In some embodiments, the thermal storage medium 'From Chiller' may be at a single liquid phase combined solution state, or a multi-liquid phase mixture state, or any combination thereof. In the present figures, it may be desirable for the thermal storage medium 'From Chiller' to be at a single liquid phase combined solution state, or at a multi-liquid phase mixture state wherein the liquid phases are at least partially suspended, or are at least partially dispersed, or are of similar density, or any combination thereof. In some embodiments, 'From Chiller' may comprise the same liquid or liquid composition as 'To Chiller', except after heat exchanger or passing through the chiller or other cooling process and/or except at a different temperature or entropy state. In some embodiments, 'From Chiller' may comprise the same liquid or liquid composition as 'To Chiller', except after heat exchanger or passing through the chiller or other cooling process and/or except at a lower temperature or entropy state. |
| To Load | In some embodiments, 'To Load' may comprise cooled or cold thermal storage medium supplied from the thermal storage tank or from the cold thermal storage region of the thermal storage tank, and transferred to a thermal load, such as an application requiring cooling. 'To Load' may be shown in FIG. 11, which may show the thermal storage system discharging. In some embodiments, 'To Load' may comprise a warm thermal storage medium supplied to an application requiring heating. In some embodiments, 'To Load' may indicate the thermal storage system is discharging, which may involve decreasing the amount of cold thermal storage medium inside the thermal storage tank or inside the cold thermal storage region of the thermal storage tank. Cold thermal storage medium may comprise thermal storage medium at a lower temperature than warm thermal storage medium. In some embodiments, such as embodiments for cooling thermal storage, it may be desirable for the thermal storage medium transferred 'To Load' to be at a lower temperature or lower entropy state than the thermal storage medium transferred 'From Load'. In some embodiments, such as embodiments for heating thermal storage, it may be desirable for the thermal storage medium transferred 'To Load' to be at a higher temperature or higher entropy state than the thermal storage medium transferred 'From Load'. In some embodiments, 'To Load' and 'From Load' may be at about the same temperature or entropy, if, for example, the heat transfer medium bypasses a thermal load. In some embodiments, the thermal storage medium 'From Load' may comprise the same thermal storage medium as |

Example FIGS. 9-12 Key

| FIG. Label | Description |
|---|---|
| | 'To Load', except at a different temperature or different entropy state. In some embodiments, the thermal storage medium 'To Load' may be at a single liquid phase combined solution state, or a multi-liquid phase mixture state, or any combination thereof. In the present figures, it may be desirable for the thermal storage medium 'To Load' to be at a single liquid phase combined solution state, or at a multi-liquid phase mixture state wherein the liquid phases are at least partially suspended, or are at least partially dispersed, or are of similar density, or any combination thereof. In some embodiments, 'To Load' may comprise the same liquid or liquid composition as 'From Load', except before heat exchanger or passing through a thermal load or heat exchanger and/or except at a different temperature or entropy state. |
| L-1 | L-1 may comprise cooled or cold thermal storage medium. In FIG. 9, L-1 may be transferred from a cooling source or chiller to the thermal storage tank, or the cold thermal storage region of the thermal storage tank. In FIG. 11, L-1 may be transferred from the thermal storage tank, or the cold thermal storage region of the thermal storage tank, to a thermal load, such as an application requiring cooling. L-1 may comprise the same liquid composition as L-4, or may originate from L-4, or may comprise L-4 cooled to a lower temperature, or any combination thereof. L-1 may comprise L-4 at a lower temperature or lower entropy state or after cooling. L-1 may be at a single liquid phase combined solution state, or a multi-liquid phase mixture state, or any combination thereof. In the present figures, it may be desirable for L-1 to be at a single liquid phase combined solution state, or at a multi-liquid phase mixture state wherein the liquid phases are at least partially suspended, or are at least partially dispersed, or are of similar density, or any combination thereof. In the present figures, it may be desirable for L-1 to be at a single liquid phase combined solution state, or at a multi-liquid phase mixture state wherein the liquid phases are at least partially suspended, or at least partially dispersed, or are of similar density, or any combination thereof, for example, because the cold thermal storage region may only have a port at one elevation within the tank or one port. It is important to note some embodiments may have more than one port, or ports at different elevations, or ports in different locations, or ports in different positions, or mobile ports, or ports with adjustable location, or any combination thereof in, for example, a cold thermal storage region, or warm thermal storage region, or any combination thereof. |
| FC-3 | FC-3 may comprise a flow controller, or flow meter, or temperature probe, or thermometer, pressure sensor, or valve, or pump, or composition sensor, or any combination thereof. FC-3 may control and/or measure the flow rate of thermal storage medium, which may include, but is not limited to, cold thermal storage medium, which may be transferred into or out of the thermal storage tank or cold thermal storage region of the thermal storage tank. |
| Port 4 | Port 4 may comprise an inlet, or outlet, or hole, or port, or any combination thereof designed enable the addition of or removal of thermal storage medium to or from the thermal storage tank to or from one or more locations within the thermal storage tank. Port 4 may be designed to transfer thermal storage medium from the cold thermal storage medium region of the thermal storage tank. In some embodiments, Port 4 may be located at or near the bottom of the thermal storage tank or the cold thermal storage tank region. |
| Cold | 'Cold' may be a label for the cold thermal storage medium region or cold thermal storage region of the thermal storage tank. 'Cold' may mean the thermal storage medium is at a temperature lower than the 'warm' thermal storage medium or warm thermal storage region. Cold may mean a liquid-liquid phase transition thermal storage medium is at or below a liquid-liquid phase transition temperature range, or the thermal storage medium is at a lower entropy state than the warm thermal storage liquid. For example, in some embodiments, a thermal storage medium at a single liquid phase combined solution state may be at a lower entropy state than a thermal storage medium at a multi-liquid phase mixture state. For example, in some embodiments, a thermal storage medium at a multi-liquid phase mixture state may be at a lower entropy state than a thermal storage medium at a single liquid phase combined solution state. |
| Physical Divider 1 | Physical Divider 1 may comprise a solid material which is located between the warm thermal storage region and the cold thermal storage region. The physical divider may be designed to delineate the cold thermal storage region from the warm thermal storage region, or be designed to be located at the hypothetical interface between the cold thermal storage region and the warm thermal storage region, or any combination thereof. A physical divider may be designed to prevent or minimize mixing between the warm thermal storage region and the cold thermal storage region. In some embodiments, a physical divider may comprise a solid material which cross-cuts the full or nearly the full cross sectional area of at least a portion of the inside of a thermal storage tank. A physical divider may be designed to be mobile and/or may be designed such that the position or elevation of the physical divider can be adjusted or changed. For example, in some embodiments, the physical divider may change elevation or position within a tank to ensure it maintains a position or location at or near the hypothetical interface between the warm thermal storage region and cold thermal storage region. For example, in some embodiments, during charging, the elevation of the physical divider may increase, |

-continued

Example FIGS. 9-12 Key

| FIG. Label | Description |
|---|---|
|  | and/or, in some embodiments, during discharging, the elevation of the physical divider may decrease. In some embodiments, the position or elevation of the physical divider may adjust due to passive mechanisms, such as, for example, relative buoyancy or relative density. In some embodiments, the position or elevation of the physical divider may be adjusted using an active mechanism, which may include, but is not limited to, one or more or any combination of the following: line, or cable, or reel, or screw, or threaded rod, or threaded hole, or magnetism, or electrostatic charge, or actuator, or piston, or pneumatic method, or hydraulic method, or electromechanical method, or electro fluidic method. An active mechanism may adjust the position or elevation of a physical divider to at or near an optimal position using, for example, information on the flow rates of cold and/or warm thermal storage medium entering and/or exiting the tank, the geometry of the tank, and/or other information or calculations, or any combination thereof. In some embodiments, the physical divider may be attached to a component of an active adjustment mechanism, such as a line, or cable, or rod, or threaded rod, or pole, or actuator, or magnet. In some embodiment, the physical divider may comprise a rigid material. In some embodiments, the physical divider may form a narrow junction or almost a seal or a seal between the tank wall and the physical divider, which may minimize mixing of between the warm thermal storage medium and cold thermal storage medium at or near the physical divider. In some embodiments, the physical divider may comprise a rigid material with a flexible material at the perimeter. For example, in some embodiments, the physical divider may employ a flexible or elastic material on at least a portion of the perimeter of the physical divider such that the flexible or elastic material may be in contact with a tank wall, which may minimize mixing of warm thermal storage medium with cold thermal storage medium at or near the physical divider and/or while enabling movement or adjustment of position of the physical divider. In some embodiments, the physical divider may form a seal with a tank wall, which, in some embodiments, may be similar to the seal formed by a drum within a syringe. In some embodiments, it may be desirable for the physical divider to be at least a partially insulative, which may mean it may be desirable for the physical divider to minimize heat transfer between the warm thermal storage medium region and the cold thermal storage medium region at or near the physical divider. In some embodiments it may be desirable for the physical divider to have a density significantly greater than the density of one or more or all the liquid phases of the thermal storage medium. In some embodiments, it may be desirable for the physical divider to have a negative buoyance or net downward gravitational force sufficient to overcome any upward lift imposed by the flexible hose and/or any friction force between the physical divider and the tank wall. In some embodiments it may be desirable for the physical divider to have a density significantly less than the density of one or more or all the liquid phases of the thermal storage medium. In some embodiments it may be desirable for the physical divider to have a density about the same as the density of one or more of the liquid phases of the thermal storage medium. In some embodiments it may be desirable for the physical divider to have a density greater than one or more of the liquid phases of the thermal storage medium and/or it may be desirable for the physical divider to have a density less than one or more of the liquid phases of the thermal storage medium. |
| Port 1 | Port 1 may comprise an inlet, or outlet, or hole, or port, or any combination thereof designed enable the addition of or removal of thermal storage medium to or from the thermal storage tank and/or to or from one or more locations within the thermal storage tank. Port 1 may be designed to transfer thermal storage medium from the warm thermal storage medium region of the thermal storage tank. In some embodiments, Port 1 may be located at or near the bottom of the warm thermal storage tank region. In some embodiments, Port 1 may be located on, or near, or attached to the physical divider or Physical Divider 1. Port 1 may be attached to or connected to a flexible or expandible or collapsible hose, which may comprise H-1. In some embodiments, thermal storage medium may be transferred to or from Port 1 by means of a flexible or expandible or collapsible hose, which may comprise H-1. In some embodiments, the thermal storage medium in the warm thermal storage region may comprise a two liquid phase mixture, wherein a first liquid phase possesses a density greater than a second liquid phase and the first liquid phase and second liquid phase tend to separate out over time into layers comprising a first liquid phase layer and a second liquid phase layer. It may be desirable for Port 1 to be located near the bottom or lower elevation portion of the warm thermal storage region to enable or make possible the selective removal of or addition of at least a portion of first liquid phase or selective removal of or addition of at least a portion of thermal storage medium from the first liquid phase layer. The location or position or elevation of Port 1 may be adjustable and/or may adjust depending on, for example, including, but not limited to, one or more or any combination of the following: the location of liquid phases within the warm thermal storage region, or the volume of warm thermal storage medium, or the volume of cold thermal storage medium, or residence time, or the position or elevation of the physical divider, or the temperature of one or more liquid phases, or the density of one or more liquid phases, or the temperature of the warm or cold thermal storage media. |

Example FIGS. 9-12 Key

| FIG. Label | Description |
| --- | --- |
| H-1 | H-1 may comprise a flexible, or expandable, or collapsible, or elastic, or stretchable hose or tube. H-1 may enable the transfer of thermal storage medium to or from Port 1, or a port a substantial distance from a tank wall, or a port which may change position within the tank. H-1 may enable the removal or addition of thermal storage medium or a liquid phase of a thermal storage medium while the position or elevation of a port, or Port 1, or the physical divider changes. |
| C-1 | C-1 may comprise a cable or thread employed to maintain or adjust the position or elevation of the physical divider. In some embodiments, one cable or thread may be required. In some embodiments, more than one cable or thread may be required or desired. In some embodiments, the cable or thread may be employed in various configurations. For example, in some embodiments, a single cable or thread my split or connect to multiple cables or threads which may connect to the physical divider and/or may facilitate a dispersal of forces applied to the physical divider and/or may enable a more balanced or balanced distribution of forces applied to the physical divider and/or may reduce risk of tangling and/or may minimize tank volume occupied by adjustment mechanism and/or may minimize any potential fluid flow disturbance caused by the presence of a cable or thread. The length of C-1 may be adjusted to adjust the position and/or elevation of the physical divider and/or Port 1 and/or H-1. The length of C-1 may be adjusted by a length adjustment mechanism, such as Adjust 1, which may comprise, for example, including, but not limited to, a reel or winch. |
| C-2 | C-2 may comprise a cable or thread employed to maintain or adjust the position or elevation of the physical divider. In some embodiments, one cable or thread may be required. In some embodiments, more than one cable or thread may be required or desired. In some embodiments, the cable or thread may be employed in various configurations. For example, in some embodiments, a single cable or thread my split or connect to multiple cables or threads which may connect to the physical divider and/or may facilitate a dispersal of forces applied to the physical divider and/or may enable a more balanced or balanced distribution of forces applied to the physical divider and/or may reduce risk of tangling and/or may minimize tank volume occupied by adjustment mechanism and/or may minimize any potential fluid flow disturbance caused by the presence of a cable or thread. The length of C-2 may be adjusted to adjust the position and/or elevation of the physical divider and/or Port 1 and/or H-1. The length of C-2 may be adjusted by a length adjustment mechanism, such as Adjust 2, which may comprise, for example, including, but not limited to, a reel or winch. |
| Warm | 'Warm' may be a label for the warm thermal storage medium region or warm thermal storage region of the thermal storage tank. 'Warm' may mean the thermal storage medium is at a temperature greater than the 'cold' thermal storage medium or cold thermal storage region. Warm may mean a liquid-liquid phase transition thermal storage medium is at or above a liquid-liquid phase transition temperature range, or the thermal storage medium is at a higher entropy state than the cold thermal storage liquid. For example, in some embodiments, a thermal storage medium at a single liquid phase combined solution state may be at a lower entropy state than a thermal storage medium at a multi-liquid phase mixture state. For example, in some embodiments, a thermal storage medium at a multi-liquid phase mixture state may be at a lower entropy state than a thermal storage medium at a single liquid phase combined solution state. |
| Port 2 | Port 2 may comprise an inlet, or outlet, or hole, or port, or any combination thereof designed enable the addition of or removal of thermal storage medium to or from the thermal storage tank to or from one or more locations within the thermal storage tank. Port 2 may be designed to transfer thermal storage medium from the warm thermal storage medium region of the thermal storage tank. In some embodiments, Port 2 may be located at or near the top of the thermal storage tank or the warm thermal storage tank region. In some embodiments, the thermal storage medium in the warm thermal storage region may comprise a two liquid phase mixture, wherein a first liquid phase possesses a density greater than a second liquid phase and the first liquid phase and second liquid phase tend to separate out over time into layers comprising a first liquid phase layer and a second liquid phase layer. It may be desirable for Port 2 to be located near the top or higher elevation portion of the warm thermal storage region to enable or make possible the selective removal of or addition of at least a portion of second liquid phase or selective removal of or addition of at least a portion of thermal storage medium from the second liquid phase layer. |
| Adjust 1 | Adjust 1 may comprise an adjustment mechanism. For example, Adjust 1 may comprise a mechanism for adjusting or controlling or maintaining the length of a cable or line employed to adjust or maintain the position or elevation of the physical divider, such as, for example, C-1 or C-2. Adjust 1 may comprise, for example, a reel, or an electronic reel, or a winch, or an electronic wind, or a variable rotation rate reel or winch, or any combination thereof. Adjust I may communicate with a central control system or other control system, which determines the rate of adjustment, if any, required in the position of the physical divider based on one or more or any combination of system operating conditions or information. In some embodiments, Adjust 1 and Adjust 2 may comprise a single or combined adjustment |

Example FIGS. 9-12 Key

| FIG. Label | Description |
|---|---|
| | mechanism or device. In some embodiments, Adjust 1 and Adjust 2 may comprise a separate adjustment mechanism or device. |
| Adjust 2 | Adjust 2 may comprise an adjustment mechanism. For example, Adjust 2 may comprise a mechanism for adjusting or controlling or maintaining the length of a cable or line employed to adjust or maintain the position or elevation of the physical divider, such as, for example, C-1 or C-2. Adjust 1 may comprise, for example, a reel, or an electronic reel, or a winch, or an electronic wind, or a variable rotation rate reel or winch, or any combination thereof. Adjust 2 may communicate with a central control system or other control system, which determines the rate of adjustment, if any, required in the position of the physical divider based on one or more or any combination of system operating conditions or information. In some embodiments, Adjust 1 and Adjust 2 may comprise a single or combined adjustment mechanism or device. In some embodiments, Adjust 1 and Adjust 2 may comprise a separate adjustment mechanism or device. |
| FC-1 | FC-1 may comprise a flow controller, or flow meter, or temperature probe, or thermometer, pressure sensor, or valve, or pump, or composition sensor, or any combination thereof. FC-1 may control and/or measure the flow rate of thermal storage medium, which may include, but is not limited to, warm thermal storage medium, which may be transferred into or out of the thermal storage tank or warm thermal storage region of the thermal storage tank. FC-1 may adjust the flow rate of a liquid phase or the flow rate of one liquid phase relative to another liquid phase to ensure, for example, the desired composition or concentrations are achieved in L-4. |
| FC-2 | FC-2 may comprise a flow controller, or flow meter, or temperature probe, or thermometer, pressure sensor, or valve, or pump, or composition sensor, or any combination thereof. FC-2 may control and/or measure the flow rate of thermal storage medium, which may include, but is not limited to, warm thermal storage medium, which may be transferred into or out of the thermal storage tank or warm thermal storage region of the thermal storage tank. FC-2 may adjust the flow rate of a liquid phase or the flow rate of one liquid phase relative to another liquid phase to ensure, for example, the desired composition or concentrations are achieved in L-4. |
| L-2 | L-2 may comprise warm thermal storage medium transferred into or out of a thermal storage tank or a warm region of a thermal storage tank. In some embodiments, L-2 may comprise a liquid phase selectively removed from a location within the warm thermal storage region, such as, for example, a region corresponding to a layer of or greater presence of said liquid phase. For example, L-2 may comprise at least a portion of a liquid phase removed from Port 1, which may correspond to a liquid phase with tendency to sink beneath another or the other liquid phase, or which may have a density greater than at least a portion of the other liquid phases in the warm thermal storage medium region. |
| L-3 | L-3 may comprise warm thermal storage medium transferred into or out of a thermal storage tank or a warm region of a thermal storage tank. In some embodiments, L-3 may comprise a liquid phase selectively removed from a location within the warm thermal storage region, such as, for example, a region corresponding to a layer of or greater presence of said liquid phase. For example, L-3 may comprise at least a portion of a liquid phase removed from Port 2, which may correspond to a liquid phase with tendency to float or rise above another or the other liquid phase, or which may have a density less than at least a portion of the other liquid phases in the warm thermal storage medium region. |
| V-1 | V-1 may comprise a valve, or a liquid stream merger, or a liquid stream splitter, or a liquid stream separator, or pump, or flow controller, or in-line mixer, or any combination thereof. V-1 may be designed to merge or mix L-2 and/or L-3. In some embodiments, V-1 may be capable of adjusting the relative ratio or flow rates of L-2 to L-3 and vice versa. In some embodiments, V-1 may be able to direct flow or shut off flow to L-2, or L-3, or L-4, or any combination thereof. |
| L-4 | L-4 may comprise warmed or heated or warm thermal storage medium. In FIG. 9, L-4 may be transferred from a thermal storage tank, or the warm region of a thermal storage tank, to a chiller or other cold source or cooling process, or to an application requiring heating, or any combination thereof. In FIG. 11, L-4 may be transferred from an application requiring cooling, or a thermal load, or a heat source, or any combination thereof, to the warm thermal storage region of the thermal storage tank. L-4 may comprise the same liquid composition as L-1, or may originate from L-1, or may comprise L-1 heated to a higher temperature, or any combination thereof. L-4 may comprise L-1 at a higher temperature or higher entropy state or after heating. L-4 may be at a multi-liquid phase combined solution state, or a single liquid phase combined solution state, or any combination thereof. |
| To Chiller | In some embodiments, 'To Chiller' may comprise heated or warm thermal storage medium supplied from a thermal storage tank or the warm thermal storage region of a thermal storage tank. 'To Chiller' may be shown in FIG. 9, which may show the thermal storage system charging. In some embodiments, 'To Chiller' may comprise a cold thermal storage medium supplied from a thermal storage tank. In some embodiments, 'To Chiller' may indicate the thermal storage system is charging, which may involve increasing the amount of cold thermal storage medium |

Example FIGS. 9-12 Key

| FIG. Label | Description |
|---|---|
| | inside the thermal storage tank or inside the cold thermal storage region of the thermal storage tank, or may involve creating new cold thermal storage medium by cooling warm thermal storage medium to form cold thermal storage medium. Warm thermal storage medium may comprise thermal storage medium at a higher temperature than cold thermal storage medium. In some embodiments, such as embodiments for cooling thermal storage, it may be desirable for the thermal storage medium transferred 'To Chiller' to be at a higher temperature or higher entropy state than the thermal storage medium transferred 'From Chiller'. In some embodiments, such as embodiments for heating thermal storage, it may be desirable for the thermal storage medium transferred 'From Chiller' to be at a higher temperature or higher entropy state than the thermal storage medium transferred 'To Chiller'. In some embodiments, 'To Chiller' and 'From Chiller' may be at about the same temperature or entropy, if, for example, the thermal storage medium bypasses a thermal load. In some embodiments, the thermal storage medium 'From Load' may comprise the same thermal storage medium as 'To Load', except at a different temperature or different entropy state. In some embodiments, the thermal storage medium 'To Chiller' may be at a multi-liquid phase mixture state, or a single liquid phase combined solution state, or any combination thereof. In some embodiments, 'To Chiller' may comprise the same liquid or liquid composition as 'From Chiller', except before a heat exchanger or passing through the chiller or other cooling process and/or except at a different temperature or entropy state. |
| From Load | In some embodiments, 'From Load' may comprise heated or warm thermal storage medium supplied from a thermal load, such as an application requiring cooling, or a heat source. 'From Load' may be shown in FIG. 11, which may show the thermal storage system discharging. In some embodiments, 'From Load' may comprise a cold thermal storage medium transferred to a thermal storage tank or cold region of a thermal storage tank. In some embodiments, 'From Load' may indicate the thermal storage system is discharging, which may involve decreasing the amount of cold thermal storage medium inside the thermal storage tank or inside the cold thermal storage region of the thermal storage tank, or may involve utilizing cold thermal storage medium to cool a thermal load, which may result in the formation of resulting warm thermal storage medium. Warm thermal storage medium may comprise thermal storage medium at a higher temperature than cold thermal storage medium. In some embodiments, such as embodiments for cooling thermal storage, it may be desirable for the thermal storage medium transferred 'From Load' to be at a higher temperature or higher entropy state than the thermal storage medium transferred 'To Load'. In some embodiments, such as embodiments for heating thermal storage, it may be desirable for the thermal storage medium transferred 'From Load' to be at a lower temperature or lower entropy state than the thermal storage medium transferred 'To Load'. In some embodiments, 'To Load' and 'From Load' may be at about the same temperature or entropy, if, for example, the thermal storage medium bypasses a thermal load. In some embodiments, the thermal storage medium 'From Load' may comprise the same thermal storage medium as 'To Load', except at a different temperature or different entropy state. In some embodiments, the thermal storage medium 'From Load' may be at a multi-liquid phase mixture state, or single liquid phase combined solution state, or any combination thereof. In some embodiments, 'From Load' may comprise the same liquid or liquid composition as 'To Load', except after heat exchanger or passing through a thermal load or heat exchanger and/or except at a different temperature or entropy state. |

Example FIGS. 9-12 Step-by-Step Description

1. Charging:
a. Warm thermal storage medium may be transferred from the warm thermal storage region of the thermal storage tank through ports located in the warm thermal storage region. For example, warm thermal storage medium may be transferred from the warm thermal storage region using Port 1 and/or Port 2. Warm thermal storage medium may enter Port 1 and transfer through H-1 to FC-1. Warm thermal storage medium may enter Port 2 and transfer to FC-2. Depending on, for example, the type of thermal storage medium and the residence time, in some embodiments, warm thermal storage medium in the warm thermal storage medium region may comprise two liquid phases, wherein, with sufficient residence time, a first liquid phase may tend to form a first more concentrated area or first layer and the second liquid phase may tend to form a second more concentrated area or second layer. In some embodiments, Port 1 may be located in the second liquid phase or second layer and Port 2 may be located in the first liquid phase or first layer. Port 1 may remove or transfer at least a portion of second liquid phase and Port 2 may remove or transfer at least a portion of first liquid phase. FC-1 may maintain or adjust the flow rate of liquid from Port 1, which may comprise L-2. FC-2 may maintain or adjust the flow rate of liquid from Port 2, which may comprise L-3. The relative flow rates of L-2 and L-3 may be adjusted or maintained to achieve a desired or optimal composition or concentration or ratio of chemicals or liquid phases in L-4, to, for example, including, but not limited to, achieve desired specific heat capacity, or heat capacity, or heat transfer coefficient, or viscosity, or other desired properties, or any combination thereof.

b. As thermal storage medium is removed from the warm thermal storage region and/or added to the cold thermal storage region, the volume of the warm thermal storage medium in the warm thermal storage region may decrease, while the volume of cold thermal storage medium in the cold thermal storage region may increase. The physical divider, such as Physical Divider 1, may be designed to divide or delineate the warm thermal storage region from the cold thermal storage region. In some embodiments, during charging, the position or elevation of the physical divider may be adjusted to, for example, account for the change in volume of the cold thermal storage region and/or the change in volume of the warm thermal storage region. For example, in FIG. 11, the elevation of the physical divider may be adjusted such that it is lowering or decreasing in response to the increasing volume of warm thermal storage medium and the decreasing volume of cold thermal storage medium due to the thermal storage system discharging. The rate of adjustment in the position or elevation of the physical divider may be based on the flow rate of warm thermal storage medium exiting the warm thermal storage region, or the flow rate of cold thermal storage medium entering the cold thermal storage region, or the geometry of the tank, or any combination thereof. The position or elevation of the physical divider may be adjusted using an adjustment mechanism. For example, Physical Divider 1 may be connected to lines or cables, such as C-1 or C-2, which may be connected to length adjustment mechanisms, such as Adjust 1 or Adjust 2, which may adjust the elevation of the physical divider as desired. Similarly, the elevation or position of Port 1, which may be connected to the physical divider, may be adjusted together with the physical divider, or separately from the physical divider, or any combination thereof. Similarly, the elevation or position of H-1, which may be connected to the physical divider or may be connected to Port 1, may be adjusted together with the physical divider, or separately from the physical divider, or together with Port 1, or separately from Port 1, or any combination thereof.

c. L-2 and L-3 may be transferred from the FC-1 and FC-2 to a static mixer or merging valve, such as V-1, which may result in the formation of a combined thermal storage medium, such as L-4. In some embodiments, L-4 may comprise a liquid-liquid phase transition liquid at a multi-liquid phase mixture state. In some embodiments, it may be desirable for L-4 to be at a desirable concentration or composition or any combination thereof.

d. L-4 may be transferred to a chiller, or an application requiring heating, or other cooling source, or any combination thereof. At the cooling source, L-4 may be cooled to a temperature at or below a liquid-liquid phase transition temperature range and/or may form a thermal storage medium solution at a lower temperature and/or lower entropy state, such as L-1.

e. Cold thermal storage medium, such as L-1, may be transferred from a cooling source to a FC-3. FC-3 may control or monitor flow rate of L-1 and/or other properties and attributes.

f. Cold thermal storage medium, such as L-1, may be added to the cold thermal storage region of the thermal storage tank and/or may be added using Port 4.

2. Steady State Charged:
a. In some embodiments, when charging or discharging is stopped or paused, the flow of thermal storage medium into or out of the thermal storage tank may also be paused. In some embodiments, if charging or discharging is paused, movement or adjustment of the physical divider may also be paused. In some embodiments, if in a thermal storage region a thermal storage medium comprises a multi-liquid phase mixture, some liquid phases may settle or separate into layers or regions which are more concentrated in one liquid phase than another liquid phase. The degree or significance of said settling may be dependent on the properties of the thermal storage medium, or the temperature, or the residence time, or any combination thereof. A steady state may mean the thermal storage system is at a state wherein the volume or amount of cold thermal storage medium, or warm thermal storage medium, or any combination thereof is remaining constant or relatively constant. In some embodiments, 'charged' may mean the thermal storage system contains at least a portion of thermal storage medium at a desired temperature range for the load. For example, if the thermal storage system is being used for cold thermal storage, than charged may mean there is a useable amount of cold thermal storage medium in the temperature storage tank. For example, if the thermal storage system is being used for heat thermal storage, than charged may mean there is a useable amount of warm thermal storage medium in the temperature storage tank. Fully charged may mean the amount of thermal storage medium at a desired temperature for the load is at or near the maximum capacity of the thermal storage tank or thermal storage system.

3. Discharging:
a. Cold thermal storage medium may be transferred from the cold thermal storage region of the thermal storage tank to a load, such as a thermal load, or an application requiring cooling, and may comprise L-1s. Cold thermal storage medium may be transferred from the cold thermal storage region of the thermal storage tank through a port, such as Port 4, and may be transferred to FC-3 before being transferred to said load, or thermal load, or application requiring cooling.

b. As thermal storage medium is removed from the cold thermal storage region and/or added to the warm thermal storage region, the volume of the cold thermal storage medium in the cold thermal storage region may decrease, while the volume of warm thermal storage medium in the warm thermal storage region may increase. The physical divider, such as Physical Divider 1, may be designed to divide or delineate the warm thermal storage region from the cold thermal storage region. In some embodiments, during discharging, the position or elevation of the physical divider may be adjusted to, for example, account for the change in volume of the cold thermal storage region and/or the change in volume of the warm thermal storage region. For example, in FIG. 11, the elevation of the physical divider may be adjusted such that it is lowering or decreasing in response to the increasing volume of warm thermal storage medium and the decreasing volume of cold thermal storage medium due to the thermal storage system discharging. The rate of adjustment in the position or elevation of the physical divider may be based on the flow rate of warm thermal storage medium entering the warm thermal storage region, or the flow rate of cold thermal storage medium exiting the cold thermal storage region, or the geometry of the tank, or any combination thereof. The position or elevation of the physical divider may be adjusted using an adjustment mechanism. For example, Physical Divider 1 may be connected to lines or cables, such as C-1 or C-2, which may be connected to length adjustment mechanisms, such as Adjust 1 or Adjust 2, which may adjust the elevation of the physical divider as desired. Similarly, the elevation or position of Port 1, which may be connected to the physical divider, may be adjusted together with the physical divider, or separately from the physical divider, or any combination thereof. Similarly, the elevation or position of H-1, which may be connected to the physical divider or may be connected to Port 1, may be adjusted together with the physical divider, or separately from the physical divider, or together with Port 1, or separately from Port 1, or any combination thereof.

c. Cold thermal storage medium, such as L-1, may be heat exchanged with a thermal load, or an application requiring cooling, which may result in the formation of thermal storage medium at a higher temperature or higher entropy state, which may comprise warm thermal storage medium or L-4.

d. Warm thermal storage medium, such as L-4, may be transferred and/or added to the warm thermal storage region of the thermal storage tank. In some embodiments, L-4 may be transferred into the warm thermal storage region through multiple ports. In some embodiments, L-4 may be transferred into the warm thermal storage region through a single port. In some embodiments, a valve and/or flow controller may be employed to control the port or ports and respective flow rate of thermal storage medium entering a port or each port. In some embodiments, it may be desirable for the warm thermal storage medium to enter the warm thermal storage medium region through one port, which may facilitate separation of a multi-liquid phase mixture into liquid layers comprising each respective liquid phase. In some embodiments, it may be desirable for the warm thermal storage medium to enter the warm thermal storage medium region through multiple ports, which may facilitate the dispersion of liquid phases of a multi-liquid phase mixture and/or minimize or prevent the separation of liquid phases into layers comprising each respective liquid phase. In some embodiments, it may be desirable for the warm thermal storage medium to enter the warm thermal storage medium region through multiple ports, which may facilitate separation of a multi-liquid phase mixture into liquid layers comprising each respective liquid phase. In some embodiments, it may be desirable for the warm thermal storage medium to enter the warm thermal storage medium region through one port, which may facilitate the dispersion of liquid phases of a multi-liquid phase mixture and/or minimize or prevent the separation of liquid phases into layers comprising each respective liquid phase.

4. Steady State Discharged:

a. In some embodiments, when charging or discharging is stopped or paused, the flow of thermal storage medium into or out of the thermal storage tank may also be paused. In some embodiments, if charging or discharging is paused, movement or adjustment of the physical divider may also be paused. In some embodiments, if in a thermal storage region a thermal storage medium comprises a multi-liquid phase mixture, some liquid phases may settle or separate into layers or regions which are more concentrated in one liquid phase than another liquid phase. The degree or significance of said settling may be dependent on the properties of the thermal storage medium, or the temperature, or the residence time, or any combination thereof. A steady state may mean the thermal storage system is at a state wherein the volume or amount of cold thermal storage medium, or warm thermal storage medium, or any combination thereof is remaining constant or relatively constant. Discharged may mean the amount of thermal storage medium at a desired temperature for the load is less than the maximum capacity of the thermal storage tank or thermal storage system. Fully discharged may mean there is little or no usable thermal storage medium at a desired temperature for the load.

Example FIGS. 13-16 Description

FIGS. 13-16 may comprise a thermal storage system with a thermal storage medium physically isolated or separate from a heat transfer medium by a heat exchanger.

Example FIGS. 13-16 Key

| FIG. Label | Description |
|---|---|
| From Chiller | In some embodiments, 'From Chiller' may comprise a heat transfer medium supplied from a chiller, or application requiring heating, or other cooling source, or any combination thereof. In some embodiments, 'From Chiller' may comprise a heat transfer medium supplied from a heater or other heating source. In some embodiments, 'From Chiller' may indicate the thermal storage system is charging. In some embodiments, such as embodiments for cooling thermal storage, it may be desirable for the heat transfer medium transferred 'From Chiller' to be at a lower temperature or lower entropy state than the heat transfer medium transferred 'To Chiller'. A heat transfer medium may comprise, including, but not limited to, one or more or any combination of the following: a liquid, or a gas, or solid, or a supercritical fluid, or a phase change material, or a gas-liquid phase change fluid, or solid-liquid phase change material, or a phase transition material, or a solid-solid phase transition material, or a liquid-liquid phase transition liquid. In some embodiments, the heat transfer medium 'From Chiller' may comprise the same heat transfer medium 'To Chiller', except after cooling said heat transfer medium to a lower temperature or lower entropy state. In some embodiments, 'To Chiller' and 'From Chiller' may be at about the same temperature or entropy, if, for example, the heat transfer medium bypasses the Heat Exchanger with the thermal storage |

| | Example FIGS. 13-16 Key |
|---|---|
| FIG. Label | Description |
| | system, or the heat transfer medium bypasses a thermal load, or any combination thereof. In some embodiments, the heat transfer medium 'From Chiller' may comprise the same heat transfer as 'To Chiller', except at a different temperature or different entropy state. |
| To Chiller | in some embodiments, 'To Chiller' may comprise a heat transfer medium transferred to a chiller, or application requiring heating, or other cooling source, or any combination thereof. In some embodiments, 'To Chiller' may comprise a heat transfer medium supplied from a heater or other heating source. In some embodiments, 'To Chiller' may indicate the thermal storage system is charging. In some embodiments, such as embodiments for cooling thermal storage, it may be desirable for the heat transfer medium transferred 'To Chiller' to be at a higher temperature or higher entropy state than the heat transfer medium transferred 'From Chiller'. A heat transfer medium may comprise, including, but not limited to, one or more or any combination of the following: a liquid, or a gas, or solid, or a supercritical fluid, or a phase change material, or a gas-liquid phase change fluid, or solid-liquid phase change material, or a phase transition material, or a solid-solid phase transition material, or a liquid-liquid phase transition liquid. In some embodiments, the heat transfer medium 'To Chiller' may comprise the same heat transfer medium as 'From Chiller', except after cooling said heat transfer medium to a lower temperature or lower entropy state. In some embodiments, 'To Chiller' and 'From Chiller' may be at about the same temperature or entropy, if, for example, the heat transfer medium bypasses the Heat Exchanger with the thermal storage system, or the heat transfer medium bypasses a thermal load, or any combination thereof. In some embodiments, the heat transfer medium 'From Chiller' may comprise the same heat transfer medium as 'To Chiller', except at a different temperature or different entropy state. |
| To Load | In some embodiments, 'To Load' may comprise a heat transfer medium supplied from heat exchanging with cold thermal storage medium in a thermal storage system, and may comprise cold heat transfer medium. In some embodiments, 'To Load' may indicate the thermal storage system is discharging. In some embodiments, such as embodiments for cooling thermal storage, it may be desirable for the heat transfer medium transferred 'To Load' to be at a lower temperature or lower entropy state than the heat transfer medium transferred 'From Load'. A heat transfer medium may comprise, including, but not limited to, one or more or any combination of the following: a liquid, or a gas, or solid, or a supercritical fluid, or a phase change material, or a gas-liquid phase change fluid, or solid-liquid phase change material, or a phase transition material, or a solid-solid phase transition material, or a liquid-liquid phase transition liquid. In some embodiments, the heat transfer medium 'To Load' may comprise the same heat transfer medium as 'From Load', except after cooling said heat transfer medium to a lower temperature or lower entropy state. In some embodiments, 'To Load' and 'From Load' may be at about the same temperature or entropy, if, for example, the heat transfer medium bypasses the Heat Exchanger with the thermal storage system, or the heat transfer medium bypasses a thermal load, or any combination thereof. In some embodiments, the heat transfer medium 'From Load' may comprise the same heat transfer medium as 'To Load', except at a different temperature or different entropy state. Heat transfer medium transferred 'To Load' may be transferred to one or more or a combination of thermal loads, which may include, but are not limited to, applications requiring cooling, or heat sources, or any combination thereof. Example loads may include, but are not limited to, one or more or any combination of the following: HVAC, or buildings, or data centers, or process cooling, or district cooling, or district heating, or process heating, or power generation, or desalination, or dehydration, or dehumidification, or water treatment, or medical application, or charging other thermal storage, or rockets, or condensation, or compression. |
| From Load | In some embodiments, 'From Load' may comprise a heat transfer medium after heat exchanging or receiving or removing heat from a thermal load, such as an application requiring cooling or a heat source. In some embodiments, 'From Load' may indicate the thermal storage system is discharging. In some embodiments, such as embodiments for cooling thermal storage, it may be desirable for the heat transfer medium transferred 'From Load' to be at a higher temperature or higher entropy state than the heat transfer medium transferred 'From Load'. A heat transfer medium may comprise, including, but not limited to, one or more or any combination of the following: a liquid, or a gas, or solid, or a supercritical fluid, or a phase change material, or a gas-liquid phase change fluid, or solid-liquid phase change material, or a phase transition material, or a solid-solid phase transition material, or a liquid-liquid phase transition liquid. In some embodiments, the heat transfer medium 'From Load' may comprise the same heat transfer medium as 'To Load', except after heating said heat transfer medium to a higher temperature or higher entropy state. In some embodiments, 'To Load' and 'From Load' may be at about the same temperature or entropy, if, for example, the heat transfer medium bypasses the Heat Exchanger with the thermal storage system, or the heat transfer medium bypasses a thermal load, or any combination thereof. In some embodiments, the heat transfer medium 'From Load' may comprise the same heat |

Example FIGS. 13-16 Key

| FIG. Label | Description |
|---|---|
| | transfer medium as 'To Load', except at a different temperature or different entropy state. Heat transfer medium transferred 'From Load' may be transferred from one or more or a combination of thermal loads, which may include, but are not limited to, applications requiring cooling, or heat sources, or any combination thereof. Example loads may include, but are not limited to, one or more or any combination of the following: HVAC, or buildings, or data centers, or process cooling, or district cooling, or district heating, or process heating, or power generation, or desalination, or dehydration, or dehumidification, or water treatment, or medical application, or charging other thermal storage, or rockets, or condensation, or compression. |
| L-6 | L-6 may comprise cold heat transfer medium transferred 'From Chiller'. L-6 may be heat exchanged with warm thermal storage medium, L-5, to produce warm heat transfer medium, L-7, and cold thermal storage medium, L-1. It may be desirable for L-6 to be at a lower temperature than the desired temperature or target temperature of L-1. In some embodiments, the heat transfer medium in L-6 may comprise a different composition than the thermal storage medium in L-5. In some embodiments, the heat transfer medium in L-6 may comprise different properties or characteristics than the thermal storage medium in L-5. For example, in some embodiments, the heat transfer medium in L-6 may comprise freshwater, while the thermal storage medium in L-5 may comprise a liquid-liquid phase transition liquid. For example, in some embodiments, the heat transfer medium in L-6 may comprise a gas-liquid phase transition fluid, while the thermal storage medium in L-5 may comprise a liquid-liquid phase transition liquid. In some embodiments, the heat transfer medium in L-6 may comprise the same or similar composition or properties as the thermal storage medium in L-5. A heat transfer medium may comprise, including, but not limited to, one or more or any combination of the following: a liquid, or a gas, or solid, or a supercritical fluid, or a phase change material, or a gas-liquid phase change fluid, or solid-liquid phase change material, or a phase transition material, or a solid-solid phase transition material, or a liquid-liquid phase transition liquid. In some embodiments, the heat transfer medium 'L-6' may comprise the same heat transfer medium as 'L-7', except after heating said heat transfer medium to a higher temperature or higher entropy state. In some embodiments, 'L-6' and 'L-7' may be at about the same temperature or entropy, if, for example, the heat transfer medium bypasses the Heat Exchanger with the thermal storage system, or the heat transfer medium bypasses a thermal load, or any combination thereof. In some embodiments, the heat transfer medium 'L-6' may comprise the same heat transfer medium as 'L-7', except at a different temperature or different entropy state. |
| L-7 | L-7 may comprise warm heat transfer medium transferred 'To Chiller after a heat exchange with warm thermal storage medium. L-7 may be transferred to a chiller, or an application requiring heating, or a cold source. It may be desirable for L-7 to be at a higher temperature than the desired temperature or target temperature of L-1. In some embodiments, the heat transfer medium in L-7 may comprise a different composition than the thermal storage medium in L-5. In some embodiments, the heat transfer medium in L-7 may comprise different properties or characteristics than the thermal storage medium in L-5. For example, in some embodiments, the heat transfer medium in L-7 may comprise freshwater, while the thermal storage medium in L-5 may comprise a liquid-liquid phase transition liquid. For example, in some embodiments, the heat transfer medium in L-7 may comprise a gas-liquid phase transition fluid, while the thermal storage medium in L-5 may comprise a liquid-liquid phase transition liquid. In some embodiments, the heat transfer medium in L-7 may comprise the same or similar composition or properties as the thermal storage medium in L-5. A heat transfer medium may comprise, including, but not limited to, one or more or any combination of the following: a liquid, or a gas, or solid, or a supercritical fluid, or a phase change material, or a gas-liquid phase change fluid, or solid-liquid phase change material, or a phase transition material, or a solid-solid phase transition material, or a liquid-liquid phase transition liquid. In some embodiments, the heat transfer medium 'L-6' may comprise the same heat transfer medium as 'L-7', except after heating said heat transfer medium to a higher temperature or higher entropy state. In some embodiments, 'L-6' and 'L-7' may be at about the same temperature or entropy, if, for example, the heat transfer medium bypasses the Heat Exchanger with the thermal storage system, or the heat transfer medium bypasses a thermal load, or any combination thereof. In some embodiments, the heat transfer medium 'L-6' may comprise the same heat transfer medium as 'L-7', except at a different temperature or different entropy state. |
| Heat Exchanger | The 'Heat Exchanger' may comprise a mechanism for transferring heat between the thermal storage medium and the heat transfer medium. The 'Heat Exchanger' may comprise a mechanism for transferring heat between the thermal storage medium, for example L-1 and L-5, and the heat transfer medium, for example L-6 and L-7. In some embodiments, the thermal storage medium may be physically isolated from the heat transfer medium, which may be beneficial due to, including, but not limited to, one or more or any combination of the following: greater longevity of thermal storage medium, or enable thermal storage medium to be |

Example FIGS. 13-16 Key

| FIG. Label | Description |
|---|---|
| | optimized for heat capacity rather than or in addition to heat transfer properties, or prevent biofouling of thermal storage medium, or prevent degradation of thermal storage medium, or prevent fouling, or prevent corrosion, or prevent material compatibility challenges between the thermal storage medium and materials in external equipment, or reduce system changes, or reduce operational changes, or reduce risk. A heat exchanger may be employed to enable said isolation between the thermal storage medium and the heat transfer medium. In some embodiments, the Heat Exchanger may enable the transfer of heat while enabling the thermal storage medium and the heat transfer medium to be physically separate or non-contiguous. In some embodiments, the Heat Exchanger may enable the transfer of heat while physically contacting the thermal storage medium and the heat transfer medium. The 'Heat Exchanger' may comprise a counter flow heat exchange, or parallel flow heat exchanger, or other heat exchanger design, or any combination thereof. The Heat Exchanger may comprise, including, but not limited to, one or more or any combination of the following: plate heat exchanger, or tube in tube heat exchanger, or double tube heat exchanger, or shell and tube heat exchanger, or flexible wall heat exchanger, or membrane heat exchanger. |
| L-1 | L-1 may comprise cold thermal storage medium. In FIG. 13, L-1 may comprise cold thermal storage medium resulting from heat exchange with cold heat transfer medium and/or L-1 may be transferred to the thermal storage tank. In FIG. 15, L-1 may comprise cold thermal storage medium transferred from the thermal storage tank to a heat exchanger and/or wherein at said heat exchanger, L-1 heat exchanges with warm heat transfer medium to from cold heat transfer medium and/or resulting in the formation of warm thermal storage medium, which may comprise L-5. L-1 may comprise cooled or cold thermal storage medium. L-1 may comprise the same liquid composition as L-5, or may originate from L-5, or may comprise L-5 cooled to a lower temperature, or any combination thereof. L-1 may comprise L-5 at a lower temperature or lower entropy state or after cooling. L-1 may be at a single liquid phase combined solution state, or a multi-liquid phase mixture state, or any combination thereof. In the present figures, it may be desirable for L-1 to be at a single liquid phase combined solution state, or at a multi-liquid phase mixture state wherein the liquid phases are at least partially suspended, or are at least partially dispersed, or are of similar density, or any combination thereof. In the present figures, it may be desirable for L-1 to be at a single liquid phase combined solution state, or at a multi-liquid phase mixture state wherein the liquid phases are at least partially suspended, or are at least partially dispersed, or are of similar density, or any combination thereof, for example, because the cold thermal storage region may only have a port at one elevation within the tank or one port. It is important to note some embodiments may have more than one port, or ports at different elevations, or ports in different locations, or ports in different positions, or mobile ports, or ports with adjustable location, or any combination thereof in, for example, a cold thermal storage region, or warm thermal storage region, or any combination thereof. |
| FC-3 | FC-3 may be located on L-1 or may be combined with P-1. FC-3 may comprise a flow controller, or flow meter, or temperature probe, or thermometer, pressure sensor, or valve, or pump, or composition sensor, or any combination thereof. FC-3 may control and/or measure the flow rate of thermal storage medium, which may include, but is not limited to, cold thermal storage medium, which may be transferred into or out of the thermal storage tank or cold thermal storage region of the thermal storage tank. |
| Port 4 | Port 4 may comprise an inlet, or outlet, or hole, or port, or any combination thereof designed enable the addition of or removal of thermal storage medium to or from the thermal storage tank to or from one or more locations within the thermal storage tank. Port 4 may be designed to transfer thermal storage medium from the cold thermal storage medium region of the thermal storage tank. In some embodiments, Port 4 may be located at or near the bottom of the thermal storage tank or the cold thermal storage tank region. |
| Cold | 'Cold' may be a label for the cold thermal storage medium region or cold thermal storage region of the thermal storage tank. 'Cold' may mean the thermal storage medium is at a temperature lower than the 'warm' thermal storage medium or warm thermal storage region. Cold may mean a liquid-liquid phase transition thermal storage medium is at or below a liquid-liquid phase transition temperature range, or the thermal storage medium is at a lower entropy state than the warm thermal storage liquid. For example, in some embodiments, a thermal storage medium at a single liquid phase combined solution state may be at a lower entropy state than a thermal storage medium at a multi-liquid phase mixture state. For example, in some embodiments, a thermal storage medium at a multi-liquid phase mixture state may be at a lower entropy state than a thermal storage medium at a single liquid phase combined solution state. |
| Physical Divider 1 | Physical Divider 1 may comprise a solid material which is located between the warm thermal storage region and the cold thermal storage region. The physical divider may be designed to delineate the cold thermal storage region from the warm thermal storage region, or be designed to be located at the hypothetical interface between the cold thermal storage region and the warm thermal storage region, or |

Example FIGS. 13-16 Key

| FIG. Label | Description |
|---|---|
| | any combination thereof. A physical divider may be designed to prevent or minimize mixing between the warm thermal storage region and the cold thermal storage region. In some embodiments, a physical divider may comprise a solid material which cross-cuts the full or nearly the full cross sectional area of at least a portion of the inside of a thermal storage tank. A physical divider may be designed to be mobile and/or may be designed such that the position or elevation of the physical divider can be adjusted or changed. For example, in some embodiments, the physical divider may change elevation or position within a tank to ensure it maintains a position or location at or near the hypothetical interface between the warm thermal storage region and cold thermal storage region. For example, in some embodiments, during charging, the elevation of the physical divider may increase, and/or, in some embodiments, during discharging, the elevation of the physical divider may decrease. In some embodiments, the position or elevation of the physical divider may adjust due to passive mechanisms, such as, for example, relative buoyancy or relative density. In some embodiments, the position or elevation of the physical divider may be adjusted using an active mechanism, which may include, but is not limited to, one or more or any combination of the following: line, or cable, or reel, or screw, or threaded rod, or threaded hole, or magnetism, or electrostatic charge, or actuator, or piston, or pneumatic method, or hydraulic method, or electromechanical method, or electro fluidic method. An active mechanism may adjust the position or elevation of a physical divider to at or near an optimal position using, for example, information on the flow rates of cold and/or warm thermal storage medium entering and/or exiting the tank, the geometry of the tank, and/or other information or calculations, or any combination thereof. In some embodiments, the physical divider may be attached to a component of an active adjustment mechanism, such as a line, or cable, or rod, or threaded rod, or pole, or actuator, or magnet. In some embodiment, the physical divider may comprise a rigid material. In some embodiments, the physical divider may form a narrow junction or almost a seal or a seal between the tank wall and the physical divider, which may minimize mixing of between the warm thermal storage medium and cold thermal storage medium at or near the physical divider. In some embodiments, the physical divider may comprise a rigid material with a flexible material at the perimeter. For example, in some embodiments, the physical divider may employ a flexible or elastic material on at least a portion of the perimeter of the physical divider such that the flexible or elastic material may be in contact with a tank wall, which may minimize mixing of warm thermal storage medium with cold thermal storage medium at or near the physical divider and/or while enabling movement or adjustment of position of the physical divider. In some embodiments, the physical divider may form a seal with a tank wall, which, in some embodiments, may be similar to the seal formed by a drum within a syringe. In some embodiments, it may be desirable for the physical divider to be at least a partially insulative, which may mean it may be desirable for the physical divider to minimize heat transfer between the warm thermal storage medium region and the cold thermal storage medium region at or near the physical divider. In some embodiments it may be desirable for the physical divider to have a density significantly greater than the density of one or more or all the liquid phases of the thermal storage medium. In some embodiments, it may be desirable for the physical divider to have a negative buoyancy or net downward gravitational force sufficient to overcome any upward lift imposed by the flexible hose and/or any friction force between the physical divider and the tank wall. In some embodiments it may be desirable for the physical divider to have a density significantly less than the density of one or more or all the liquid phases of the thermal storage medium. In some embodiments it may be desirable for the physical divider to have a density about the same as the density of one or more of the liquid phases of the thermal storage medium. In some embodiments it may be desirable for the physical divider to have a density greater than one or more of the liquid phases of the thermal storage medium and/or it may be desirable for the physical divider to have a density less than one or more of the liquid phases of the thermal storage medium. |
| Port 1 | Port 1 may comprise an inlet, or outlet, or hole, or port, or any combination thereof designed enable the addition of or removal of thermal storage medium to or from the thermal storage tank and/or to or from one or more locations within the thermal storage tank. Port 1 may be designed to transfer thermal storage medium from the warm thermal storage medium region of the thermal storage tank. In some embodiments, Port 1 may be located at or near the bottom of the warm thermal storage tank region. In some embodiments, Port 1 may be located on, or near, or attached to the physical divider or Physical Divider 1. Port 1 may be attached to or connected to a flexible or expandible or collapsible hose, which may comprise H-1. In some embodiments, thermal storage medium may be transferred to or from Port 1 by means of a flexible or expandible or collapsible hose, which may comprise H-1. In some embodiments, the thermal storage medium in the warm thermal storage region may comprise a two liquid phase mixture, wherein a first liquid phase possesses a density greater than a second liquid phase and the first liquid phase and second liquid phase tend to separate out over time into layers |

-continued

Example FIGS. 13-16 Key

| FIG. Label | Description |
|---|---|
| | comprising a first liquid phase layer and a second liquid phase layer. It may be desirable for Port 1 to be located near the bottom or lower elevation portion of the warm thermal storage region to enable or make possible the selective removal of or addition of at least a portion of first liquid phase or selective removal of or addition of at least a portion of thermal storage medium from the first liquid phase layer. The location or position or elevation of Port 1 may be adjustable and/or may adjust depending on, for example, including, but not limited to, one or more or any combination of the following: the location of liquid phases within the warm thermal storage region, or the volume of warm thermal storage medium, or the volume of cold thermal storage medium, or residence time, or the position or elevation of the physical divider, or the temperature of one or more liquid phases, or the density of one or more liquid phases, or the temperature of the warm or cold thermal storage media. |
| H-1 | H-1 may comprise a flexible, or expandable, or collapsible, or elastic, or stretchable hose or tube. H-1 may enable the transfer of thermal storage medium to or from Port 1, or a port a substantial distance from a tank wall, or a port which may change position within the tank. H-1 may enable the removal or addition of thermal storage medium or a liquid phase of a thermal storage medium while the position or elevation of a port, or Port 1, or the physical divider changes. |
| C-1 | C-1 may comprise a cable or thread employed to maintain or adjust the position or elevation of the physical divider. In some embodiments, one cable or thread may be required. In some embodiments, more than one cable or thread may be required or desired. In some embodiments, the cable or thread may be employed in various configurations. For example, in some embodiments, a single cable or thread my split or connect to multiple cables or threads which may connect to the physical divider and/or may facilitate a dispersal of forces applied to the physical divider and/or may enable a more balanced or balanced distribution of forces applied to the physical divider and/or may reduce risk of tangling and/or may minimize tank volume occupied by adjustment mechanism and/or may minimize any potential fluid flow disturbance caused by the presence of a cable or thread. The length of C-1 may be adjusted to adjust the position and/or elevation of the physical divider and/or Port 1 and/or H-l. The length of C-1 may be adjusted by a length adjustment mechanism, such as Adjust 1, which may comprise, for example, including, but not limited to, a reel or winch. |
| C-2 | C-2 may comprise a cable or thread employed to maintain or adjust the position or elevation of the physical divider. In some embodiments, one cable or thread may be required. In some embodiments, more than one cable or thread may be required or desired. In some embodiments, the cable or thread may be employed in various configurations. For example, in some embodiments, a single cable or thread my split or connect to multiple cables or threads which may connect to the physical divider and/or may facilitate a dispersal of forces applied to the physical divider and/or may enable a more balanced or balanced distribution of forces applied to the physical divider and/or may reduce risk of tangling and/or may minimize tank volume occupied by adjustment mechanism and/or may minimize any potential fluid flow disturbance caused by the presence of a cable or thread. The length of C-2 may be adjusted to adjust the position and/or elevation of the physical divider and/or Port 1 and/or H-l. The length of C-2 may be adjusted by a length adjustment mechanism, such as Adjust 2, which may comprise, for example, including, but not limited to, a reel or winch. |
| Warm | 'Warm' may be a label for the warm thermal storage medium region or warm thermal storage region of the thermal storage tank. 'Warm' may mean the thermal storage medium is at a temperature greater than the 'cold' thermal storage medium or cold thermal storage region. Warm may mean a liquid-liquid phase transition thermal storage medium is at or above a liquid-liquid phase transition temperature range, or the thermal storage medium is at a higher entropy state than the cold thermal storage liquid. For example, in some embodiments, a thermal storage medium at a single liquid phase combined solution state may be at a lower entropy state than a thermal storage medium at a multi-liquid phase mixture state. For example, in some embodiments, a thermal storage medium at a multi-liquid phase mixture state may be at a lower entropy state than a thermal storage medium at a single liquid phase combined solution state. |
| Port 2 | Port 2 may comprise an inlet, or outlet, or hole, or port, or any combination thereof designed enable the addition of or removal of thermal storage medium to or from the thermal storage tank to or from one or more locations within the thermal storage tank. Port 2 may be designed to transfer thermal storage medium from the warm thermal storage medium region of the thermal storage tank. In some embodiments, Port 2 may be located at or near the top of the thermal storage tank or the warm thermal storage tank region. In some embodiments, the thermal storage medium in the warm thermal storage region may comprise a two liquid phase mixture, wherein a first liquid phase possesses a density greater than a second liquid phase and the first liquid phase and second liquid phase tend to separate out over time into layers comprising a first liquid phase layer and a second liquid phase layer. It may be desirable for Port 2 to be located near the top or higher elevation portion of the warm thermal storage region to enable or make possible the selective removal |

-continued

Example FIGS. 13-16 Key

| FIG. Label | Description |
|---|---|
| | of or addition of at least a portion of second liquid phase or selective removal of or addition of at least a portion of thermal storage medium from the second liquid phase layer. |
| Adjust 1 | Adjust 1 may comprise an adjustment mechanism. For example, Adjust 1 may comprise a mechanism for adjusting or controlling or maintaining the length of a cable or line employed to adjust or maintain the position or elevation of the physical divider, such as, for example, C-1 or C-2. Adjust 1 may comprise, for example, a reel, or an electronic reel, or a winch, or an electronic wind, or a variable rotation rate reel or winch, or any combination thereof. Adjust 1 may communicate with a central control system or other control system, which determines the rate of adjustment, if any, required in the position of the physical divider based on one or more or any combination of system operating conditions or information. In some embodiments, Adjust 1 and Adjust 2 may comprise a single or combined adjustment mechanism or device. In some embodiments, Adjust 1 and Adjust 2 may comprise a separate adjustment mechanism or device. |
| Adjust 2 | Adjust 2 may comprise an adjustment mechanism. For example, Adjust 2 may comprise a mechanism for adjusting or controlling or maintaining the length of a cable or line employed to adjust or maintain the position or elevation of the physical divider, such as, for example, C-1 or C-2. Adjust 1 may comprise, for example, a reel, or an electronic reel, or a winch, or an electronic wind, or a variable rotation rate reel or winch, or any combination thereof. Adjust 2 may communicate with a central control system or other control system, which determines the rate of adjustment, if any, required in the position of the physical divider based on one or more or any combination of system operating conditions or information. In some embodiments, Adjust 1 and Adjust 2 may comprise a single or combined adjustment mechanism or device. In some embodiments, Adjust 1 and Adjust 2 may comprise a separate adjustment mechanism or device. |
| FC-1 | FC-1 may comprise a flow controller, or flow meter, or temperature probe, or thermometer, pressure sensor, or valve, or pump, or composition sensor, or any combination thereof. FC-1 may control and/or measure the flow rate of thermal storage medium, which may include, but is not limited to, warm thermal storage medium, which may be transferred into or out of the thermal storage tank or warm thermal storage region of the thermal storage tank. FC-1 may adjust the flow rate of a liquid phase or the flow rate of one liquid phase relative to another liquid phase to ensure, for example, the desired composition or concentrations are achieved in L-4. |
| FC-2 | FC-2 may comprise a flow controller, or flow meter, or temperature probe, or thermometer, pressure sensor, or valve, or pump, or composition sensor, or any combination thereof. FC-2 may control and/or measure the flow rate of thermal storage medium, which may include, but is not limited to, warm thermal storage medium, which may be transferred into or out of the thermal storage tank or warm thermal storage region of the thermal storage tank. FC-2 may adjust the flow rate of a liquid phase or the flow rate of one liquid phase relative to another liquid phase to ensure, for example, the desired composition or concentrations are achieved in L-4. |
| L-2 | L-2 may comprise warm thermal storage medium transferred into or out of a thermal storage tank or a warm region of a thermal storage tank. In some embodiments, L-2 may comprise a liquid phase selectively removed from a location within the warm thermal storage region, such as, for example, a region corresponding to a layer of or greater presence of said liquid phase. For example, L-2 may comprise at least a portion of a liquid phase removed from Port 1, which may correspond to a liquid phase with tendency to sink beneath another or the other liquid phase, or which may have a density greater than at least a portion of the other liquid phases in the warm thermal storage medium region. |
| L-3 | L-3 may comprise warm thermal storage medium transferred into or out of a thermal storage tank or a warm region of a thermal storage tank. In some embodiments, L-3 may comprise a liquid phase selectively removed from a location within the warm thermal storage region, such as, for example, a region corresponding to a layer of or greater presence of said liquid phase. For example, L-3 may comprise at least a portion of a liquid phase removed from Port 2, which may correspond to a liquid phase with tendency to float or rise above another or the other liquid phase, or which may have a density less than at least a portion of the other liquid phases in the warm thermal storage medium region. |
| V-1 | V-1 may comprise a valve, or a liquid stream merger, or a liquid stream splitter, or a liquid stream separator, or pump, or flow controller, or in-line mixer, or any combination thereof. V-1 may be designed to merge or mix L-2 and/or L-3. In some embodiments, V-1 may be capable of adjusting the relative ratio or flow rates of L-2 to L-3 and vice versa. In some embodiments, V-1 may be able to direct flow or shut off flow to L-2, or L-3, or L-4, or any combination thereof. |
| L-4 | L-4 may comprise warmed or heated or warm thermal storage medium. In FIG. 13, L-4 may comprise warm thermal storage medium transferred from the warm thermal storage region and/or may comprise a liquid-liquid phase transition liquid created by mixing two or more liquid phases, or by mixing L-2 and L-3, or any combination thereof. In FIG. 15, L-4 may comprise a warm thermal storage |

| FIG. Label | Description |
|---|---|
| | medium after heat exchange heat transfer medium. In some embodiments, L-4 may comprise the same liquid composition as L-1, or may originate from L-1, or may comprise L-1 heated to a higher temperature, or any combination thereof. L-4 may comprise L-1 at a higher temperature or higher entropy state or after heating. L-4 may be at a multi-liquid phase combined solution state, or a single liquid phase combined solution state, or any combination thereof. |
| P-1 | P-1 may comprise a pump, or FC, or flow controller, or sensors, or any combination thereof. P-1, as with other components described herein, may be in the location shown in figures, or may be located in other locations. In some embodiments, more than one P-1 may be employed. |
| L-5 | L-5 may comprise the same composition or same liquid as L-4. L-5 may comprise the same composition or same liquid as L-4, except after pumping, or flow control, or adjustment, or any combination thereof. |

Example FIGS. 13-16 Step-by-Step Description

1. Charging:
  a. Warm thermal storage medium may be transferred from the warm thermal storage region of the thermal storage tank through ports located in the warm thermal storage region. For example, warm thermal storage medium may be transferred from the warm thermal storage region using Port 1 and/or Port 2. Warm thermal storage medium may enter Port 1 and transfer through H-1 to FC-1. Warm thermal storage medium may enter Port 2 and transfer to FC-2. Depending on, for example, the type of thermal storage medium and the residence time, in some embodiments, warm thermal storage medium in the warm thermal storage medium region may comprise two liquid phases, wherein, with sufficient residence time, a first liquid phase may tend to form a first more concentrated area or first layer and the second liquid phase may tend to form a second more concentrated area or second layer. In some embodiments, Port 1 may be located in the second liquid phase or second layer and Port 2 may be located in the first liquid phase or first layer. Port 1 may remove or transfer at least a portion of second liquid phase and Port 2 may remove or transfer at least a portion of first liquid phase. FC-1 may maintain or adjust the flow rate of liquid from Port 1, which may comprise L-2. FC-2 may maintain or adjust the flow rate of liquid from Port 2, which may comprise L-3. The relative flow rates of L-2 and L-3 may be adjusted or maintained to achieve a desired or optimal composition or concentration or ratio of chemicals or liquid phases in L-4, to, for example, including, but not limited to, achieve desired specific heat capacity, or heat capacity, or heat transfer coefficient, or viscosity, or other desired properties, or any combination thereof.
  b. As thermal storage medium is removed from the warm thermal storage region and/or added to the cold thermal storage region, the volume of the warm thermal storage medium in the warm thermal storage region may decrease, while the volume of cold thermal storage medium in the cold thermal storage region may increase. The physical divider, such as Physical Divider 1, may be designed to divide or delineate the warm thermal storage region from the cold thermal storage region. In some embodiments, during charging, the position or elevation of the physical divider may be adjusted to, for example, account for the change in volume of the cold thermal storage region and/or the change in volume of the warm thermal storage region. For example, in FIG. 11, the elevation of the physical divider may be adjusted such that it is lowering or decreasing in response to the increasing volume of warm thermal storage medium and the decreasing volume of cold thermal storage medium due to the thermal storage system discharging. The rate of adjustment in the position or elevation of the physical divider may be based on the flow rate of warm thermal storage medium exiting the warm thermal storage region, or the flow rate of cold thermal storage medium entering the cold thermal storage region, or the geometry of the tank, or any combination thereof. The position or elevation of the physical divider may be adjusted using an adjustment mechanism. For example, Physical Divider 1 may be connected to lines or cables, such as C-1 or C-2, which may be connected to length adjustment mechanisms, such as Adjust 1 or Adjust 2, which may adjust the elevation of the physical divider as desired. Similarly, the elevation or position of Port 1, which may be connected to the physical divider, may be adjusted together with the physical divider, or separately from the physical divider, or any combination thereof. Similarly, the elevation or position of H-1, which may be connected to the physical divider or may be connected to Port 1, may be adjusted together with the physical divider, or separately from the physical divider, or together with Port 1, or separately from Port 1, or any combination thereof.
  c. L-2 and L-3 may be transferred from the FC-1 and FC-2 to a static mixer or merging valve, such as V-1, which may result in the formation of a combined thermal storage medium, such as L-4. In some embodiments, L-4 may comprise a liquid-liquid phase transition liquid at a multi-liquid phase mixture state. In some embodiments, it may be desirable for L-4 to be at a desirable concentration or composition or any combination thereof
  d. L-4, which may be labeled L-5 after P-1, may be transferred to heat exchange with a cold heat transfer medium or cooling source. At the heat exchange, L-5 may be cooled to a temperature at or below a liquid-liquid phase transition temperature range and/or may form a thermal storage medium solution at a lower temperature and/or lower entropy state, such as L-1.
  e. At the heat exchange, cold heat transfer medium from a cooling source, application requiring heating, or chiller, or any combination thereof, which may comprise L-6, may be heat exchanged with warm thermal storage medium, which may comprise L-5, which may result in warm heat transfer medium, which may comprise L-7. L-7 may be transferred to a cooling source, application requiring heating, or chiller, or any combination thereof.

f. Cold thermal storage medium, such as L-1, may be transferred from the heat exchange to a FC-3. FC-3 may control or monitor flow rate of L-1 and/or other properties and attributes.

g. Cold thermal storage medium, such as L-1, may be added to the cold thermal storage region of the thermal storage tank and/or may be added using Port 4.

2. Steady State Charged:

a. In some embodiments, when charging or discharging is stopped or paused, the flow of thermal storage medium into or out of the thermal storage tank may also be paused. In some embodiments, if charging or discharging is paused, movement or adjustment of the physical divider may also be paused. In some embodiments, if in a thermal storage region a thermal storage medium comprises a multi-liquid phase mixture, some liquid phases may settle or separate into layers or regions which are more concentrated in one liquid phase than another liquid phase. The degree or significance of said settling may be dependent on the properties of the thermal storage medium, or the temperature, or the residence time, or any combination thereof. A steady state may mean the thermal storage system is at a state wherein the volume or amount of cold thermal storage medium, or warm thermal storage medium, or any combination thereof is remaining constant or relatively constant. In some embodiments, 'charged' may mean the thermal storage system contains at least a portion of thermal storage medium at a desired temperature range for the load. For example, if the thermal storage system is being used for cold thermal storage, then charged may mean there is a useable amount of cold thermal storage medium in the temperature storage tank. For example, if the thermal storage system is being used for heat thermal storage, then charged may mean there is a useable amount of warm thermal storage medium in the temperature storage tank. Fully charged may mean the amount of thermal storage medium at a desired temperature for the load is at or near the maximum capacity of the thermal storage tank or thermal storage system.

3. Discharging:

a. Cold thermal storage medium, which may comprise L-1, may be transferred from the cold thermal storage region of the thermal storage tank to a heat exchange with a warm heat transfer medium, which may comprise L-7, which may result in the formation of warm thermal storage medium, such as L-5, and cold heat transfer medium, such as L-6. L-5 may comprise thermal storage medium at a higher temperature or higher entropy state than L-1. L-6 may comprise heat transfer medium at a lower temperature or lower entropy state than L-7. Cold thermal storage medium may be transferred from the cold thermal storage region of the thermal storage tank through a port, such as Port 4, and may be transferred to FC-3 before being transferred to said load, or thermal load, or application requiring cooling. Cold heat transfer medium, such as L-6, may be transferred to a thermal load, or an application requiring cooling.

b. As thermal storage medium is removed from the cold thermal storage region and/or added to the warm thermal storage region, the volume of the cold thermal storage medium in the cold thermal storage region may decrease, while the volume of warm thermal storage medium in the warm thermal storage region may increase. The physical divider, such as Physical Divider 1, may be designed to divide or delineate the warm thermal storage region from the cold thermal storage region. In some embodiments, during discharging, the position or elevation of the physical divider may be adjusted to, for example, account for the change in volume of the cold thermal storage region and/or the change in volume of the warm thermal storage region. For example, in FIG. 11, the elevation of the physical divider may be adjusted such that it is lowering or decreasing in response to the increasing volume of warm thermal storage medium and the decreasing volume of cold thermal storage medium due to the thermal storage system discharging. The rate of adjustment in the position or elevation of the physical divider may be based on the flow rate of warm thermal storage medium entering the warm thermal storage region, or the flow rate of cold thermal storage medium exiting the cold thermal storage region, or the geometry of the tank, or any combination thereof. The position or elevation of the physical divider may be adjusted using an adjustment mechanism. For example, Physical Divider 1 may be connected to lines or cables, such as C-1 or C-2, which may be connected to length adjustment mechanisms, such as Adjust 1 or Adjust 2, which may adjust the elevation of the physical divider as desired. Similarly, the elevation or position of Port 1, which may be connected to the physical divider, may be adjusted together with the physical divider, or separately from the physical divider, or any combination thereof. Similarly, the elevation or position of H-1, which may be connected to the physical divider or may be connected to Port 1, may be adjusted together with the physical divider, or separately from the physical divider, or together with Port 1, or separately from Port 1, or any combination thereof.

c. Warm thermal storage medium, such as L-4, may be transferred and/or added to the warm thermal storage region of the thermal storage tank. In some embodiments, L-4 may be transferred into the warm thermal storage region through multiple ports. In some embodiments, L-4 may be transferred into the warm thermal storage region through a single port. In some embodiments, a valve and/or flow controller may be employed to control the port or ports and respective flow rate of thermal storage medium entering a port or each port. In some embodiments, it may be desirable for the warm thermal storage medium to enter the warm thermal storage medium region through one port, which may facilitate separation of a multi-liquid phase mixture into liquid layers comprising each respective liquid phase. In some embodiments, it may be desirable for the warm thermal storage medium to enter the warm thermal storage medium region through multiple ports, which may facilitate the dispersion of liquid phases of a multi-liquid phase mixture and/or minimize or prevent the separation of liquid phases into layers comprising each respective liquid phase. In some embodiments, it may be desirable for the warm thermal storage medium to enter the warm thermal storage medium region through multiple ports, which may facilitate separation of a multi-liquid phase mixture into liquid layers comprising each respective liquid phase. In some embodiments, it may be desirable for the warm thermal storage medium to enter the warm thermal storage medium region through one port, which may facilitate the dispersion of liquid phases of a multi-liquid phase mixture and/or minimize or prevent the separation of liquid phases into layers comprising each respective liquid phase.

4. Steady State Discharged:

a. In some embodiments, when charging or discharging is stopped or paused, the flow of thermal storage medium into or out of the thermal storage tank may also be paused. In some embodiments, if charging or discharging is paused, movement or adjustment of the physical divider may also be paused. In some embodiments, if in a thermal storage region a thermal storage medium comprises a multi-liquid phase mixture, some liquid phases may settle or separate into layers or regions which are more concentrated in one liquid phase than another liquid phase. The degree or significance of said settling may be dependent on the properties of the thermal storage medium, or the temperature, or the residence time, or any combination thereof. A steady state may mean the thermal storage system is at a state wherein the volume or amount of cold thermal storage medium, or warm thermal storage medium, or any combination thereof is remaining constant or relatively constant. Discharged may mean the amount of thermal storage medium at a desired temperature for the load is less than the maximum capacity of the thermal storage tank or thermal storage system. Fully discharged may mean there is little or no usable thermal storage medium at a desired temperature for the load.

Notes

Note: The present invention may pertain to thermal storage systems and methods. Some embodiments may comprise a thermal storage system comprising a thermal storage tank with two regions, a warm thermal storage medium region and a cold thermal storage medium region. In some embodiments, said warm region may be separate from the cold region due to, at least in part, a physical divider. Said physical divider may possess an adjustable height or position, wherein the position of said physical divider may be adjusted in response to inflows and/or outflows of warm thermal storage medium and/or cold thermal storage medium. Said physical divider may possess an adjustable height or position, wherein the position of said physical divider may be adjusted in response to changes in the total or relative volume of warm thermal storage medium and cold thermal storage medium. The total volume of warm thermal storage medium and/or the total volume of the warm thermal storage medium region may change during charging or discharging of thermal storage. The total volume of cold thermal storage medium and/or the total volume of the cold thermal storage medium region may change during charging or discharging of thermal storage.

Note: In some embodiments, the position or location or elevation of a physical divider may be adjusted using an active mechanism.

Note: In some embodiments, the total volume of thermal storage medium in a thermal storage tank may remain relatively consistent while the relative volume of warm thermal storage medium relative to cold thermal storage medium may change.

Note: Some embodiments may comprise more than one port, or ports at different elevations, or ports in different locations, or ports in different positions, or mobile ports, or ports with adjustable location, or any combination thereof in, for example, a cold thermal storage region, or warm thermal storage region, or any combination thereof.

Note: In some embodiments, thermal storage medium, or heat transfer medium, or any combination thereof may be treated to prevent biofouling, or prevent degradation, or prevent corrosion, or prevent scaling, or maintain or improve performance, or prevent freezing, or prevent evaporation, or improve properties, or any combination thereof.

Note: The state of charge of the thermal storage system may be dependent on if the thermal storage system is a system operating to store 'cold', as in a cooling thermal storage, or if the thermal storage system is a system operating to store 'heat', as in a heating thermal storage system. A cooling thermal storage system may be 'fully charged' if the cold thermal storage region contains the maximum design volume of cold thermal storage medium. A heating thermal storage system may be 'fully charged' if the warm thermal storage region contains the maximum design volume of warm thermal storage medium. A cooling thermal storage system may be 'fully discharged' if the cold thermal storage region contains the minimum design volume of cold thermal storage medium. A heating thermal storage system may be 'fully discharged' if the warm thermal storage region contains the minimum design volume of warm thermal storage medium.

Note: In some embodiments, the position or location or elevation of a physical divider may be adjusted using an active mechanism. In some embodiments, a physical divider position adjustment mechanism may include, but is not limited to, a cable or line, or a mechanism for adjusting the length of said cable or line, or attaching said cable or line to said physical divider, or any combination thereof. A thread or cable based position adjustment mechanism may be advantageous due to, for example, the minimal tank volume occupied by said thread or cable and/or the ability to not have a hole through the physical divider. A thread or cable based position adjustment mechanism may be advantageous due to, for example, the lack of need for a hole through the physical divider, which may prevent or minimize mixing between the warm thermal storage medium and cold thermal storage medium. A thread or cable based position adjustment mechanism may be advantageous due to, for example, the lack of need for a material which transcends both the warm and cold regions, which may result in undesirable heat transfer between the warm and cold regions. A thread or cable based method may involve a thread or cable connected to a physical divider and a length adjusting mechanism. The position or elevation of the physical divider may be adjusted by adjusting the length of at least one of the thread(s) or cable(s) connected to the physical divider using a length adjusting mechanism.

Note: In some embodiments, the position or location or elevation of a physical divider may be adjusted using an active mechanism, which may include, but is not limited to, at least one rod or bolt with a threaded perimeter or surface, or at least one physical divider with at least one hole treaded with complementary threads to the threaded perimeter or surface of the rod or bolt, or a rotating mechanism, such as a motor, or an interconnection between the rotating mechanism and the rod or bolt, or any combination thereof. In some embodiments, the position or elevation of the physical divider may be adjusted at a desired rate and in a desired direction by rotating the rod or bolt and the resulting mechanical interaction between the threads on the rod or both and the threads in the physical divider. A threaded rod or bolt based method may be advantageous due to, for example, the potentially greater torque both increasing and decreasing the elevation or position of the physical divider due to, for example, mechanical advantage. Greater torque in multiple directions or in both increasing and/or decreasing elevation may enable the use of physical dividers with stronger physical divider—tank wall elastic force or elastic seal, which may further minimize potential mixing between the warm thermal storage medium region and the cold thermal storage medium region. Additionally, a threaded rod or bolt based physical divider position adjustment mechanism may be beneficial due to, for example, potentially greater precision in adjusting the position of the physical divider.

Note: In some embodiments, the warm thermal storage medium may comprise the same overall composition as the cold thermal storage medium, except may be at a different temperature or different entropy state. In some embodiments, the warm thermal storage medium may be the same as the cold thermal storage medium, except at a different temperature and/or different entropy state.

Note: The position of the physical divider may be adjusted in response to changes in the total volume of a cold thermal storage medium region, or changes in the total volume of a warm thermal storage medium region, or changes in the relative volume of the cold thermal storage medium region to the warm thermal storage medium region, or any combination thereof. The volume of the cold thermal storage medium region may change due to cold liquid-liquid phase transition thermal storage medium being pumped or transferred into or out of the cold thermal storage medium region. The volume of the warm thermal storage medium region may change due to cold liquid-liquid phase transition thermal storage medium being pumped or transferred into or out of the cold thermal storage medium region.

Note: In some embodiments, it may be desirable for two or more or all the liquid phases in a liquid-liquid phase transition liquid at a multi-liquid phase mixture state to have similar or the same density or for the liquid phases to be at least partially suspended or dispersed. For example, a thermal storage medium which comprises multiple liquid phases at a dispersed, or suspended state, or which possesses multiple liquid phases which have similar or the same density, or any combination thereof may enable thermal storage regions with few ports, such as one port. An adequately dispersed multi-liquid phase solution stored in a tank may comprise a desired concentration and/or ratio and/or composition of chemicals or chemical constituents regardless of the location or position from which liquid is removed from the tank. A desired concentration and/or ratio and/or composition of chemicals or chemical constituents may comprise a solution with a concentration and/or ratio and/or composition of chemicals or chemical constituents which results in the desired properties, which may include, but are not limited to, one or more or any combination of the following: specific heat capacity, or heat capacity, or liquid-liquid phase transition temperature range, or polarity, or thermal conductivity, or heat transfer coefficient, or viscosity, or pressure drop, or heat transfer characteristics, or heat exchanging characteristics, or stability.

Note: The physical divider may be mechanically or otherwise physically positioned or located at the intersection or hypothetical intersection between the cold thermal storage medium region and the warm thermal storage medium region.

For example, if a thermal storage tank comprises a cold thermal storage medium region and a warm thermal storage medium region, and the cold thermal storage medium region is located at an elevation or position below the warm thermal storage medium region, then it may be desirable to place or position or locate the physical divider where the liquid surface of the cold thermal storage medium would be if the thermal storage tank only contained the cold thermal storage medium portion.

For example, if a thermal storage tank comprises a cold thermal storage medium region and a warm thermal storage medium region, and the cold thermal storage medium region is located at an elevation or position above the warm thermal storage medium region, then it may be desirable to place or position or locate the physical divider where the liquid surface of the warm thermal storage medium would be if the thermal storage tank only contained the warm thermal storage medium portion.

For example, a potential process for determining the position of the physical divider may be to determine where the liquid-air interface would be if the thermal storage tank only contained the thermal storage medium in the region which is lower elevation or occupies the bottom of the thermal storage tank.

Note: In some embodiments, it may be desirable for the physical divider to be weighted. For example, in some embodiments, it may be desirable for the physical divider to have a density greater than both the warm thermal storage medium and the cold thermal storage medium. For example, in some embodiments, it may be desirable for the physical divider to have a density greater than or equal to one or more or any combination of the following: 1.05 kg/L, or 1.1 kg/L, or 1.2 kg/L, or 1.3 kg/L, or 1.4 kg/L, or 1.5 kg/L, or 1.6 kg/L, or 1.7 kg/L, or 1.8 kg/L, or 1.9 kg/L, or 2.0 kg/L, or 2.1 kg/L, or 2.2 kg/L, or 2.3 kg/L, or 2.4 kg/L, or 2.5 kg/L, or 2.6 kg/L, or 2.7 kg/L, or 2.8 kg/L, or 2.9 kg/L, or 3.0 kg/L. In some embodiments, the elevation of a physical divider may be adjusted by a cable or line which may be connected to a length adjustment mechanism, wherein the cable or line length adjustment mechanism may be located at an elevation above the elevation of the physical divider. If the cable or line is connected between the top of physical divider and the cable or line length adjustment mechanism located at an elevation above the physical divider, the length adjustment mechanism and line or cable may be capable of providing high torque line length shortening or physical divider elevation raising, however the line or cable may be less capable of providing similar torque to the physical divider during elevation lowering. In some embodiments, the torque or force for physical divider elevation lowering may be provided by gravitational force due to greater density of the physical divider, wherein the physical divider may possess a sufficiently high density to overcome friction from any contact between the physical divider and the tank walls and/or other friction or counteracting forces. The net gravitation force of the physical divider may be sufficient such that when the length adjustment mechanism increases the length of the cable or line, the elevation of the physical divider decreases. The net gravitation force of the physical divider may be sufficient such that when the length adjustment mechanism increases the length of the cable or line, the elevation of the physical divider decreases by about the same length or by about an elevation change or distance about equivalent to or corresponding to the change in length.

Note: In some embodiments, the warm thermal storage medium region may be located at a higher elevation than the cold thermal storage medium region. In some embodiments, the warm thermal storage medium region may occupy the top portion of the thermal storage tank, while the cold thermal storage medium region may occupy the bottom portion of the thermal storage tank.

Note: In some embodiments, the thermal storage medium may comprise a liquid-liquid phase transition liquid. In some embodiments, said liquid-liquid phase transition liquid may phase transition from a single liquid phase combined solution into two or more liquid phases at or above a liquid-liquid phase transition temperature range. In some embodiments, said liquid-liquid phase transition liquid may phase transition from a first state comprising multiple liquid phases into a second state comprising multiple liquid phases at or above a liquid-liquid phase transition temperature range, wherein each liquid phase at said first state may possess a different volume or ratio of chemical components than each liquid phase at said second state.

Note: In some embodiments, the total relative concentration of each chemical component of the thermal storage medium in the warm region may be similar to the total relative concentration of each chemical component of the thermal storage medium in the cold region. If the total relative concentration of each chemical component is similar between the warm region and cold region, than the aggregate density of the thermal storage medium in each region may be similar, or the total aggregate densities of the thermal storage medium may differ due to, for example, differences in temperature between the regions and changes in density due to temperature.

Note: In some embodiments, the cold region, or the warm region, or both may comprise a liquid-liquid phase transition liquid at a multi-liquid phase state and/or may comprise multiple liquid phases. In some embodiments, liquid-liquid phase transition liquid at a multi-liquid phase state may comprise a first liquid phase at a first density and a second liquid phase at a second density, wherein said first density may be different from said second density. In some embodiments, a liquid-liquid phase transition liquid at a multi-liquid phase state may form multiple layers within a region. In some embodiments, it may be desirable to design the system to minimize potential mixing between the cold region and the warm region.

For example, in some embodiments it may be desirable for the physical divider to exert an elastic pressure on the walls of the tank or form an elastic seal between the physical divider and the walls of the tank. Exerting an elastic pressure or forming an elastic seal may minimize the potential mixing of liquid between the warm thermal storage medium region and the cold thermal storage medium region, while enabling the position of the physical divider to be adjustable, or movable, or mobile.

For example, in some embodiments, said physical divider may employ surface tension, or hydrophobic coating, or both to prevent mixing between the warm region and the cold region.

For example, in some embodiments, it may be desirable for the liquid phase or layer with the greatest viscosity within a region to be in contact with the physical divider because, for example, a greater viscosity liquid may seep or move through a small space, such as any gap between the tank wall and physical divider, at a slower rate than a lower viscosity liquid, which may reduce or minimize potential mixing between the cold thermal storage medium region and warm thermal storage medium region.

For example, in some embodiments, a warm liquid-liquid phase transition thermal storage liquid in a warm thermal storage region may comprise two liquid phases, a first liquid phase comprising a higher density, higher viscosity liquid and a second liquid phase comprising a lower density, lower viscosity liquid. In some embodiments, it may be desirable to position the warm thermal storage region at an elevation above the cold thermal storage region such that the higher density, higher viscosity liquid may be in contact with the physical divider, if, for example, said two liquid phases settle within the thermal storage region to form at least two liquid layers.

For example, in some embodiments, it may be desirable for the liquid phase or layer with the lowest viscosity within a region to be in contact with the physical divider because, for example, a physical divider may be more adjustable or mobile if in contact with a lower viscosity liquid than if in contact with a higher viscosity liquid.

For example, in some embodiments, a warm liquid-liquid phase transition thermal storage liquid in a warm thermal storage region may comprise two liquid phases, a first liquid phase comprising a higher density, higher viscosity liquid and a second liquid phase comprising a lower density, lower viscosity liquid. In some embodiments, it may be desirable to position the warm thermal storage region at an elevation below the cold thermal storage region such that the lower density, lower viscosity liquid may be in contact with the physical divider, if, for example, said two liquid phases settle within the thermal storage region to form at least two liquid layers.

Note: In some embodiments, thermal storage medium may comprise multiple liquid phases. In some embodiments, when a thermal storage medium comprising multiple liquid phases is stored in a tank for a sufficient time period and/or under sufficiently stable conditions, one or more of the multiple liquid phases may settle from one or more of the other liquid phases. For example, a warm thermal storage medium may comprise two liquid phases comprising a first liquid phase and a second liquid phase, and, when stored in a tank or in a warm thermal storage medium region, said two liquid phases may settle and/or form two liquid layers, wherein one liquid layer may comprise said first liquid phase and wherein one liquid layer comprises said second liquid phase.

Note: In some embodiments, the thermal storage tank may be designed with the following considerations:

Liquid-liquid phase transition liquids may comprise multiple chemical components.

The ratio of said chemical components or the mass percent concentration of said chemical components may determine or correlate with the properties of the resulting liquid-liquid phase transition liquid. For example, said properties may include, but are not limited to one or more or a combination of the following: enthalpy of liquid-liquid phase transition, or temperature range of the enthalpy of liquid-liquid phase transition, or liquid-liquid phase transition temperature range, or viscosity, or specific heat capacity, or effective specific heat capacity, or relative volume of each liquid phase at any given temperature, or composition of each liquid phase, or heat transfer coefficient, or effective heat transfer coefficient, or density, or total heat capacity, or density difference between liquid phases, or number of liquid phases at any given temperature.

It may be desirable for the ratio of chemical components or the mass percent concentration of chemical components of a liquid-liquid phase transition liquid to be within a range which may be optimal or close to optimal for a particular application. For example, for thermal storage it may be desirable for the ratio of chemical components or the mass percent concentration of chemical components to be optimized for one or more or a combination of thermal and/or physical properties.

Liquid-liquid phase transition liquids may exist at multiple liquid phases in a heterogenous mixture, which may be referred to as a multi-liquid phase state, at some temperatures or temperature ranges. When stored in a tank or vessel, the liquid phases of a multi-liquid phase state may separate into layers or regions, wherein the concentration of one liquid phase may be greater in one layer or region than the concentration of another liquid phase in another layer or another region.

If a liquid-liquid phase transition liquid at a multi-liquid phase state in a tank or other vessel has at least partially separated into layers or concentration regions and a portion of liquid is sampled, then the relative concentration of each chemical component in said sample may vary substantially depending on, for example, where, when, and how much liquid was sampled. The relative concentration of each chemical component in said sample may be substantially different from the desirable for the ratio of chemical components or the mass percent concentration of chemical components for the application.

When removing liquid-liquid phase transition liquid at a multi-liquid phase state from a tank or other vessel, it may be desirable to remove the liquid from two or more locations or elevations or positions within a tank. In some embodiments, it may be desirable to remove liquid from two or more locations at calculated flow rates such that, when mixed, the resulting mixture may possess a desirable relative concentration of each chemical component which is within the desired relative concentration range for the application. For example, it may be desirable to remove liquid from a first port at a lower elevation and it may be desirable to remove liquid from a second port at a higher elevation. For example, within a warm thermal storage medium region, it may be desirable to remove liquid from a first port at a lower elevation within the region and it may be desirable to remove liquid from a second port at a higher elevation within the region. If the liquid-liquid phase transition liquid at a multi-liquid phase state in the region has at least partially separated into layers or concentration regions, then the relative concentration of each chemical component from the first port may be different from the relative concentration of each chemical component from the second port. Adjusting the relative liquid flow rate of first port liquid to second port liquid and mixing the first port liquid and second port liquid may result in a mixture with a desired relative concentration of chemical components for the application.

In some embodiments, it may be desirable to actively or live measure or estimate the relative concentration of chemical components in a liquid stream.

If the relative concentration of chemical components in two or more non-contiguously separate liquid streams is known or can be measured or can be estimated or can be presumed, and the flow rates of each liquid stream can be adjusted, then said two or more non-contiguously separate liquid streams may be mixed to form a liquid stream comprising a desired relative concentration of chemical components if said desired concentration is between the lowest and highest concentrations of each chemical component in said two or more non-contiguously separate liquid streams.

If the effective specific heat capacity of a resulting liquid mixture is known or can be measured or can be estimated or can be presumed, and the flow rates of each liquid stream of a two or more non-contiguously separate liquid streams can be adjusted, then said two or more non-contiguously separate liquid streams may be mixed to form a resulting liquid stream comprising a desired relative concentration of chemical components if said desired concentration is between the lowest and highest concentrations of each chemical component in said two or more non-contiguously separate liquid streams.

In some embodiments, the total relative concentration chemical components in a thermal storage tank may be within a desired concentration range.

The volume and elevation or position of a warm thermal storage medium region or a cold thermal storage medium region may vary depending on the state of charge of the system and/or may change if the system is charging or discharging. The bottom or top of a warm thermal storage medium region or a cold thermal storage medium region may vary depending on the state of charge of the system and/or may change if the system is charging or discharging. It may be desirable for the position of one or more ports to change or to be adjusted when the volume or position of the warm thermal storage medium region changes, or when the volume or position of the cold thermal storage medium region changes, or any combination thereof.

Note: In some embodiments, a thermal storage medium region may comprise at least two liquid ports. For example, in some embodiments, at least one liquid port may be located near the highest elevation point of the warm thermal storage medium region, which may be referred to as the warm higher elevation port, and wherein at least one liquid port may be located near the lowest elevation point of the warm thermal storage medium region, which may be referred to as the warm lower elevation port. In some embodiments, the thermal storage medium when 'warm' or when within or above a liquid-liquid phase transition temperature range, may comprise multiple liquid phases. In some embodiments, the first liquid phase of said multiple liquid phases may possess a density greater than the second of said multiple liquid phases and/or said liquid phases may settle to form two or more liquid layers. It may be desirable to employ two liquid ports, wherein at least one of said liquid ports is located at an elevation corresponding to the liquid layer of said first liquid phase and wherein at least one of said liquid ports is located at an elevation corresponding to the liquid layer of said second liquid phase. For example, it may be desirable for the system to control which liquid phase it is pumping or transferring into or out of a thermal storage tank and the flow rate with which the system is pumping or transferring each liquid phase into or out of a thermal storage tank. In some embodiments, a liquid port may be in a location corresponding to the layer of a liquid phase. In some embodiments, a port may be mobile or may move position to selectively remove or add liquid phases or any combination thereof. By employing ports which may be able to selectively remove or add different liquid phases, some embodiments may be capable of removing liquid phases at desired ratios or flow rates and/or mixing said liquid phases to form liquid-liquid phase transition multi-liquid phase state with desired compositions and/or thermal or physical properties.

In some embodiments, a third liquid port may be employed. In some embodiments, it may be desirable for said third liquid port to be located at an elevation near the liquid-liquid interface between the first liquid phase layer and second liquid phase layer. In some embodiments, it may be desirable for said third liquid port to be located at an elevation between the liquid-liquid interface between the first liquid phase layer and second liquid phase layer of a warm thermal storage medium in a warm thermal storage region. In some embodiments, said third liquid port may be employed to input multi-liquid phase state warm thermal storage medium. In some embodiments, a system may facilitate liquid-liquid separation of a multi-liquid phase state thermal storage medium into two liquid layers by placing the third port at or near the location liquid-liquid interface. Said liquid-liquid interface may move position depending on the total volume of warm thermal storage medium, or compositions, or temperatures, or other factors, or any combination thereof, and it may be desirable for said third port to be mobile or move position with the change in location, if any, of the liquid-liquid interface.

Note: In some embodiments, a thermal storage medium region may comprise at least one port. It may be desirable to employ one port in a thermal storage medium region, for example, if the thermal storage medium in the thermal storage medium region comprises a single liquid phase combined solution, or comprises a multi-liquid phases mixture suspension, or comprises a multi-liquid phase mixture wherein the liquid phases are about the same density, or comprises a multi-phase state suspension, or any combination thereof. It may be desirable to employ one port in a thermal storage medium region if the thermal storage medium in the region can be removed from the port, wherein the liquid stream being removed remains at a relatively consistent composition during the removal.

Note: In some embodiments, it may be desirable for ports to be designed to minimize turbulence within the tank. For example, some ports may be designed as diffusers. For example, some ports may be designed to promote laminar flow.

Note: In some embodiments, it may be desirable to locate ports in positions and/or locations within the tank which prevent or minimize turbulence near the interface between the tank walls and the physical divider, which may prevent or minimize potential mixing between the warm thermal storage medium region and cold thermal storage medium region. For example, it may be desirable to locate ports at or near the greatest possible distance from the interface between the tank walls and the physical divider at a particular port elevation. For example, it may be desirable to place a port at or near the center of a tank. For example, it may be desirable to place a port at or near the center of a tank at the desired elevation of the port. For example, it may be desirable to place a port at or near the center of a physical divider.

Note: In some embodiments, it may be desirable to locate ports in positions and/or locations within the tank which prevent or minimize turbulence near the interface between the tank walls and the physical divider.

Note: Some embodiments may employ two or more ports within a thermal storage region. In some embodiments, it may be desirable for the position or elevation of at least one of said two or more ports in a thermal storage region may change. In some embodiments, some ports may be located in a position away from the top or bottom of the tank. In some embodiments, a port may be located near or on the physical divider. In some embodiments, to a flexible tube or hose may be employed. In some embodiments, to a flexible tube or hose may be employed to transfer liquid to or from a port located near a physical divider or at an elevation away from the top or bottom of the tank. For example, the flexible tube or hose may be comprise a port at or near one end of the flexible tube or hose. For example, the tube or hose may comprise multiple tubes or hoses interconnected to one or two or more ports. For example, the tube or hose may comprise multiple tubes or hoses in a pipe-in-pipe interface. For example, the tube or hose may comprise multiple tubes or hoses, wherein at least one tube or hose transfers liquid to or from a port located near a physical divider and/or wherein at least one tube or hose transfer liquid to or form a port located near a liquid-liquid interface between two or more liquid phases, or located in a position between the top and bottom of a thermal storage region, or any combination thereof. For example, the tube or hose may exhibit an adjustable length. For example, in some embodiments, the tube or hose may comprise at least a portion of the line or cable which may be employed to adjust the position or elevation of the physical divider. For example, the tube or hose may comprise the line or cable which may be employed to adjust the position or elevation of the physical divider, wherein the tube or hose may be at least partially connected to the physical divider and/or may be connected to a length adjustment mechanism, such as a reel. For example, in some embodiments, it may be desirable for the tube or hose to possess material characteristics similar to a nylon line or cable in that it may be desirable for the tube or hose to be flexible, although have minimal inclination toward stretching or exhibit minimal or no stretching. In some embodiments, for example, in some embodiments, the tube or hose may be elastic or may expand or contract, which may enable the tube or hose to adjust length and/or ports located on or near the tube or hose to adjust position. For example, the height or length or position of a tube or hose may be adjustable and may be adjusted, for example, in response to changes in the position or elevation of a physical divider or other changes in the system. For example, in some embodiments, a hose or flexible tube may comprise a spring or elastic mechanism which may result in the shrinking of length of the hose when the position of the physical divider approaches closer to the location where the hose enters tank, or the lengthening of length of the hose when the position of the physical divider approaches further from the location where the hose enters tank. In some embodiments, a port may be in or on the tube or hose. In some embodiments, the hose may be connected to the physical divider and a port may be located on the physical divider. In some embodiments, multiple ports may be located within or on a hose, and/or wherein some ports may be located at different locations or elevations or positions and/or wherein some ports may be located at the same or similar locations or elevations or positions.

For example, if a multi-liquid phase mixture in a thermal storage region comprises two liquid phases of different densities, it may be desirable for a first port to be located at an elevation near the highest elevation within the thermal storage region and a second port to be located at an elevation near the lowest elevation within a thermal storage region. By locating the first port near the highest elevation of the thermal storage region, the first port may be capable of selectively removing or adding or otherwise transferring the lower density liquid phase of the two liquid phases. By locating the second port near the highest elevation of the thermal storage region, the second port may be capable of selectively removing or adding or otherwise transferring the higher density liquid phase of the two liquid phases. In embodiments where the presently described thermal storage region comprises the top portion of the thermal storage tank, the elevation of the lowest elevation within a thermal storage region may change due to, for example, change in the elevation of the physical divider, and it may be desirable for the elevation second port or lower elevation port to change in response to changes in elevation of the physical divider. In embodiments where the presently described thermal storage region comprises the bottom portion of the thermal storage tank, the elevation of the highest elevation within a thermal storage region may change due to, for example, change in the elevation of the physical divider, and it may be desirable for the elevation first port or higher elevation port to change in response to changes in elevation of the physical divider.

Note: In some embodiments, a hose or tube may enter the tank from near the bottom or top of the tank. Said hose or tube may connect to a valve or port located near or on or attached to the physical divider. If the elevation of the physical divider increases, a portion of the hose or tube may passively or actively bundle, or collapse, or coil, or spool, or any combination thereof.

In some embodiments, if the hose or tube is in a thermal storage region in the top portion of the tank, it may be desirable for the hose or tube to have a density greater than the density of the thermal storage medium liquid such that the bundle of hose or tube sinks and/or the bundle of hose or tube rests on the physical divider. In some embodiments, if the hose or tube is located in a thermal storage region in the top portion of the tank, it may be desirable for the hose or tube to have a density less than the density of the thermal storage medium liquid such that the bundle of hose or tube floats and/or the bundle of hose or tube rests on the top of the tank.

In some embodiments, if the hose or tube is in a thermal storage region in the bottom portion of the tank, it may be desirable for the hose or tube to have a density greater than the density of the thermal storage medium liquid such that the bundle of hose or tube sinks and/or the bundle of hose or tube rests on the bottom of the tank. In some embodiments, if the hose or tube is located in a thermal storage region in the bottom portion of the tank, it may be desirable for the hose or tube to have a density less than the density of the thermal storage medium liquid such that the bundle of hose or tube floats and/or the bundle of hose or tube rests on physical divider.

Note: Some single liquid phase combined solutions comprising a single liquid phase combined solution, which may comprise a first liquid phase, may possess a relatively small volume or amount of a second liquid phase. In some embodiments, it may be desirable allow the presence of said second liquid phase. In some embodiments, said second liquid phase may possess a similar density to the single liquid phase combined solution and/or may be suspended in solution. In some embodiments, in may be desirable to filter out or otherwise remove at least a portion of said second liquid phase and/or eventually, potentially undesirable chemical components comprising said second liquid phase may be removed from the liquid-liquid phase transition composition.

Note: In some embodiments, one or more or a combination of sensors may be employed. Sensors may communicate with a control interface, which may utilize information from one or more sensors and/or information on desired system operations to determine and execute optimal adjustments of one or more or any combination of system operations, which may include, but is not limited to, liquid flow rates, or position or elevation of a physical divider, or position or elevation of one or more ports, or the opening or closing of one or more valves, or any combination thereof.

Note: In some embodiments, sensors may determine including, but are not limited to, one or more or any combination of the following:
  The volume or amount of each liquid phase in a thermal storage tank
  The volume or amount of each liquid phase in a thermal storage region
  The distribution of liquid phases or liquid phase layers, if any, by region or elevation of the thermal storage tank
  The concentration of each chemical constituent in the thermal storage medium by region or elevation within the thermal storage tank
  The presence of and/or concentration of each chemical constituent in a liquid stream entering or exiting the thermal storage tank In some embodiments, the relative concentration of or concentration of each chemical constituent in a liquid stream entering or exiting the thermal storage tank may be determined or estimated based on the viscosity of the liquid, or flow properties, or both. For example, the pumping energy required or pressure drop or both from pumping a multi-liquid phase liquid at a specific temperature through a pipe at a specific volumetric flow rate or mass flow rate may be compared to pre-created benchmarks or standards for based on the chemical composition of the thermal storage medium. A benchmark or standard may create for the pressure drop or viscosity of a liquid-liquid phase transition liquid thermal storage medium at a range of different relative concentrations of each chemical component and at a range of different liquid temperatures.

Turbidity Measurements
Light Based Measurements
UV Vis
Specific Heat Capacity Measurements Note: In some embodiments, sensors may determine including, but are not limited to, one or more or any combination of the following:
  The amount or volume of a liquid phase
  The concentration of each chemical constituent or liquid phase exiting or entering a thermal storage tank In some embodiments, the relative concentration of liquid phases in a solution transferred through a pipe may be determined based on the viscosity of the liquid or flow properties. For example, the pumping energy required or pressure drop or both from pumping a multi-liquid phase liquid at a specific temperature through a pipe at a specific volumetric flow rate or mass flow rate. A benchmark or standard may create for the pressure drop or viscosity of a liquid-liquid phase transition liquid thermal storage medium at a range of different relative concentrations of each chemical component and at a range of different liquid temperatures.

Turbidity Measurements
Light Based Measurements
UV Vis
Specific Heat Capacity Measurements
   Note: Active measurement of specific heat capacity
   Note: Total relative concentration of a specific chemical component: Total relative concentration of a specific chemical component may be determined by the total mass of a specific chemical component in a region, and dividing it by the total mass of all chemical components (including the specific chemical component in the region). The total relative concentration of a specific chemical component may be conducted or determined for each chemical component to determine the total relative concentration of each chemical component.
Representative Components
Adjustable Tank Divider Liquid-liquid phase transitions may involve the absorption or generation of heat in physical, or physio-chemical, or chemical, or any combination thereof mechanisms which may occur while remaining, at least in part, at a liquid phase. Some liquid-liquid phase transitions may occur while a solution remains at a single liquid phase. Some liquid-liquid phase transitions may occur while a solution remains at multiple liquid phases. Some liquid-liquid phase transitions may involve transitioning from a single liquid phase to multiple liquid phases and/or multiple liquid phases to a single liquid phase.

In some liquid-liquid phase transitions, heat may be absorbed, at least in part, in a liquid-liquid phase transition temperature range wherein the solution transforms from a single liquid phase into two liquid phases while the solution is heated through at least a portion of said liquid-liquid phase transition temperature range, or while the temperature of the solution rises through at least a portion of said liquid-liquid phase transition temperature range. Said formation of a two liquid phase solution from a single liquid phase solution may comprise an endothermic liquid-liquid phase transition. In some embodiments, when at least a portion of said two liquid phases are in contact with each other in the presence of mixing or turbulence and the temperature is cooled through at least a portion of said liquid-liquid phase transition temperature range, the solution may transition from two liquid phases to a single liquid phase solution, which may involve the two liquid phases dissolving in each other, forming a single liquid phase. Said formation of a single liquid phase solution from a two liquid phase solution may comprise an exothermic liquid-liquid phase transition. The present paragraph may describe an example heating multi-liquid phase forming solution.

In some liquid-liquid phase transitions, heat may be released or generated, at least in part, in a liquid-liquid phase transition temperature range wherein the solution transforms from a single liquid phase into two liquid phases while the solution is cooled through at least a portion of said liquid-liquid phase transition temperature range, or while the temperature of the solution decreases through at least a portion of said liquid-liquid phase transition temperature range. Said formation of a two liquid phase solution from a single liquid phase solution may comprise an exothermic liquid-liquid phase transition. In some embodiments, when at least a portion of said two liquid phases are in contact with each other in the presence of mixing or turbulence and the temperature is heated through at least a portion of said liquid-liquid phase transition temperature range, the solution may transition from two liquid phases to a single liquid phase solution, which may involve the two liquid phases dissolving in each other, forming a single liquid phase. Said formation of a single liquid phase solution from a two liquid phase solution may comprise an endothermic liquid-liquid phase transition. The present paragraph may describe an example cooling multi-liquid phase forming solution.

In liquid-liquid phase transition solutions which form two liquid phases at or above a first temperature range, and form a single liquid phase at or below a second temperature range, the liquid solution may exist in at least three different liquid phases depending on the temperature: the first of the two liquid phases of a two liquid phase state solution, the second of the two liquid phases of a two liquid phase state solution, or a single liquid phase combined solution. In some embodiments, the density of the two liquid phases at the two liquid phase state may be different, which may mean, for example, the density of the first liquid phase of the two liquid phases is greater than the density of the second liquid phase of the two liquid phases. In some embodiments, if the density of the first liquid phase of the two liquid phases of a solution at a two liquid phase state is greater than the density of the second liquid phase of the two liquid phases of a solution at a two liquid phase state, said solution at a single liquid phase combined solution state may possess a greater density than said second liquid phase and may possess a lesser density than said first liquid phase. If layered in a vessel or tank on earth in the presence of gravity at a steady state, the first liquid phase may be located at the bottom as the bottom layer, the single liquid phase combined solution may be located at the middle as the middle layer, and the second liquid phase may be located at the top as the top layer.

In some embodiments, for example, in some heating multi-liquid phase forming solutions, the first liquid phase or the liquid phase with the greatest density may be 'warm', the liquid phase with the middle density or the single liquid phase combined solution may be 'cold', and the second liquid phase or the liquid phase the lowest density may be 'warm.' Said warm liquid phases may be at about the same temperature and/or may be at a temperature within or greater than the temperature range of at least a portion of a liquid-liquid phase transition temperature range. Said cold liquid phase may be at a temperature within or less than the temperature range of at least a portion of a liquid-liquid phase transition temperature range.

In some embodiments, for example, in some cooling multi-liquid phase forming solutions, the first liquid phase or the liquid phase with the greatest density may be 'cold', the liquid phase with the middle density or the single liquid phase combined solution may be 'warm', and the second liquid phase or the liquid phase the lowest density may be 'cold.' Said cold liquid phases may be at about the same temperature and/or may be at a temperature within or less than the temperature range of at least a portion of a liquid-liquid phase transition temperature range. Said warm liquid phase may be at a temperature within or greater than the temperature range of at least a portion of a liquid-liquid phase transition temperature range.

When storing the three liquid phases as three layers within a storage vessel or tank, it may be important to note that said first liquid phase, which may comprise the bottom layer, and said second liquid phase, which may comprise the top layer, may be soluble in said single liquid phase combined solution, which may comprise the middle layer. During experimental testing and pilot testing, some liquid-liquid phase transition solutions may be capable of maintaining three distinct layers within a tank with defined liquid-liquid interfaces between each layer despite the solubility of the top layer and bottom layer in the middle layer. It is possible a boundary layer or stratification layer may form at the liquid-liquid interface between the bottom layer and/or at the liquid-liquid interface between the middle layer and the top layer, wherein said boundary layer or stratification layer may comprise a mixture or solution comprising both layers. It may be desirable to minimize the size or volume of said boundary layers or stratification layers to, for example, maximize usable tank capacity and minimize thermal storage losses. It may be desirable to minimize the possible transfer of heat between the layers to maximize storage viability and longevity of stored cold or heat.

In some embodiments, systems and/or methods for minimizing mixing or heat transfer between layers may comprise mechanisms to minimize turbulence or mixing when liquid phases are being added or removed or otherwise transferred into or out of a tank or vessel. For example, a tank or thermal storage system may employ diffusers which may minimize turbulence when adding or removing or otherwise transferring liquid phases. For example, diffusers may promote the formation of laminar flow when adding or removing or otherwise transferring liquid phases, which may prevent mixing between layers of liquid phases. For example, a system may employ kinetic energy or wave or motion damping mechanisms, which may convert said kinetic energy or wave or motion into heat, or liquid, or electricity, or sound, or transfer kinetic energy, or otherwise remove or transfer away turbulence or waves or mixing from liquid-liquid interfaces or boundary layers or stratification layers. For example, some embodiments may employ features or walls or dividers storing or comprising a compressible fluid, such as a gas or a foam, which may convert kinetic energy into heat.

In some embodiments, systems and/or methods for minimizing mixing or heat transfer between layers may comprise physical dividers. In some embodiments, physical dividers may comprise a solid material which may be located, at least in part, between two liquid phases. Physical dividers may prevent mixing between layers by, including, but not limited to, one or more or a combination of the following: minimizing the surface area which liquid layers are in direct contact, or preventing or minimizing turbulence or waves or fluid motion from traveling between layers or between layers at or near liquid-liquid interfaces inside a tank, or provide an insulative divider which may prevent or minimize the transfer of heat between liquid phases within a tank.

In some embodiments, the volume of each layer in the tank may change depending on the state of charge of a thermal storage system. For example, in a thermal storage system employing a heating multi-liquid phase forming solution as the thermal storage medium, the volume of the 'cold' middle layer may increase while the volume of the 'warm' top and bottom layer may decrease when the thermal storage system is charging or storing 'cold', if, for example, said thermal storage system is a thermal storage system designed to store cooling or cold. If the relative volumes of each liquid phase or liquid layer in a tank change, the location or elevation of liquid-liquid interfaces or hypothetical liquid-liquid interfaces inside the tank may also change, which may result in the need for physical dividers to move. In some embodiments, it may be desirable for the movement of the physical dividers to match or attempt to at least partially match the movement of a layer or of a liquid-liquid interface or of a hypothetical liquid-liquid interface. For example, if the elevation of a liquid-liquid interface or the liquid level layer decreases by a first amount of centimeters, it may be desirable for the physical divider to decrease by about the same amount of centimeters, plus or minus a tolerance amount. Said tolerance amount may comprise the maximum amount of deviation in movement between the physical divider and/or movement in the liquid-liquid interface while maintaining layer separation or without substantial mixing between layers, minus a contingency amount. Said tolerance amount may comprise the maximum amount of deviation in position or location or elevation between the physical divider and/or movement in the liquid-liquid interface while maintaining layer separation or without substantial mixing between layers, minus a contingency amount.

A physical divider may comprise a solid or liquid material. A physical divider may comprise including, but not limited to, one or more or a combination of the following: a plastic, or a composite, or a rubber, or an elastic material, or a polymer, or a metal, or a ceramic, or a solid, or a liquid, or a gas. A physical divider may comprise a rigid material, or a flexible material, or any combination thereof. For example, a physical divider may comprise a rigid interior with a flexible skirt around the perimeter of the physical divider, for example, where the physical divider may be near or in contact with the tank walls. It may be desirable to place a skirt at the perimeter of a physical divider or where a physical divider meets or nearly meets a tank wall because said skirt may ensure a physical divider occupies a maximum cross sectional surface area while enabling the physical divider to be movable or mobile or cable of changing position. Said skirt may comprise a flexible material. Said skirt may comprise a flexible material which returns to about the same shape after the force resulting in flexing the material is at least partially relieved. Said skirt may comprise an elastic material. It may be desirable for a physical divider to have a shape of at least a portion of the cross sectional shape or area of a tank near at least one point where a hypothetical liquid-liquid interface may be located. It may be desirable for the physical divider to occupy at least a portion of the cross sectional area of a tank and/or occupy at least a portion of a surface a liquid phase and/or occupy a space or location which may otherwise comprise a direct liquid-liquid interface and/or reduce the total surface area of a direct or potentially direct contact liquid-liquid interface.

In some embodiments, one or more or a combination of mechanisms may be employed to ensure physical dividers are in the appropriate location, or are near or in or providing a barrier at a liquid-liquid interface, or any combination thereof. In some embodiments, the placement or movement of a physical divider may be enabled or facilitated by a passive mechanism. For example, a passive mechanism may involve a mechanism which enables the physical divider to move, such as rise or fall, with the level of layers or the level of a liquid-liquid interface utilizing the change in position of the liquid-liquid interface or the position or volume of a liquid layer. For example, in some embodiments, a passive mechanism may not require an external power source or control device beyond external power sources or control devices involved with the pumping or transferring of liquid phases or layers. It is important to note one or more or any combination of passive mechanisms may be combined. It is important to note one or more or any combination of passive mechanisms may be combined and/or may be combined with one or more or any combination of active mechanisms.

For example a passive mechanism may comprise, including, but not limited to, one or more or any combination of the following:

A physical divider with a density less than the density of one layer and greater than the density of another layer, which may enable the physical divider to naturally gravitate to a position between the lower density layer and the higher density layer due to intrinsic buoyancy properties and/or may enable the physical divider to be positioned at the liquid-liquid interface between two layers.

A physical divider which may utilize hydrophobicity and hydrophilicity to facilitate its position within a tank and/or to minimize mixing between layers. For example, a physical divider may be located between two liquid phases wherein both liquid phases are hydrophilic and, by employing hydrophobic surfaces on at least one side of the physical divider and/or hydrophilic surfaces on at least one side of the physical divider, the physical divider may gravitate to a position between the two liquid phases or a position at the liquid-liquid interface between two liquid phases. For example, a physical divider may be located between two liquid phases wherein both liquid phases are hydrophobic and, by employing hydrophobic surfaces on at least one side of the physical divider and/or hydrophilic surfaces on at least one side of the physical divider, the physical divider may gravitate to a position between the two liquid phases or a position at the liquid-liquid interface between two liquid phases. For example, a physical divider may be located between two liquid phases wherein at least one liquid phase is hydrophilic in a temperature range and at least one liquid phase is hydrophilic in a different temperature range, and, by employing hydrophobic surfaces on at least one side of the physical divider and/or hydrophilic surfaces on at least one side of the physical divider, the physical divider may gravitate to a position between the two liquid phases or a position at the liquid-liquid interface between two liquid phases. For example, a physical divider may be located between two liquid phases and the physical divider may be hydrophilic. For example, a physical divider may be located between two liquid phases and the physical divider may be hydrophobic.

A physical divider which may utilize surface tension. For example, a physical divider may utilize the surface tension at a liquid-liquid interface to enable positioning at a liquid-liquid interface. For example, a physical divider may utilize the difference in surface tension between two liquid phases. For example, a physical divider may employ material surface properties, such as surface geometry, to utilize surface tension to position a physical divider at a liquid-liquid interface. For example, surface tension or capillary forces may be employed to enable positioning of the physical divider. For example, the surface tension or capillary forces utilized may not be limited to surface tension or capillary forces at a liquid-liquid interface, and may also include, but is not limited to, surface tension or capillary forces between the physical divider and the tank wall, or the physical divider and tank wall in the presence of a liquid-liquid interface, or any combination thereof.

A physical divider may employ geometry and/or initial placement or positioning to maintain position or maintain a position at a liquid-liquid interface or at a hypothetical liquid-liquid interface. For example, a physical divider may employ a convex or concave geometric which may prevent the physical barrier from rising into an upper liquid layer or falling into a lower liquid layer. For example surface tension or suction forces or the inability for another liquid phase or fluid to enter the concave region may facilitate placement of a cup at a liquid-liquid interface. For example, in some embodiments, a physical divider may employ at least one concave surface and at least one convex surface. For example, in some embodiments, a physical divider may employ convex surfaces or external siding. For example, in some embodiments, a physical divider may employ concave surfaces or external siding. For example, in some embodiments, a physical divider may employ an internal compartment with storing at least one liquid phase and/or with an opening to a layer comprising at least a portion of said stored liquid phase.

For example, a practical demonstration of an example of phenomena at a fluid interface involving physical divider geometry may involve submerging a cup in water, filling the cup with water, then lifting the bottom of the cup above the surface of the water with the cup in an inverted or upside-down position. If the opening of the cup remains beneath the air-water interface or the water's surface, the water will remain in the cup. In such a scenario, even if the density of the cup is less than the density of the water, the cup may not fully float above the surface of the water or may not substantially rise above the surface of the water if the cup remains in an inverted or upside-down position because of the water occupying the cup and the associated density of the water relative to the air.

A physical divider may employ a difference in viscosity between two liquid phases or liquid layers at a liquid-liquid interface or hypothetical liquid-liquid interface. One liquid phase may possess a substantially different viscosity than another liquid phase, and said substantially different viscosity may be employed to help facilitate the placement of or maintain the position of a physical divider and/or to maintain a separation between two liquid phases.

A physical divider may employ electrostatic properties to maintain a position and/or maintain/or enable a separation of liquid phases. For example, two liquid phases or layers may possess different electrostatic properties or electrostatic charge, which may be utilized to ensure liquid-liquid separation in a tank with a physical barrier. For example, two liquid phases or layers may possess similar electrostatic properties or electrostatic charge, which may be utilized to ensure liquid-liquid separation in a tank with a physical barrier. For example, a physical divider may be designed with electrostatic properties which may prevent the physical divider from undesirably floating or sinking and/or may enable the physical divider to maintain proper placement and/or maintain a position at a liquid-liquid interface and/or prevent or minimize mixing between liquid phases.

A physical divider may employ magnetic properties to maintain a position and/or maintain/or enable a separation of liquid phases. For example, two liquid phases or layers may possess different magnetic properties, which may be utilized to ensure liquid-liquid separation in a tank with a physical divider. For example, two liquid phases or layers may possess similar magnetic properties, which may be utilized to ensure liquid-liquid separation in a tank with a physical divider. For example, a physical divider may be designed with magnetic properties which may prevent the physical divider from undesirably floating or sinking and/or may enable the physical divider to maintain proper placement and/or maintain a position at a liquid-liquid interface and/or prevent or minimize mixing between liquid phases.

In some embodiments, the percentage of surface area or cross sectional area or both of a liquid-liquid interface covered or occupied by a physical divider may be greater than, or equal to, or less than, one or more or any combination of the following: 1%, or 5%, or 10%, or 15%, or 20%, or 25%, or 30%, or 35%, or 40%, or 45%, or 50%, or 55%, or 60%, or 65%, or 70%, or 75%, or 80%, or 85%, or 90%, or 95%, or 99%, or 99.5%.

For example an active mechanism may comprise, including, but is not limited to, one or more or any combination of the following:

- In some embodiments, the physical divider's position, or shape, or any combination thereof may be adjusted using a mechanical device or a mechanical mechanism.

Density
- In some embodiments, a physical divider may possess a density greater than the density of one or more or all the liquid phases in a thermal storage tank.
- In some embodiments, a length adjustment mechanism may be located, for example, at or near the top of the tank.
- In some embodiments, a physical divider may possess a density less than the density of one or more or all the liquid phases in a thermal storage tank.
- In some embodiments, a length adjustment mechanism may be located, for example, at or near the bottom of the tank.
- In some embodiments a system may possess at least one physical divider with a density greater than the density of one or more or all the liquid phases and at least one physical divider with a density less than one or more or all the liquid phases. For example, in some embodiments, there may be two physical dividers in a thermal storage tank, wherein the higher elevation physical divider may possess a density greater than the density of one or more liquid layers and the wherein the lower elevation physical divider may possess a density less than the density of one or more liquid layers. The lower elevation physical divider may possess an elevation lower than the elevation of the higher elevation physical divider. The higher elevation physical divider may possess an elevation higher than the elevation of the lower elevation physical divider. In some embodiments, the position of the higher elevation physical divider may be adjusted with at least a portion of an adjustment mechanism comprising a cable connecting the higher elevation physical divider with a cable length adjustment mechanism, such as a reel or pulley located near the top of the tank or vessel. In some embodiments, the position of the lower elevation physical divider may be adjusted using a cable length adjustment mechanism comprising a cable connecting the lower elevation physical divider with at least a portion of an cable length adjustment mechanism, such as a reel or pulley, located near the bottom of the tank or vessel. By placing at least a portion of the adjustment mechanism for the lower elevation physical divider near the bottom of the tank and by placing at least a portion of the adjustment mechanism for the higher elevation physical divider near the top of the tank, it may be possible to minimize or eliminate the need for holes or open holes in a physical divider for cables to pass through, which may reduce the potential or rate of mixing between liquid layers at or near a physical divider or at or near a hypothetical liquid-liquid interface.

Controlling Position of a Physical Divider
In some embodiments, a system may employ information on system operations to determine the appropriate or desired position of the physical divider and instruct the adjustment mechanism to move the physical divider to said appropriate or desired position. A liquid-liquid interface or hypothetical liquid-liquid interface may move at one, or more, or any combination of rates of change based on, including, but not limited to, one or more or a combination of the following: the flow rate, or material or chemical or physical properties, or geometry, or the geometry of the physical divider, or the geometry of the tank or vessel, or any combination thereof. In some embodiments, the desired position of a physical divider may change in connection with or correlation with the change in position of a liquid-liquid interface. A system may determine or compute the relationship between the liquid flow rate of one or more liquid phases and the rate of change in position of a liquid-liquid interface or a hypothetical liquid-liquid interface and/or employ information on said relationship to determine the desired position of a physical divider. In some embodiments, said relationship may be an established equation or algorithm. In some embodiments, said relationship, or live or semi-live information on system operations, or other information, or any combination thereof may be employed to determine the desired location of the physical divider at any desired time interval and/or a predicted rate of change of the desired location of the physical divider. In some embodiments, the adjustment mechanism may be controlled or instructed to adjust the position of a physical divider at a specific rate of change or direction based on said information. Information may include, but is not limited to, for example, information on the flow rate of one or more liquid phases entering or exiting a thermal storage system and/or information on the geometry of the thermal storage tank. Information may be computational or digital. In some embodiments, information may be gathered from one or more equipment or sensors, or information may be stored in a digital or physical storage mechanism, or any combination thereof. In some embodiments control or actions made by a system may be at least partially automated or fully automated.

Cable or Thread Based Adjustment Mechanism:
In some embodiments, the location or elevation or position of the physical divider in a tank may be controlled or maintained or adjusted using threads or cables attached to the physical divider, or indirectly connected to the physical divider, or connected to the physical divider using a magnetic coupling, or indirectly connected to the physical divider using a magnetic force, or any combination thereof. Said threads or cables may comprise, including, but not limited to, one or more or a combination of the following: synthetic material, or organic material, or natural fiber, or composite material, or metallic material, or ceramic material, or carbon material, or hydrocarbon material, or plastic, or metal, or fibrous material, or nylon, or polyvinylidene fluoride, or polyethylene, or polyester, or Dacron, or UHMWPE, or PTFE, or fluorocarbon, or carbon fiber, or cotton, or Dyneema, or Kevlar. Said threads or cables may be connected to an adjustment mechanism or a length adjustment mechanism. Said threads or cables may be connected to an adjustment mechanism or a length adjustment mechanism. Said adjustment mechanism may comprise, for example, including, but not limited to, one or more or a combination of the following: a pulley, or reel, or actuator. Said adjustment mechanism may adjust the position of a liquid-liquid separator by adjusting the length of one or more cables or lines.

Some embodiments may employ one cable. Some embodiments may employ one cable with a cable split near a physical divider, which may split or branch one cable into multiple cables, wherein each of said multiples cables or branch cables may anchor or be connected to the physical divider, or may anchor to distributed points or locations on the physical divider, or any combination thereof. Some embodiments may employ multiple cables. Some embodiments may employ one cable and one adjustment mechanism. Some embodiments may employ multiple adjustment mechanisms and one cable. Some embodiments may employ one adjustment mechanism and multiple cables. Some embodiments may employ multiple adjustment mechanisms and multiple cables.

In some embodiments, such as, for example, in embodiments with at least one physical divider positioned at an elevation below another physical divider and/or where a cable length adjustment mechanism is located near the top of the tank, it may be desirable for the threads or cables connected to the lower elevation physical divider to pass through the higher elevation physical divider, which may require holes in the higher elevation physical divider which allow said threads or cables of the lower elevation physical divider to pass through the higher elevation physical divider, while allowing the higher elevation physical divider to operate. In some embodiments, such as, for example, in embodiments with at least one physical divider positioned at an elevation above another physical divider and/or where a cable length adjustment mechanism is located near the bottom of the tank, it may be desirable for the threads or cables connected to the higher elevation physical divider to pass through the lower elevation physical divider, which may require holes in the higher elevation physical divider which allow said threads or cables of the lower elevation physical divider to pass through the higher elevation physical divider, while allowing the higher elevation physical divider to operate. It may be desirable for said threads or cables to be as small in diameter as possible and said holes in the higher elevation physical divider to be as small in diameter as possible to minimize mixing between liquid phases and/or minimize surface area of direct contact liquid-liquid interface. It may be desirable to employ surface geometry, or specific geometry of the cable or thread or hole, or any combination thereof to, for example to, for example, minimize potential mixing between different liquid phases at said holes and/or at said threads or lines. It may be desirable to employ hydrophilic, or hydrophobic, or other material property coating or material at or in said holes and/or on said threads or cables to, for example, minimize potential mixing between different liquid phases at said holes and/or at said threads or lines.

In some embodiments, it may be desirable to maximize the volume of a tank occupied by a thermal storage medium and minimize the volume of a tank occupied by a physical divider or both.

In some embodiments, a physical divider may be connected to at least a portion of an adjustment mechanism by a magnetic coupling, or magnetic force, or magnetic interaction, or magnetic mechanism. For example, at least a portion of the siding or perimeter of a physical divider may be magnetic or may comprise a magnet and/or an actuator outside of the tank may comprise a magnet and/or said actuator may control the position of a physical divider due to the magnetic force connecting the actuator to the physical divider. In some embodiments, employing a magnetic mechanism may prevent or reduce mixing of layers because, for example, a magnetic mechanism may enable control or movement of the physical divider with less moving parts or holes in the tank or physical divider. In some embodiments, the use of a magnetic mechanism may reduce the tank volume occupied by the adjustment mechanism and/or tank divider, which may increase the available volume or percentage of volume available for or occupied by a thermal storage medium.

In some embodiments, the position of a physical divider may be adjusted by one or more or any combination of a physical bolt or screw or a threaded rod. A rotation mechanism, such as an electric motor, may be connected to said physical bolt or screw or a threaded rod. The physical bolt or screw or a threaded rod may be connected to a physical divider. In some embodiments, the physical bolt or screw or a threaded rod may be attached to the top of a physical divider. In some embodiments, a physical divider may possess complementary threads to the threads of the physical bolt or screw or a threaded rod and the physical bolt or screw or a threaded rod may pass through the physical divider. Depending on the direction of rotation, the position or elevation of a physical divider may change based on the rotation of the physical bolt or screw or a threaded rod in the presence of complementary threads in the physical divider. In some embodiments, a single physical bolt or screw or a threaded rod may be employed. In some embodiments, a physical bolt or screw or a threaded rod may be employed, however multiple non-threaded or threaded guide posts or rods, which may ensure a physical divider remains aligned or in a proper position, may also be employed. In some embodiments, multiple physical bolts or screws or threaded rods may be employed. In some embodiments with more than one physical divider, it may be desirable to employ different physical bolts or screws or threaded rods to adjust the position of each physical divider. In some embodiments with more than one physical divider, it may be desirable to employ the same physical bolts or screws or threaded rods to adjust the position of each physical divider.

In some embodiments with more than one physical divider, it may be desirable to employ the same physical bolts or screws or threaded rods to adjust the position of each physical divider, wherein, for example, the higher elevation physical divider may possess one set of threads and thread direct, and the lower elevation physical divider may possess a different set of threads and/or a different thread direction. In some embodiments, it may be desirable to employ a single rod or axle, however, the rod or axle may rotate in a different direction for one physical divider than the other, similar to counter-rotation in other applications, such as counter-rotating propellers in marine applications. It may also be desirable for the rate of rotation of a rod or axle for one physical divider to be different or capable of being different from the rate of rotation of a rod or axle for another physical divider. It may also be desirable for the rate of rotation of a rod or axle for one physical divider to be independent of or capable of being independent of the rate of rotation of a rod or axle for another physical divider. In some embodiments, the elevation of a lower elevation physical divider may rise while the elevation of a higher elevation physical divider may fall during, for example, discharging. It may be desirable for an adjustment mechanism to have a capability of adjusting the elevation of physical dividers in different directions or at different rates. In some embodiments, two or more physical dividers may be adjusted in different directions or different rates or both, although the two or more physical dividers may change position at a fixed ratio.

In some embodiments, an adjustment mechanism may help maintain the position of a physical divider, for example, by preventing the physical divider from becoming misaligned or crooked.

In some embodiments, physical dividers may possess an electrostatic change. In some embodiments, physical dividers an electrostatic charge may be provided to a physical divider and/or electricity or an electric charge from an energy source may be provided to a physical divider. In some embodiments, an electrostatic charge or electrical charge may be employed to facilitate the position of a physical divider at a liquid-liquid interface or hypothetical liquid-liquid interface. In some embodiments, an electrostatic charge or electrical charge may be employed to further minimize mixing between liquid layers near a physical divider.

Active mechanism may involve physical movement requiring power input to operate and/or may involve using mechanical device, for example, which may include, but is not limited to, a cable, or actuator, or rotating bolt or screw, or magnetism, or magnetic bearing, or magnetic actuator, or powered electrostatic charge, or electrical charge.

Note: In some embodiments, the first temperature range and the second temperature range may be about the same.

Note: In some embodiments, the first temperature range and second temperature range may be different.

Note: 'To attempt to at least partially match' may mean ensuring the position of a physical divider is within the tolerance amount of a liquid-liquid interface or hypothetical liquid-liquid interface.

Note: 'A hypothetical liquid-liquid interface' may mean the likely location of a liquid-liquid interface, even if liquid layers are not or are minimally in direct contact within a tank. A hypothetical liquid-liquid interface may be determined, for example, based on, including, but not limited to, one or more or a combination thereof: the volume of a liquid layer or the volume of each liquid layer in the tank and the geometry of the tank, or by sensors employing light, or viscosity, or density, or color, or other means to determine the location of a layer and the transition from one layer to another layer, or any combination thereof.

Note: In some embodiments, a diffuser may be employed minimize mixing or turbulence between the layers and/or maintain a liquid-liquid interface.

Note: In some embodiments, a physical barrier or divider placed between at least a portion of the layers which may minimize or prevent mixing between the layers.

Storage of Liquid Phases
Densities
  Density differences may be primarily driven by concentration of one or more chemical components, because each liquid phase may possess difference concentration or composition than the other liquid phases]
Layering in tank may occur with liquid-liquid interfaces and minimal mixing or turbulence in tank, which may be facilitated with diffusers. Some liquid-liquid phase transition liquids form well defined liquid-liquid interfaces in small liquid volumes, such as even as small as 100 mL and even at temperatures where the two or three liquid phases are mutually soluble. Some liquid-liquid phase transition liquids form well defined liquid-liquid interfaces, even at temperatures where the two or three liquid phases are mutually soluble, although under conditions of minimal turbulence or mixing.
Due to defined liquid-liquid interface and/or defined density differences which may be primarily due to composition or concentration differences between the layers, dividers may be placed or located between the layers near or at liquid-liquid interfaces.
Dividers may be employed to, for example:
  Minimize mixing between liquid phases in the thermal storage tank
  Minimize heat transfer between liquid phases in the thermal storage tank
  Enable more turbulent flow or less complicated or expensive diffusers or inlets or outlets by, for example, preventing or minimizing mixing between layers.
  Enable smaller liquid volumes or thermal storage volumes
  Enable greater energy densities
  Minimize or reduce potential unusable tank volume at liquid-liquid interfaces
Dividers may be located in liquid-liquid interfaces due to customized densities which may be greater than the density of a layer above the divider and less than the density of the layer below the divider. Buoyancy based placement of dividers may comprise passive placement of dividers.
Dividers may be located in liquid-liquid interfaces due to mechanical or other active mechanisms. Said active mechanism placement may involve moving the location or elevation or placement of the divider by means independent of the buoyancy of the divider in the layers or liquid phases. Said active mechanism placement may involve moving the location or elevation or placement of the divider in response to changes in the thermal storage system, such as, including, but not limited to, liquid phases entering or exiting the thermal storage tank, or changes in the volume of one or more liquid phases in the thermal storage tank, or any combination thereof
Some embodiments may involve both active and/or passive physical placement or movement of dividers.
Some liquid-liquid phase transition liquids have layers which will change density in response to temperature. In some liquid-liquid phase transition compositions, the density of a first liquid phase may be greater than the density of a second liquid phase at one temperature, however at a different temperature, the density of said first liquid phase may be less than the density of said second liquid phase, which may be called a density inversion. In some embodiments, a thermal storage system may be designed with protocols to ensure proper operation in the event of a density inversion and/or to predict a density inversion, based on, for example, temperature.

Heat Exchanger
Summary and Relevance

In some embodiments, the thermal storage medium may comprise the same composition as the external heat transfer medium or the thermal storage medium may comprise the external heat transfer medium. For example, in some embodiments, the thermal storage medium may be transferred from the thermal storage tank to a thermal load or an application requiring cooling or heating or a process providing cooling or heating. In some embodiments, eliminating a heat exchanger between the thermal storage medium and the external heat transfer may improve energy efficiency, or energy density, or cost, or any combination thereof.

In some embodiments, it may be desirable to have a heat exchanger between the thermal storage medium and the external heat transfer medium. For example, if the composition of the external heat transfer medium is substantially different from the thermal storage medium, it may be desirable to employ a heat exchanger to minimize or prevent contamination. For example, it may be desirable to ensure the thermal storage medium is in a closed or clean or controlled environment to minimize required water treatment, or maximize longevity of thermal storage medium, or to prevent biofouling, or to prevent degradation, or due to incompatibility or questionable compatibility with one or more materials or equipment in the systems outside of the thermal storage system and related to the external heat transfer medium, or any combination thereof.

Measurement of Specific Heat Capacity and Other Heat Transfer Properties

In some embodiments, a heat transfer medium or thermal storage medium may possess or exhibit different or changing specific heat capacity. In some embodiments, the specific heat capacity of a heat transfer or thermal storage medium may vary during operation. In some embodiments, even within a consistent process or even within a closed loop, the specific heat capacity of a heat transfer medium or thermal storage medium may vary. The specific heat capacity may vary in embodiments wherein the heat transfer medium or thermal storage medium comprises a liquid-liquid phase transition liquid because, for example, the effective specific heat of a liquid-liquid phase transition liquid may vary depending on, including, but not limited to, one or more or a combination of the following: temperature, or concentration, or composition, or other factors, or any combination thereof. In some embodiments, it may be desirable to monitor or measure specific heat capacity. It may be desirable or advantageous for said monitoring or measuring of specific heat capacity to be live, or active, or semi live, or semi active. In some embodiments, a process may adjust one or more parameters, which may include, but is not limited to, adjusting the flow rate of one or more or a combination of liquid phases or components or any combination thereof of a heat transfer medium or thermal storage medium. In some embodiments, a process may adjust one or more parameters, which may include, but are not limited to, the flow rate of one or more or a combination of liquid phases, or components, or any combination thereof of a heat transfer medium or thermal storage medium, which may be in response to, for example, measured or predicted changes in specific heat capacity and/or other heat transfer or heat capacity properties. A process may adjust flow rate or other system operations to optimize, for example, cooling, or heating, or charging, or discharging, or heat transfer, or any combination thereof.

In some embodiments, specific heat capacity of a fluid, such as a heat transfer medium or thermal storage medium, may be measured while a process is at an operating state, such as when a system is transferring heat. In some embodiments, specific heat capacity of a fluid may be measured while a process is at an idle or non-operating state. In some embodiments, specific heat capacity of a fluid may be measured while a process is at an operating state, or while a process is at an idle or non-operating state, or any combination thereof.

In some embodiments, measuring specific heat capacity may involve a benchmark fluid with a known specific heat capacity, which may be well established in literature or otherwise known or previously measured, and a fluid with an unknown specific heat capacity. It is important to note that in some embodiments, the fluid with an unknown specific heat capacity may have a known specific heat capacity, or a specific heat capacity which can be predicted, however the measurement of specific heat capacity may be employed to check the specific heat capacity and determine if any unforeseen changes are occurring in the system or to check prediction calculations. It is important to note that in some embodiments, the fluid with an unknown specific heat capacity may possess a specific heat capacity which may be presumed, or may be unknown, or any combination thereof. In some embodiments, the fluid with an unknown specific heat capacity may be heat exchanged with the benchmark fluid. Heat exchanging of a benchmark fluid with a fluid of an unknown specific heat capacity may be conducted as a part of or during the operation of a process. For example, a benchmark fluid may be heat exchanged with a fluid with an unknown specific heat capacity during the charging of a thermal storage system, or during the discharging of a thermal storage system, or any combination thereof. For example, a benchmark fluid may be heat exchanged with a fluid with an unknown specific heat capacity during the heat exchange of two or more heat transfer loops. For example, a benchmark fluid may be heat exchanged with a fluid with an unknown specific heat capacity during the heat exchange of a closed cooling loop and an open cooling loop. For example, in some embodiments, a benchmark fluid may comprise water circulating in a cooling tower or other evaporative cooling water loop and a fluid with an unknown specific heat capacity may comprise a fluid in a closed heat transfer loop. For example, in some embodiments, a benchmark fluid may comprise water from an open cooling loop and a fluid with an unknown specific heat capacity may comprise a fluid in a closed heat transfer loop. For example, in some embodiments, a benchmark fluid may comprise water and a fluid with an unknown specific heat capacity may comprise a liquid-liquid phase transition liquid. For example, in some embodiments, a thermal storage medium, or a portion of a thermal storage medium pumped into a heat exchanger, or any combination thereof may comprise a fluid with an unknown specific heat capacity and an external heat transfer medium may comprise a benchmark fluid.

In some embodiments, a fluid with an unknown specific heat capacity and a benchmark fluid may be employed to measure and/or calculate the specific heat capacity and/or other properties of the fluid with an unknown specific heat capacity. For example, the fluid with an unknown specific heat capacity may be heat exchanged with the benchmark fluid. Using, for example, the temperature of each fluid entering the heat exchanger, the temperature of each fluid exiting the heat exchanger, the liquid flow rate (mass and/or volumetric flow rate), and the specific heat capacity of the benchmark fluid, a process may calculate the specific heat capacity and/or other properties of the fluid with the unknown specific heat capacity.

The following is an example calculation of the specific heat capacity of a liquid with an unknown specific heat capacity, wherein the benchmark fluid comprises water and the liquid with an unknown specific heat capacity comprises a liquid-liquid phase transition liquid, and wherein the density of both fluids is about 1.0 g/ml.

Water Flow Rate: 10,000 Liters Per Minute (LPM)
Liquid-Liquid Phase Transition Liquid Flow Rate: 6,000 LPM
Water Temperature In: 6.7 deg C.
Water Temperature Out: 12.2 deg C.
Liquid-Liquid Phase Transition Liquid Temperature In: 13.2 deg C.
Liquid-Liquid Phase Transition Liquid Temperature Out: 7.7 deg C.
Specific Heat Capacity of Water: 4.18 J/g degK
Simplified Calculated Heat Exchange Temperature Difference: 1 deg K
Specific Heat Capacity of Liquid-Liquid Phase Transition Liquid Example Calculation
  Heat Capacity Rate of Water: 4.18*(12.2-6.7)*10,000=229,900 kJ per minute
  Temperature Change of Liquid-Liquid Phase Transition Liquid=13.2−7.7=5.5 degK
  Specific Heat Capacity of Liquid-Liquid Phase Transition Liquid (229,900/5.5)/6,000=6.97 kJ/kg degK=6.97 J/g degK
Calculated Specific Heat Capacity of Liquid-Liquid Phase Transition Liquid: 6.97 J/g degK In some embodiments, the process for measuring specific heat capacity may also measure other properties or provide information to calculate other properties, which may include, but are not limited to, heat transfer rate, or heat transfer coefficients, or any combination thereof. For example, in an example calculation for specific heat capacity of the fluid with an unknown specific heat capacity, information on the properties of the heat exchanger, or the heat exchange properties of the liquid-liquid phase transition liquid, or any combination thereof may be revealed or determined. For example, the temperature difference between the fluid with an unknown specific heat capacity and the benchmark fluid may provide information required to calculate or presume the heat transfer coefficient of the fluid with an unknown specific heat capacity. In some embodiments, the benchmark fluid may have a known heat transfer coefficient, and/or the heat exchanger may have a known heat conductivity or heat transfer coefficient. In some embodiments, the heat transfer coefficient and/or similar heat transfer properties may be determined or calculated or presumed based on the temperature difference between the benchmark fluid and the fluid with an unknown specific heat capacity in a heat exchange, for example, if the benchmark fluid may have a known heat transfer coefficient, and/or the heat exchanger may have a known heat conductivity or heat transfer coefficient. Other information may be useful in determining heat transfer properties, which may include, but is not limited to, the total amount of heat transferred, which may be measured based on the change in temperature and flow rate of the benchmark fluid, or the total temperature change of the liquid with an unknown specific heat capacity. It is important to note the heat transfer coefficient and/or other heat transfer properties may vary in a liquid-liquid phase transition liquid, which may make live measurement of said properties or the manifestations of said properties important in optimizing process operation and process design.

In some embodiments, specific heat capacity and/or other heat transfer properties may be measured using a process which may be independent of the state of operation of a system, such as a cooling, or heating, or thermal storage system. For example, a process for measuring specific heat capacity and/or other heat transfer properties may involve sampling or removing a portion or small amount or a stream or a substream or any combination thereof of a fluid with a unknown specific heat capacity, or a fluid with other unknown heat transfer properties. For example, a stream of a liquid with an unknown specific heat capacity may be pumped or otherwise transferred from a process to a heat exchanger apparatus. Said pumping or otherwise transferring may be continuous, semi-batch, or batch, or any combination thereof. Said heat exchanger apparatus may comprise a heat exchanger, a heating or cooling element, and a heat flux sensor sandwiched between said heating or cooling element and said heat exchanger. In some embodiments, said heat exchanger may comprise the wall of a pipe, or a cup, or a bottle, In some embodiments, said heat exchanger may comprise a heat exchanger, or a heat exchanger wall, or a heat exchanger surface. Said heat exchanger apparatus may be surrounded, at least in part, by an insulative material or insulation to, for example, minimize the influence of the outside environment on the data. Said heating or cooling element may comprise, including, but not limited to, one or more or a combination of the following: an electric heater or other heat source, or may comprise a thermal electric device, such as a peltier, or may comprise a benchmark fluid flowing at a measured flow rate and a measured input and/or output temperature, or any combination thereof. In some embodiments, it may be desirable to know or control the rate of heat supplied by said heating element, or the rate of cooling supplied by said cooling element, or any combination thereof. In some embodiments, knowing or controlling the rate of heat supplied by said heating element, or the rate of cooling supplied by said cooling element, or any combination thereof may provide a check or redundancy for the heat flux sensor, or may enabling measurement of specific heat capacity in a system without a heat flux sensor, or provide heat capacity information or other thermal property information on the fluid even if the heat flux sensor is out of service, or may be helpful in checking or calibrating the heat flux sensor. Said heating or cooling element with a known rate of heating or known rate of cooling may comprise, including, but not limited to, one or more or a combination of the following: an electric heater or other heat source with a known supplied amount of electric power or other form of energy or a known rate of heat supply, or may comprise a thermal electric device, such as a peltier, with a known coefficient of performance and amount of electric power, or may comprise a benchmark fluid flowing at a measured flow rate and a measured input and/or output temperature, or any combination thereof. In some embodiments, the heat flux sensor may provide the heat transfer rate, which may enable accurate measurement of specific heat capacity and/or other heat transfer properties even in instances where the rate of heating or cooling supplied by a heating or cooling element are unknown. The residence time of the fluid with an unknown specific heat capacity in the heat exchanger apparatus may be controlled. Similarly, the rate of power, or heat, or cooling, or any combination thereof supplied to the heat exchanger apparatus by the heating or cooling element during said time may also be known. Additionally, the mass, or mass flow rate, or any combination thereof through or in the heat exchanger apparatus of the fluid with an unknown specific heat capacity may be controlled, or measured, or otherwise known. Specific heat capacity of the fluid with an unknown specific heat capacity may be calculated by integrating the supplied rate of power, or heat, or cooling during said time period to determine the total heat transferred, then dividing total heat transferred by the temperature change and mass of the fluid with an unknown specific heat capacity. It may be desirable for the fluid with an unknown specific heat capacity to be mixing or mixed during specific heat capacity measurement. For example, if a stream or sample of a fluid with an unknown specific heat capacity is transferred into a heat exchange apparatus unit in a batch or semi-batch configuration, additional or induced mixing may be desired. In some embodiments, a heat exchanger apparatus may measure specific heat capacity in a batch or semi-batch based configuration, which may ensure a known residence time. In some embodiments, a heat exchanger apparatus may measure specific heat capacity in a continuous flow configuration, wherein the continuous flow configuration may possess a known or predicted or calculated residence time. It may be desirable to zero out or remove influence of the specific heat capacity or heat capacity of other materials involved, which may include, but are not limited to, the heat capacity of the heat exchanger apparatus, or the heat capacity of the heat flux sensor, or any materials which other than the measured or tested fluid, or any combination thereof. Additional information or sensors which may be useful may include, but are not limited to, sensors measuring the temperature of the one or more sides of the heat flux sensor, or the temperature of different parts of the heat exchanger apparatus. Said additional information or sensors may be useful in determining heat transfer coefficient and/or heat transfer rate and/or other heat transfer properties, and/or determining the effective temperature difference of the heat exchanger, which may also be useful in determining heat transfer coefficient and/or heat transfer rate and/or other heat transfer properties. The following is an example embodiment and/or calculation for measuring the specific heat capacity of a fluid with an unknown specific heat capacity using a heat flux sensor:

Summary: The present example embodiment may comprise a specific heat capacity measurement device which may comprise a heat exchanger apparatus comprising a vessel with at least one thermally conductive surface, a heat flux sensor, and a mixing device. In some embodiments, it may be desirable for the mixing device to possess a known mass, or known specific heat capacity, or known total heat capacity, or any combination thereof and/or it may be desirable for the mixing device to be fully contained within the vessel to minimize undesired heat transfer. An example mixing device may comprise a magnetic stir bar or a stirring system with a magnetic bearing. The present example embodiment may operate in continuous, or semi-batch, or batch, or any combination thereof fashion. It may be desirable for the residence time of the measured fluid to be known or otherwise measured. In some embodiments, such as some embodiments with a continuous configuration or other configurations, it may be desirable to place multiple temperature sensors throughout the vessel at different points of the vessel which may correspond to different residence times. In some embodiments, such as some embodiments with a batch configuration, it may be possible to employ one temperature sensor in the vessel, although, if desired, more than one temperature sensor may be employed. In some embodiments, it may be desirable for the vessel to be self-cleaning and cleaned to remove residual fluid before new fluid is added, if, for example, the apparatus is employed in a batch configuration.

Calculation Summary: To calculate the effective specific heat capacity of a fluid at any temperature within a measured temperature range may involve measurement of the, for example, the following:

The initial temperature of the fluid in the vessel. It may be desirable for the initial temperature of the fluid employed for testing to be the temperature of the fluid once the temperature of the fluid has stabilized for a defined period of time after the fluid has been added to the vessel. For example, the temperature of the fluid after the sample of the fluid has been added to the vessel and the fluid temperature has been stable for more than, for example, 5 minutes. The purpose of waiting for the temperature of the fluid to stabilize may be to minimize the potential influence of the previous of potentially varying temperatures and stored heat capacity of other materials than the tested fluid in the heat exchange or calorimetry apparatus on the measurement of the fluids' heat transfer properties.

The temperature of the fluid at each time interval. For example, a temperature measurement may be conducted at time intervals which match the time intervals which the heat flux measurements are conducted.

The heat flux rate.

A heat flux sensor may produce a small amount of electric power, which may comprise an electric signal. The amount of power of said electric signal may correspond or relate to the rate of heat transferred across or through the heat flux sensor, which may comprise the heat flux rate. Said signal may be measured in time intervals which correspond or related to or match the time intervals of fluid temperature measurements. The heat flux rate may be integrated over time to produce the total amount of heat flux or heat transferred in a period of time, and divided by the change in temperature of the fluid during said period of time to calculate the heat capacity. Dividing said heat capacity by the mass of the fluid may calculate the specific heat capacity of the fluid within said change in temperature or within the tested temperature range or within the temperature range which occurred in said period of time.

The mass of the fluid.

The density of the fluid, if, for example, the amount of fluid in the apparatus is determined volumetrically, and volumetric measurements of the fluid may need to be converted into mass measurements for, for example, calculating specific heat capacity and other heat capacity measurements.

The rate of mixing. It may be desirable to ensure the rate of mixing is about the same for each test or measurement.

Example Calculation:
Fluid Sample Mass: 1,000 grams
Fluid Sample Initial Temperature: 7 degC.
Heat Flux Rate: 219,000 J/h
Fluid Sample Final Temperature: 8 degC.
Elapsed Time Between Initial and Final Temperature: 120 seconds or 0.033333 hours
Example Calculation: ((219,000 J/h*0.033333)/(8 degC.−7 degC.))/1000 grams
Calculated Average Specific Heat Capacity: 7.3 J/g deg K Note: The above example calculation may calculate or provide an average specific heat capacity for a fluid heated in the temperature range of 7-8 degC. or from 7 degC. to 8 deg C. Other temperature ranges, or elapsed times, or any combination thereof may be measured. Average specific heat capacity may be measured in other temperature ranges, or elapsed times, or any combination thereof.

Note: In some embodiments or instances, a fluid may be cooled from an initial temperature to a final temperature.

Note: In some embodiments, an apparatus for measuring specific heat capacity and/or other thermal properties may be capable of heating the fluid, or cooling the fluid, or any combination thereof. The apparatus may be capable of switching between heating and cooling modes, or cooling and heating modes, or any combination thereof.

Note: In some embodiments, the initial temperature may be greater than the final temperature and the apparatus may heat the fluid. In some embodiments, the initial temperature may be lower than the final temperature and the apparatus may cool the fluid.

Note: In some embodiments, the initial temperature may be greater than or equal to the final temperature and the apparatus may cool the fluid. For example, a fluid may possess an exothermic enthalpy of phase change or a liquid-liquid phase transition, which may result in the release of heat and/or may, at least temporarily, generate heat at a rate which is greater than the rate which the fluid is being cooled or the rate which heat is removed from the fluid.

In some embodiments, the initial temperature may be less than or equal to the final temperature and the apparatus may heat the fluid. For example, a fluid may possess an endothermic enthalpy of phase change or a liquid-liquid phase transition, which may result in the release of heat and/or may, at least temporarily, absorb heat at a rate which is greater than the rate which the fluid is being cooled or the rate which heat is removed from the fluid.

In some embodiments, a system may adjust one or more operations in response to changes in specific heat capacity and/or other measured or predicted heat transfer properties. In some embodiments, a system may adjust one or more operations in response to changing desires or needs or requirements, and use data on specific heat capacity, or other heat transfer properties, or any combination thereof in determining said adjustments. For example, said adjustments may include, but are not limited to, one or more or a combination of the following:

For example, based on live specific heat capacity measurement information, a process may adjust the flow rate of one or more liquid phases of a liquid-liquid phase transition liquid.

For example, a process may increase the flow rate when specific heat capacity of a heat transfer fluid decreases.

For example, a process may decrease the flow rate when specific heat capacity of a heat transfer fluid increases.

For example, a process may increase the concentration of a liquid phase, or chemical, or a combination of chemicals, or any combination thereof to increase specific heat capacity when specific heat capacity increases.

For example, a process may decrease the concentration of a liquid phase, or chemical, or a combination of chemicals, or any combination thereof to increase specific heat capacity when specific heat capacity increases.

For example, a process may increase the concentration of a liquid phase, or chemical, or a combination of chemicals, or any combination thereof to increase specific heat capacity when specific heat capacity decreases.

For example, a process may decrease the concentration of a liquid phase, or chemical, or a combination of chemicals, or any combination thereof to increase specific heat capacity when specific heat capacity decreases.

For example, a process may utilize other measured or predicted heat transfer property information instead of or in addition to specific heat capacity to determine optimal adjustments. For example, a process may measure the total heat transferred between a benchmark fluid and a fluid with an unknown specific heat capacity. In some instances, the fluid with an unknown specific heat capacity may have a greater specific heat capacity and/or may have a heat transfer coefficient greater than the benchmark fluid, which may result in a greater total temperature change of the benchmark liquid in a heat exchange then, for example, if the benchmark fluid was to heat exchange with the benchmark fluid.

In some embodiments, it may be desirable to adjust the relative flow rate of one fluid relative to the other fluid. For example, in some embodiments it may be desirable to decrease the flow rate of a fluid with an unknown specific heat capacity in response to an increase in total heat transfer or total heat transfer rate to optimize the temperature of the benchmark fluid or to ensure the output benchmark fluid is in a desired temperature range, or the fluid with an unknown specific heat capacity is in a desired temperature range, or any combination thereof. For example, in some embodiments it may be desirable to increase the flow rate of a fluid with an unknown specific heat capacity in response to a decrease in total heat transfer or total heat transfer rate to optimize the temperature of the benchmark fluid or to ensure the output benchmark fluid is in a desired temperature range, or the fluid with an unknown specific heat capacity is in a desired temperature range, or any combination thereof For example, a process may utilize other heat transfer property information instead of or in addition to specific heat capacity to determine optimal adjustments. For example, a process may measure the total heat transferred between a benchmark fluid and a fluid with an unknown specific heat capacity. In some instances, the fluid with an unknown specific heat capacity may have a greater specific heat capacity and/or may have a heat transfer coefficient less than the benchmark fluid, which may result in a smaller total temperature change of both liquids in a heat exchange then, for example, if the benchmark fluid was to heat exchange with the benchmark fluid. In some embodiments, it may be desirable to adjust the concentration of one or more chemicals or components in a liquid-liquid phase transition liquid, which may be the liquid with an unknown specific heat capacity, to increase the specific heat capacity, or increase the heat transfer coefficient, or decrease the specific heat capacity, or decrease the heat transfer coefficient, or any combination thereof. For example, it may be desirable to reduce the concentration of one or more viscous chemicals in a liquid-liquid phase transition composition to improve the heat transfer coefficient, even if said reduction in concentration results in a decrease in specific heat capacity. For example, it may be desirable to increase the concentration of one or more viscous chemicals in a liquid-liquid phase transition composition to improve the specific heat capacity, even if said increase in concentration results in a decrease in the heat transfer coefficient. For example, it may be desirable to increase the concentration of one or more viscous chemicals in a liquid-liquid phase transition composition to improve the specific heat capacity, or the heat transfer coefficient, or heat transfer rate, or any combination thereof. For example, it may be desirable to increase the concentration of one or more less viscous chemicals in a liquid-liquid phase transition composition to improve the specific heat capacity, or the heat transfer coefficient, or heat transfer rate, or any combination thereof. For example, it may be desirable to increase the total liquid flow rate of a liquid-liquid phase transition liquid while maintaining the same compositions and concentration in the liquid-liquid phase transition liquid.

For example, a process may adjust flow rate of one or more liquid phases to change viscosity properties or to increase or decrease heat transfer rate or heat transfer coefficient. For example, in some instances, it may be desirable to decrease the flow rate of a viscous liquid phase and/or increase the flow rate of a less viscous liquid phase, which may result in a greater heat transfer coefficient or lower fluid flow turbulence, or any combination thereof. For example, in some instances, it may be desirable to increase the flow rate of a viscous liquid phase and/or decrease the flow rate of a less viscous liquid phase, which may result in a greater heat transfer coefficient or lower fluid flow turbulence, or any combination thereof. For example, in some instances, it may be desirable to decrease the flow rate of a viscous liquid phase and/or increase the flow rate of a less viscous liquid phase, which may result in a greater specific heat capacity. For example, in some instances, it may be desirable to increase the flow rate of a viscous liquid phase and/or increase the flow rate of a less viscous liquid phase, which may result in a greater specific heat capacity.

Adjust the rate which tank dividers move within a tank based on, for example, changes in the flow rate of liquid phases entering and/or exiting a tank.

Adjusting concentration

Adjusting flow rate

Increasing the flow rate of one liquid phase, while decreasing the flow rate of another liquid phase Increasing the flow rate of one liquid phase, while maintaining the flow rate of another liquid phase Maintaining flow rate, while changing composition Maintaining flow rate, while adjusting concentration Adjusting concentration or composition to increase specific heat capacity Adjusting concentration or composition to increase heat transfer coefficient Adjusting concentration or composition to improve liquid-liquid phase transition characteristics Adjusting concentration or composition to reduce freezing point temperature Adjusting concentration or composition to increase convective heat transfer properties.

Adjusting concentration or composition to reduce viscosity

Adjusting level of tank dividers or adjusting the rate of movement of tank dividers Adjusting location or rate of movement of tank dividers to ensure each tank divider is at a level which matches or close to matches the level of a hypothetical or actual liquid-liquid interface associated with each tank divider.

Some embodiments may involve active measurement of specific heat capacity and heat capacity rate. In some embodiments, the thermal storage system may possess a process for live monitoring of specific heat capacity or heat capacity rate.

For example, during heat exchanging between the thermal storage medium and the external heat transfer medium, the specific heat capacity of the thermal storage medium may be calculated if the flow rate, entering temperature, exiting temperature, and specific heat capacity of the external heat transfer medium are known and the flow rate, entering temperature, and exiting temperature of the thermal storage medium are known. If the density of the thermal storage medium is also known, the specific heat capacity of the thermal storage medium may also be calculated.

For example, when the thermal storage system is not charging or discharging, the specific heat capacity of the thermal storage medium may be measured by sampling a portion of each of the one or more desired layers or liquid phases of the thermal storage medium, heat exchanging said sampled thermal storage medium with an external heat transfer medium at a temperature substantially greater than or substantially less than the temperature of the thermal storage medium and a known flow rate, and measuring the temperature change of the external heat transfer medium, wherein said external heat transfer medium may possess a specific heat capacity, a mass or flow rate, and a entering temperature and exiting temperature known by the system or system user or system operator.

For example, a calorimetry unit may be employed to measure the heat capacity of a known mass or volume of thermal storage medium.

For example, a heat flux sensor may be employed to measure the heat capacity of a known mass or volume of thermal storage medium. Heating or 'cooling' may be applied to the other side of the heat flux sensor and the heat flux sensor may measure the rate of heat transfer. The rate of heat transfer may be integrated over time to calculate the total heat transferred to or from the thermal storage medium. The time may be matched with the time of changes in temperature of the thermal storage medium to calculate the heat capacity of the thermal storage medium sample or the specific heat capacity of the thermal storage medium.

For example, thermal storage medium may be sampled and specific heat capacity measured in a separate heat capacity measurement device or in a lab.

For example, active adjustments in the flow rate of thermal storage medium based on active measurements of thermal storage medium specific heat capacity. For example, if active measurements of thermal storage medium specific heat capacity show a decrease in specific heat capacity, the system may increase the flow rate of the thermal storage medium to achieve the desired level of heat transfer or desired heat capacity rate. For example, if active measurements of thermal storage medium specific heat capacity show an increase in specific heat capacity, the system may decrease the flow rate of the thermal storage medium to achieve the desired level of heat transfer or desired heat capacity rate.

For example, active adjustments in flow rate to achieve desired heat exchange exit temperatures of the thermal storage medium and/or of the external heat transfer medium.

For example, pumping the appropriate flow rate of thermal storage medium into the heat exchanger to heat exchange with the external heat transfer medium. The flow rate of the thermal storage medium may be calculated using the heat capacity rate of the external heat transfer medium in the heat exchanger, which may be calculated using the specific heat capacity, temperature in, temperature out, and flow rate of the external heat transfer medium in the heat exchanger. It may be desirable to pump the thermal storage medium at a flow rate which achieves an about equal heat capacity rate as the heat capacity rate of the external heat transfer medium.

For example, adjusting the elevation or position of the tank dividers using information on the flow rate of each liquid phase entering and/or exiting the tank. The change in liquid level of each liquid layer in a tank may increase at a calculable rate based on, for example, the flow rate of each liquid phase entering or exiting the tank. Each liquid layer may be associated with or may comprise a specific liquid phase or a specific liquid phase composition or a specific type of liquid phase.

Three layers—dividing layers to minimize mixing
    Relative volume of layers depending on state of charge
    Warm—Cold—Warm
    Cold—Warm—Cold
    Energy Density
    Flow rate of liquid entering or exiting layers
    Purpose of Liquid-Liquid Separation
    Potential implementation without liquid-liquid separation
    The benefits of density differences, and/or liquid-liquid interfaces, and reversible liquid-liquid phase transitions in enabling temperature stratified thermal storage in smaller tank volumes or smaller tank heights
    Enhanced heat capacity due to the enthalpy of liquid-liquid phase transition
    Some benefits may not even require enhanced heat capacity
    Heat exchange between thermal storage medium and external heat transfer medium and benefits of liquid phase thermal storage medium
    Application in cold storage
    Application in heat storage
    Application with temperatures greater than the freezing point of water
    Application with temperatures greater than the boiling point of water
    Live measurement and monitoring of specific heat capacity and heat capacity rate Notes
    Example Thermal Storage Components:
    Tank
    Liquid-Liquid Separation
        Coalescer
        Decanter
        Centrifuge
        Electrostatic Separation
        Electrostatic Coalescer
    Adjustable Tank Divider
        Floating
        Mechanical
    Circulating Pump
    Heat Exchanger (Liquid to Liquid Heat Exchanger, Heat Exchanging Liquid inside the thermal storage system with chilled water, refrigerant, or other heat transfer medium) (may be liquid to gas-liquid heat exchange) (May be a liquid to solid-liquid heat exchanger) (may be liquid to gas heat exchanger)
    Diffuser
    Valves
    Sensors
        Flow Meter
        Tank Divider Level
    If lines or cables are used, the length of the lines or cables or the length of cable or line unreeled may be employed
    If magnetic adjustment is used, the height or position of the magnetic component may be employed One or more sensors may be employed to measure the location of each tank divider
    Liquid-Liquid Separator Separation Efficiency
    Temperature
    pH
    Liquid Opacity or Droplet Count or Liquid Scattering (may determine if a liquid-liquid phase transition has occurred in the liquid solution)
    Heat Transfer Coefficient
    Heat Transfer Rate
    Viscosity
    Heat Flux Sensor
    System integration
        Active measurement of specific heat capacity and heat capacity rate. In some embodiments, the thermal storage system may possess a process for live monitoring of specific heat capacity or heat capacity rate For example, during heat exchanging between the thermal storage medium and the external heat transfer medium, the specific heat capacity of the thermal storage medium may be calculated if the flow rate, entering temperature, exiting temperature, and specific heat capacity of the external heat transfer medium are known and the flow rate, entering temperature, and exiting temperature of the thermal storage medium are known. If the density of the thermal storage medium is also known, the specific heat capacity of the thermal storage medium may also be calculated.

When the thermal storage system is not charging or discharging, the specific heat capacity of the thermal storage medium may be measured by sampling a portion of each of the one or more desired layers or liquid phases of the thermal storage medium, heat exchanging said sampled thermal storage medium with an external heat transfer medium at a temperature substantially greater than or substantially less than the temperature of the thermal storage medium and a known flow rate, and measuring the temperature change of the external heat transfer medium, wherein said external heat transfer medium may possess a specific heat capacity, a mass or flow rate, and a entering temperature and exiting temperature known by the system or system user or system operator.

For example, a calorimetry unit may be employed to measure the heat capacity of a known mass or volume of thermal storage medium.

For example, a heat flux sensor may be employed to measure the heat capacity of a known mass or volume of thermal storage medium. Heating or 'cooling' may be applied to the other side of the heat flux sensor and the heat flux sensor may measure the rate of heat transfer. The rate of heat transfer may be integrated over time to calculate the total heat transferred to or from the thermal storage medium. The time may be matched with the time of changes in temperature of the thermal storage medium to calculate the heat capacity of the thermal storage medium sample or the specific heat capacity of the thermal storage medium.

Thermal storage medium may be sampled and specific heat capacity measured in a separate heat capacity measurement device or in a lab.

Active adjustments in the flow rate of thermal storage medium based on active measurements of thermal storage medium specific heat capacity. For example, if active measurements of thermal storage medium specific heat capacity show a decrease in specific heat capacity, the system may increase the flow rate of the thermal storage medium to achieve the desired level of heat transfer or desired heat capacity rate. For example, if active measurements of thermal storage medium specific heat capacity show an increase in specific heat capacity, the system may decrease the flow rate of the thermal storage medium to achieve the desired level of heat transfer or desired heat capacity rate.

Active adjustments in flow rate to achieve desired heat exchange exiting temperatures of the thermal storage medium and/or of the external heat transfer medium.

Pumping the appropriate flow rate of thermal storage medium into the heat exchanger to heat exchange with the external heat transfer medium. The flow rate of the thermal storage medium may be calculated using the heat capacity rate of the external heat transfer medium in the heat exchanger, which may be calculated using the specific heat capacity, temperature in, temperature out, and flow rate of the external heat transfer medium in the heat exchanger. It may be desirable to pump the thermal storage medium at a flow rate which achieves an about equal heat capacity rate as the heat capacity rate of the external heat transfer medium.

Adjusting the elevation or position of the tank dividers using information on the flow rate of each liquid phase entering and/or exiting the tank. The change in liquid level of each liquid layer in a tank may increase at a calculatable rate based on, for example, the flow rate of each liquid phase entering or exiting the tank. Each liquid layer may be associated with or may comprise a specific liquid phase or a specific liquid phase composition or a specific type of liquid phase.

Contingency Planning

In some embodiments, such as, for example, systems with LCST liquid-liquid phase transition liquid thermal storage medium, if the combined liquid phase, which may comprise the 'cold' liquid layer and/or may comprise the middle layer, increases in temperature at, in, or above a liquid-liquid phase transition temperature range (for example, if the tank warms up over time because it has not been charged recently), it is possible the specific heat capacity may change, which may be actively measured and calculated.

Freezing temperatures

Mixing of layers or liquid phases

Note: Floating barrier plate or divider may comprise a plastic disk or bladder filled with a liquid comprising a custom blend of glycol and water to achieve a density between the density of the two layers Note: Floating barrier or divider may comprise a composite material Note: Floating barrier divider may employ a skirt or thin sheet of flexible plastic or similar material which may be employed to maintain at least a portion of a separation between the liquid layers while also allowing movement of the floating barrier during charging and discharging of the thermal storage tank.

Note: Thermal storage tank may employ guideposts to maintain the position of the floating barrier or plate or divider Note: In some embodiments, a physical divider may move up and down based on the flow rates of liquid layers into and out of the tank and the total volume of each region of the tank. In some embodiments, a physical divider may move up and down on posts, wherein the posts may comprise bolts with threads and the physical divider may contain treads and a controlled rotating mechanism or rotating motor may rotate or the bolts at a calculated rate based on, for example, the flow rate of liquids entering and exiting the tank. The present embodiment may be advantageous in embodiments where the layers in the thermal storage tank possess minimal density differences or inconsistent density differences. The present embodiment may be advantageous in embodiments where the density difference between the layers is insufficient to enable consistent or accurate movement of a floating barrier in a tank.

Additional Notes

Example Benefits of Some Thermal Storage Embodiments

Reduced requirement or minimal requirement of diffuser

Potential for 2× Energy Density and Capacity for same supply/return or cold/warm temperature split Potential for smaller tank and required land area Potential for nearly full use of tank volume for thermal storage or figure of merit (FOM)

Potentially shorter construction time

Ability to use lower 'cold' temperature (if desired)
  Not limited to 39 degrees because densities are independent of the temperature Ability to use warmer 'cold' temperature while providing the same or greater energy density as chilled water (e.g. a chilled water reset without sacrificing heat carrying capacity), which may enable greater chiller COP and greater energy efficiency (e.g. less electricity consumption for the same amount of cooling.

| Example FIGS. 17-21 Key | |
|---|---|
| Label | Description |
| L | Liquid stream |
| Floating Plate | May comprise a tank divider. |

-continued

Example FIGS. 17-21 Key

| Label | Description |
|---|---|
| LLS | Liquid-Liquid Separator. May separate two liquid phases into two non-contiguously separate liquid phases. |
| V | Valve |
| Layer 1 | Warm liquid phase layer comprising one liquid phase of a multi-liquid phase state liquid-liquid phase transition liquid. |
| Layer 2 | Cold, combined liquid phase layer comprising a combined single liquid phase solution. |
| Layer 3 | Warm liquid phase layer comprising one liquid phase of a multi-liquid phase state liquid-liquid phase transition liquid. |
| FC | Flow Controller |

Additional Notes

A warm thermal storage region may be at a temperature greater than the temperature of the cold thermal storage region in the same thermal storage system or enclosure. A warm thermal storage region may have a temperature greater than the temperature of the cold thermal storage region by greater than or equal to one or more or any combination of the following: 1° K, or 2° K, or 3° K, or 4° K, or 5° K, or 6° K. or 7° K, or 8° K, or 9° K, or 10° K.

The temperature of warm thermal storage region and the cold thermal storage region may vary and/or may be dependent on the desired temperatures for the application. For example, some embodiments may be applicable to thermal storage for air conditioning, which may involve, for example, a cold thermal storage with a temperature of 5° C. and a warm thermal storage region with a temperature of 13° C. For example, some embodiments may be applicable to thermal storage for air conditioning, which may involve, for example, a cold thermal storage with a temperature of 1-7° C. and a warm thermal storage region with a temperature of 10-16° C. For example, some embodiments may be applicable to thermal storage for data center cooling, which may involve, for example, a cold thermal storage with a temperature of 18° C. and a warm thermal storage region with a temperature of 24° C. For example, some embodiments may be applicable to thermal storage for data center cooling, which may involve, for example, a cold thermal storage with a temperature of 18° C. and a warm thermal storage region with a temperature of 28° C. For example, some embodiments may be applicable to thermal storage for data center cooling, which may involve, for example, a cold thermal storage with a temperature of 7-22° C. and a warm thermal storage region with a temperature of 12-30° C. For example, some embodiments may be applicable to district cooling, which may involve, for example, a cold thermal storage with a temperature of 4° C. and a warm thermal storage region with a temperature of 13° C. For example, some embodiments may be applicable to industrial process cooling, which may involve, for example, a cold thermal storage with a temperature of 22° C. and a warm thermal storage region with a temperature of 35° C. For example, some embodiments may be applicable to industrial process cooling, which may involve, for example, a cold thermal storage with a temperature of 5-40° C. and a warm thermal storage region with a temperature of 10-60° C. For example, some embodiments may be applicable to a heating system, such as a district heating system or geothermal heating system, which may involve, for example, a cold thermal storage with a temperature of 25° C. and a warm thermal storage region with a temperature of 60° C. For example, some embodiments may be applicable to a heating system, such as a district heating system or geothermal heating system, which may involve, for example, a cold thermal storage with a temperature of 5-60° C. and a warm thermal storage region with a temperature of 30-110° C.

A first bulk composition being 'about the same as' a second bulk composition may mean that the mass percent concentration of each major chemical component in the bulk compositions differ by less than one or more or any combination of the following: 0.01%, or 0.05%, or 0.1%, or 0.2%, or 0.3%, or 0.4%, or 0.5%, or 0.6%, or 0.7%, or 0.8%, or 0.9%, or 1.0%, or 1.5%, or 2%, or 2.5%, or 3%, or 3.5%, or 4%, or 4.5%, or 5%, or 5.5%, or 6%, or 6.5%, or 7%, or 7.5%, or 8%, or 8.5%, or 9%, or 9.5%, or 10%.

A 'Major chemical component' may mean a chemical which comprises greater than or equal to one or more or any combination of the following mass percent concentrations of a bulk composition: 0.5%, or 1%, or 1.5%, or 2%, or 2.5%, or 3%, or 3.5%, or 4%, or 4.5%, or 5%, or 5.5%, or 6%, or 6.5%, or 7%, or 7.5%, or 8%, or 8.5%, or 9%, or 9.5%, or 10%.

In some embodiments, the physical divider may comprise a liquid immiscible in the cold thermal storage region, or the warm thermal storage region, or both. In some embodiments, the physical divider may comprise a liquid immiscible in the liquid-liquid phase transition composition comprising the cold thermal storage region, or the liquid-liquid phase transition composition comprising the warm thermal storage region, or both. In some embodiments, said liquid physical divider may comprise a density greater than the warm thermal storage region and less than the cold thermal storage region. In some embodiments, the liquid physical divider may be positioned due to gravitational forces, or density, or any combination thereof. In some embodiments, the liquid physical divider may be positioned, or held in position, or any combination thereof by surface tension.

In some embodiments, a physical divider may comprise both a solid and a liquid. For example, in some embodiments, a physical divider may comprise a solid coated with a lubricant or grease. For example, in some embodiments, a physical divider may comprise a solid coated with a lubricant, wherein the lubricant provides a seal between the interior of the thermal storage tank or enclosure walls and the physical divider. For example, in some embodiments, at least a portion of the interior walls of the thermal storage tank or enclosure may be coated with at least a portion of a liquid insoluble in the liquid-liquid phase transition composition. A lubricant coating of at least a portion of the physical divider and at least a portion of the interior thermal storage tank or enclosure walls may enable the elevation or position of the physical divider to be adjusted or to change, while maintaining a seal or an at least partial separation between the cold thermal storage region and the warm thermal storage region. For example, the liquid-liquid phase transition composition may possess a bulk composition comprising a polypropylene glycol and water and/or the lubricant may comprise a hydrophobic lubricant, such as a silicon lubricant, which may be insoluble in the liquid-liquid phase transition composition. In some embodiments, the lubricant may adhere to the surface of at least a portion of the physical divider, or at least a portion of the tank or enclosure walls, even if the density of the lubricant is greater than or less than the density of the liquid-liquid phase transition composition. For example, some lubricants, such as greases, possess adhering properties or sticky, properties which may be desirable.

In some embodiments, a physical divider may also be referred to as a barrier or separator.

Specific System Embodiments

1. A thermal storage system comprising:
   a warm thermal storage region;
   a cold thermal storage region; and
   a physical divider;
   wherein the warm thermal storage region comprises at least two liquid phases;
   wherein the cold thermal storage region comprises at least one liquid phase; and
   wherein the physical divider substantially separates the warm thermal storage region from the cold thermal storage region.
2. The system of embodiment 1 wherein the warm thermal storage region comprises a liquid-liquid phase transition composition at a multi-liquid phase state.
3. The system of embodiment 1 wherein the cold thermal storage region comprises a liquid-liquid phase transition composition at a single liquid phase state.
4. The system of embodiment 1 wherein the warm thermal storage region comprises a liquid-liquid phase transition composition above a liquid-liquid phase transition temperature range.
5. The system of embodiment 1 wherein the warm thermal storage region comprises a liquid-liquid phase transition composition in a liquid-liquid phase transition temperature range.
6. The system of embodiment 1 wherein the cold thermal storage region comprises a liquid-liquid phase transition composition below a liquid-liquid phase transition temperature range.
7. The system of embodiment 1 wherein the bulk composition of the warm thermal storage region is about the same as the bulk composition of the cold thermal storage region.
8. The system of embodiment 1 wherein the temperature difference between the warm thermal storage region and the cold thermal storage region is greater than 3 degrees Kelvin.
9. The system of embodiment 1 wherein the warm thermal storage region comprising at least two liquid phases comprises a first liquid phase and a second liquid phase; and wherein the density of the first liquid phase is about the same as the density as the second liquid phase.
10. The system of embodiment 9 wherein the density of the first liquid phase is different from the density of the second liquid phase by less than 0.05 kilograms per Liter.
11. The system of embodiment 1 wherein the warm thermal storage region comprising at least two liquid phases comprises a first liquid phase and a second liquid phase; and wherein the first liquid phase is dispersed in the second liquid phase.
12. The system of embodiment 11 wherein mechanical mixing at least partially disperses the first liquid phase in the second liquid phase.
13. The system of embodiment 11 wherein mechanical mixing is initiated when the particles per cubic centimeter (ppCC) decreases below 550 ppCC to at least partially disperse the first liquid phase in the second liquid phase.
14. The system of embodiment 1 wherein the physical divider is configured to substantially separate the cold thermal storage region and the warm thermal storage region.
15. The system of embodiment 1 wherein the physical divider is located at about the temperature interface between the cold thermal storage region and the warm thermal storage region.
16. The system of embodiment 1 wherein the elevation of the physical divider is adjusted when at least a portion of cold liquid-liquid phase transition composition is removed from the cold thermal storage region.
17. The system of embodiment 1 wherein the elevation of the physical divider is adjusted when at least a portion of warm liquid-liquid phase transition composition is removed from the warm thermal storage region.
18. The system of embodiment 1 wherein the elevation of the physical divider is adjusted when the volume of the cold thermal storage region, or the volume of the warm thermal storage region, or any combination thereof changes.
19. The system of embodiment 1 wherein the elevation of the physical divider is adjusted mechanically.
20. The system of embodiment 1 wherein the physical divider comprises a density greater than 1.5× the density of water.
21. The system of embodiment 1 further comprising a cable system configured to adjust the physical divider.
22. The system of embodiment 1 wherein the elevation of the physical divider is adjusted based on liquid volume and the rate of liquid-liquid phase transition.
23. A thermal storage system comprising:
   a warm thermal storage region;
   a cold thermal storage region; and
   a physical divider;
   wherein the warm thermal storage region comprises at least two liquid phases;
   wherein the cold thermal storage region comprises at least two liquid phases; and
   wherein the physical divider substantially separates the warm thermal storage region from the cold thermal storage region.
24. The system of embodiment 23 wherein the warm thermal storage region comprises a liquid-liquid phase transition composition at a multi-liquid phase state.
25. The system of embodiment 23 wherein the cold thermal storage region comprises a liquid-liquid phase transition composition at a multi-liquid phase state.
26. The system of embodiment 23 wherein the warm thermal storage region comprises a liquid-liquid phase transition composition in or above a liquid-liquid phase transition temperature range.
27. The system of embodiment 23 wherein the cold thermal storage region comprises a liquid-liquid phase transition composition in or below a liquid-liquid phase transition temperature range.
28. A thermal storage system comprising:
   a warm thermal storage region;
   a cold thermal storage region; and
   a physical divider;
   wherein the warm thermal storage region comprises at least one liquid phase;
   wherein the cold thermal storage region comprises at least two liquid phases; and
   wherein the physical divider substantially separates the warm thermal storage region from the cold thermal storage region.
29. The system of embodiment 28 wherein the warm thermal storage region comprises a liquid-liquid phase transition composition at a single liquid phase state.
30. The system of embodiment 28 wherein the cold thermal storage region comprises a liquid-liquid phase transition composition at a multi-liquid phase state.

Representative Method Embodiments

1. A method comprising:
providing a warm thermal storage region comprising a liquid-liquid phase transition composition comprising at least two liquid phases;
providing a cold thermal storage region comprising at least one liquid phase and wherein the warm thermal storage region is substantially separate from the cold thermal storage region;
phase transitioning the liquid-liquid phase transition composition; and
transferring at least a portion of the phase transitioned liquid-liquid phase transition composition to an application requiring cooling, a heat source, or both.
2. A method comprising:
providing a cold thermal storage region comprising a liquid-liquid phase transition composition comprising at least two liquid phases;
providing a warm thermal storage region comprising at least one liquid phase and wherein the warm thermal storage region is substantially separate from the cold thermal storage region;
phase transitioning the liquid-liquid phase transition composition; and
transferring at least a portion of the phase transitioned liquid-liquid phase transition composition to an application requiring cooling, a heat source, or both.
3. The method of embodiment 1 or 2 which further comprises mixing to at least partially disperse the first liquid phase in the second liquid phase.
4. The method of embodiment 1 or 2 which further comprises employing a physical divider to substantially separate the warm thermal storage region from the cold thermal storage region.
5. The method of embodiment 4 which further comprises adjusting an elevation of the physical divider after transferring.
6. The method of embodiment 5 wherein the elevation of the physical divider is adjusted mechanically.
7. The method of embodiment 4, 5, 6, or 7 wherein the physical divider comprises a density greater than 1.5× the density of water.
8. The method of embodiment 5 or 6 wherein a cable system is employed to adjust the physical divider.
9. The method of embodiment 1 or 2 wherein the density of the first liquid phase is different from the density of the second liquid phase by about less than 0.05 kilograms per Liter.
10. The method of embodiment 3 wherein mixing is initiated when the particles per cubic centimeter (ppCC) decreases below 550 ppCC.

The invention claimed is:
1. A thermal storage system comprising:
a warm thermal storage region;
a cold thermal storage region; and
a physical divider;
wherein the warm thermal storage region comprises a liquid-liquid phase transition composition comprising at least two liquid phases;
wherein the cold thermal storage region comprises at least one liquid phase; and
wherein the physical divider substantially separates the warm thermal storage region from the cold thermal storage region;
wherein the warm thermal storage region is at a temperature which is at least 1° K greater than the cold thermal storage region.
2. The system of claim 1 wherein the liquid-liquid phase transition composition is at a multi-liquid phase state.
3. The system of claim 1 wherein the liquid-liquid phase transition composition is at a single liquid phase state.
4. The system of claim 1 wherein the liquid-liquid phase transition composition is above a liquid-liquid phase transition temperature range.
5. The system of claim 1 wherein the liquid-liquid phase transition composition is in a liquid-liquid phase transition temperature range.
6. The system of claim 1 wherein the cold thermal storage region comprises a second liquid-liquid phase transition composition and wherein said second liquid-liquid phase transition composition is below a liquid-liquid phase transition temperature range.
7. The system of claim 1 wherein the bulk composition of the warm thermal storage region is about the same as the bulk composition of the cold thermal storage region.
8. The system of claim 1 wherein the temperature difference between the warm thermal storage region and the cold thermal storage region is greater than 3 degrees Kelvin.
9. The system of claim 1 wherein the warm thermal storage region comprising at least two liquid phases comprises a first liquid phase and a second liquid phase; and wherein the density of the first liquid phase is about the same as the density as the second liquid phase.
10. The system of claim 9 wherein the density of the first liquid phase is different from the density of the second liquid phase by less than 0.05 kilograms per Liter.
11. The system of claim 1 wherein the warm thermal storage region comprising at least two liquid phases comprises a first liquid phase and a second liquid phase; and wherein the first liquid phase is dispersed in the second liquid phase.
12. The system of claim 11 wherein mechanical mixing at least partially disperses the first liquid phase in the second liquid phase.
13. The system of claim 11 wherein mechanical mixing is initiated when the particles per cubic centimeter (ppCC) decreases below 550 ppCC to at least partially disperse the first liquid phase in the second liquid phase.
14. The system of claim 1 wherein the physical divider is configured to substantially separate the cold thermal storage region and the warm thermal storage region.
15. The system of claim 1 wherein the physical divider is located at about the temperature interface between the cold thermal storage region and the warm thermal storage region.
16. The system of claim 1 wherein the elevation of the physical divider is adjusted when at least a portion of cold liquid-liquid phase transition composition is removed from the cold thermal storage region.
17. The system of claim 1 wherein the elevation of the physical divider is adjusted when at least a portion of warm liquid-liquid phase transition composition is removed from the warm thermal storage region.
18. The system of claim 1 wherein the elevation of the physical divider is adjusted when the volume of the cold thermal storage region, or the volume of the warm thermal storage region, or any combination thereof changes.
19. The system of claim 1 wherein the elevation of the physical divider is adjusted mechanically.
20. The system of claim 1 wherein the physical divider comprises a density greater than 1.5× the density of water.

21. The system of claim 1 further comprising a cable system configured to adjust the physical divider.

22. The system of claim 1 wherein the elevation of the physical divider is adjusted based on liquid volume and the rate of liquid-liquid phase transition.

23. A thermal storage system comprising:
a warm thermal storage region;
a cold thermal storage region; and
a physical divider;
wherein the warm thermal storage region comprises a liquid-liquid phase transition composition comprising at least two liquid phases;
wherein the cold thermal storage region comprises at least two liquid phases; and
wherein the physical divider substantially separates the warm thermal storage region from the cold thermal storage region;
wherein the warm thermal storage region is at a temperature which is at least 1° K greater than the cold thermal storage region.

24. The system of claim 23 wherein the liquid-liquid phase transition composition is at a multi-liquid phase state.

25. The system of claim 23 wherein the cold thermal storage region comprises a second liquid-liquid phase transition composition and wherein said second liquid-liquid phase transition composition is at a multi-liquid phase state.

26. The system of claim 23 wherein the liquid-liquid phase transition composition is in or above a liquid-liquid phase transition temperature range.

27. The system of claim 23 wherein the cold thermal storage region comprises a second liquid-liquid phase transition composition and wherein said second liquid-liquid phase transition composition is in or below a liquid-liquid phase transition temperature range.

28. A thermal storage system comprising:
a warm thermal storage region;
a cold thermal storage region; and
a physical divider;
wherein the warm thermal storage region comprises at least one liquid phase;
wherein the cold thermal storage region comprises a liquid-liquid phase transition composition comprising at least two liquid phases; and
wherein the physical divider substantially separates the warm thermal storage region from the cold thermal storage region; and
wherein the warm thermal storage region is at a temperature which is at least 1° K greater than the cold thermal storage region.

29. The system of claim 28 wherein the warm thermal storage region comprises a second liquid-liquid phase transition composition and wherein said second liquid-liquid phase transition composition is at a single liquid phase state.

30. The system of claim 28 wherein the liquid-liquid phase transition composition is at a multi-liquid phase state.

31. The system of claim 1 wherein the physical divider is configured to substantially separate the cold thermal storage region and the warm thermal storage region, is located at about the temperature interface between the cold thermal storage region and the warm thermal storage region, and is adjustable.

* * * * *